US012706461B2

(12) United States Patent
Zhang et al.

(10) Patent No.: US 12,706,461 B2
(45) Date of Patent: Aug. 11, 2026

(54) PHOTOVOLTAIC POWER GENERATION SYSTEM AND FAULT PROTECTION METHOD AND DEVICE THEREOF, COMBINER BOX, AND INVERTER

(71) Applicant: SUNGROW POWER SUPPLY CO., LTD., Hefei (CN)

(72) Inventors: Bing Zhang, Hefei (CN); Nianan Pan, Hefei (CN); Peng Wang, Hefei (CN); Jigui Feng, Hefei (CN)

(73) Assignee: SUNGROW POWER SUPPLY CO., LTD:, Hefei (CN)

( * ) Notice: Subject to any disclaimer, the term of this patent is extended or adjusted under 35 U.S.C. 154(b) by 183 days.

(21) Appl. No.: 18/801,867

(22) Filed: Aug. 13, 2024

(65) Prior Publication Data

US 2024/0405563 A1 Dec. 5, 2024

Related U.S. Application Data

(63) Continuation of application No. PCT/CN2023/143557, filed on Dec. 29, 2023.

(30) Foreign Application Priority Data

May 26, 2023 (CN) ......................... 202310604547.1

(51) Int. Cl.
*H02J 3/38* (2026.01)
*H02H 3/087* (2006.01)
(Continued)

(52) U.S. Cl.
CPC ................. *H02J 3/38* (2013.01); *H02H 7/20* (2013.01); *H02J 3/0012* (2020.01); *H02J 2101/24* (2026.01)

(58) Field of Classification Search
CPC .......... H02H 3/087; H02H 3/18; H02H 7/205; H02H 7/268; H02H 7/062; H02H 7/20;
(Continued)

(56) References Cited

U.S. PATENT DOCUMENTS

2011/0199707 A1 8/2011 Kazemi et al.

FOREIGN PATENT DOCUMENTS

| | | | |
|---|---|---|---|
| AU | 2021327804 | A1 | 3/2023 |
| CN | 113725847 | A | 11/2021 |

(Continued)

OTHER PUBLICATIONS

Extended European Search Report dated Jul. 31, 2025 received in corresponding European Application No. EP23858392.6.

(Continued)

*Primary Examiner* — Elim Ortiz

(57) ABSTRACT

Provided are a photovoltaic power generation system and a fault protection method and device thereof, a combiner box, and an inverter. The method includes: disconnecting, when there are co-positive power conversion units or co-negative power conversion units in the plurality of power conversion units and the protection switch units corresponding to the co-positive power conversion units or the co-negative power conversion units share a protection switch when connected to their corresponding photovoltaic string units, part or all of the plurality of protection switch units in response to detecting a fault in the photovoltaic power generation system, such that at most two photovoltaic strings in each of the corresponding photovoltaic string units are connected in parallel. When the protection switch units corresponding to the co-positive power conversion units or the co-negative power conversion units are disconnected, their corresponding photovoltaic strings are disconnected separately by at least three protection switches.

27 Claims, 40 Drawing Sheets

(51) Int. Cl.

| | |
|---|---|
| ***H02H 7/20*** | (2006.01) |
| ***H02H 7/26*** | (2006.01) |
| ***H02J 3/0012*** | (2026.01) |
| ***H02J 7/00*** | (2026.01) |
| ***H02J 7/35*** | (2006.01) |
| ***H02S 40/32*** | (2014.01) |
| *H02J 101/24* | (2026.01) |

(58) Field of Classification Search

CPC ....... H02H 11/002; H02S 40/32; H02S 40/36; H02S 50/10; H02S 40/34; H02S 50/00; H02J 2101/25; H02J 1/10; H02J 3/38; H02J 3/0012; H02J 2101/24; H02J 3/381; Y02E 10/56; Y02E 10/50

See application file for complete search history.

(56) References Cited

FOREIGN PATENT DOCUMENTS

| | | | |
|---|---|---|---|
| CN | 113826302 | A | 12/2021 |
| CN | 113922405 | A | 1/2022 |
| CN | 218897085 | U | 4/2023 |
| CN | 116417977 | A | 7/2023 |
| WO | 2022174402 | A1 | 8/2022 |

OTHER PUBLICATIONS

International Search Report dated Feb. 27, 2024 in International Application No. PCT/CN2023/143557. English translation attached.

The Grant Notice from corresponding Chinese Application No. 202310604547.1, dated Jul. 18, 2023. English translation attached.

Wang Zhe et al. “The Exploration of Series-Connected High-Voltage Photovoltaic Block and System.” Electrical Technology, Feb. 15, 2015 (Feb. 15, 2015), pp. 137-144.

Protection switch unit 1

PV1+ K1

PV2+ K2

PV3+ K3

PV1 PV2 PV3

Photovoltaic string unit 1

K4

PV3-

PV2- K5

PV6-

Power conversion unit 1

BUS+

BUS-

PV1-

PV5- K6

PV4- K7

PV6 PV5 PV4

Photovoltaic string unit 2

Power conversion unit 2

PV4+ K8

PV5+ K9

PV6+ K10

Protection switch unit 2

PHOTOVOLTAIC POWER GENERATION SYSTEM AND FAULT PROTECTION METHOD AND DEVICE THEREOF, COMBINER BOX, AND INVERTER

CROSS-REFERENCE TO RELATED APPLICATIONS

This application is a continuation of International Application No. PCT/CN2023/143557, filed on Dec. 29, 2023, which claims priorities to Chinese Patent Application No. 202310604547.1 filed on May 26, 2023 and entitled "PHOTOVOLTAIC POWER GENERATION SYSTEM AND FAULT PROTECTION METHOD AND DEVICE THEREOF, COMBINER BOX, AND INVERTER", both of which are hereby incorporated by reference in its entirety.

FIELD

The present disclosure relates to the technical field of photovoltaic power generation, and more particularly, to a photovoltaic power generation system and a fault protection method and device thereof, a combiner box, and an inverter.

BACKGROUND

In a photovoltaic power generation system, a plurality of photovoltaic strings are connected to a power conversion unit through a fault isolation circuit, so as to provide the generated power to the power conversion unit through the fault isolation circuit. The fault isolation circuit uses a direct current switch with a disconnection function. When a fault occurs in the photovoltaic power generation system, such as faults like a short circuit or a reverse connection occurring in the photovoltaic string and faults occurring inside the power conversion unit, isolation between the photovoltaic string and the power conversion unit is realized by controlling disconnection of the direct current switch.

However, the fault isolation circuit in the related art has a problem of high cost.

SUMMARY

The present disclosure aims to solve at least one of the technical problems in the related art to some extent. To this end, an objective of the present disclosure is to provide a photovoltaic power generation system and a fault protection method and device thereof, a combiner box, and an inverter. In this way, a number of protection switches can be lowered without increasing a withstand voltage level of the protection switch, thereby lowering a cost and volume of a protection switch unit.

In a first aspect, an embodiment of the present disclosure provides a fault protection method for a photovoltaic power generation system. The photovoltaic power generation system includes a plurality of photovoltaic string units, a plurality of protection switch units, and a plurality of power conversion units. Each of the plurality of photovoltaic string units includes at least N photovoltaic strings, and each of the plurality of protection switch units includes a plurality of protection switches. Each of the plurality of protection switch units is adapted to connect one of the plurality of photovoltaic string units to a corresponding one of the plurality of power conversion units to form at least two photovoltaic string branches. Each of the at least two photovoltaic string branches is adapted to connect one photovoltaic string or two parallel photovoltaic strings, where N is an integer greater than or equal to 3. The fault protection method includes: disconnecting, when there are co-positive power conversion units or co-negative power conversion units in the plurality of power conversion units and the protection switch units corresponding to the co-positive power conversion units or the co-negative power conversion units share a protection switch when connected to their corresponding photovoltaic string units, part or all of the plurality of protection switch units in response to detecting a fault in the photovoltaic power generation system, such that at most two photovoltaic strings in each of the corresponding photovoltaic string units are connected in parallel. When the protection switch units corresponding to the co-positive power conversion units or the co-negative power conversion units are disconnected, their corresponding photovoltaic strings are disconnected separately by at least three protection switches.

In a second aspect, an embodiment of the present disclosure provides a fault protection device for a photovoltaic power generation system. The photovoltaic power generation system includes a plurality of photovoltaic string units and a plurality of power conversion units. Each of the plurality of photovoltaic string units includes at least N photovoltaic strings, where N is an integer greater than or equal to 3. The fault protection device includes: a plurality of protection switch units, each of the plurality of protection switch units including a plurality of protection switches and adapted to connect one of the plurality of photovoltaic string units to a corresponding one of the plurality of power conversion units to form at least two photovoltaic string branches, each of the at least two photovoltaic string branches being adapted to connect to one photovoltaic string or two parallel photovoltaic strings; and a control portion configured to control, when there are co-positive power conversion units or co-negative power conversion units in the plurality of power conversion units and the protection switch units corresponding to the co-positive power conversion units or the co-negative power conversion units share a protection switch when connected to their corresponding photovoltaic string units, part or all of the plurality of protection switch units to be disconnected in response to detecting a fault in the photovoltaic power generation system, such that at most two photovoltaic strings in each of the corresponding photovoltaic string units are connected in parallel. When the protection switch units corresponding to the co-positive power conversion units or the co-negative power conversion units are disconnected, their corresponding photovoltaic strings are disconnected separately by at least three protection switches.

In a third aspect, an embodiment of the present disclosure provides a combiner box of a photovoltaic power generation system. The combiner box includes the fault protection device as described above. The fault protection device is configured to disconnect, in response to a fault in the photovoltaic power generation system, part or all of connections between the plurality of power conversion units and the plurality of photovoltaic string units, such that when the protection switch units corresponding to the co-positive power conversion units or the co-negative power conversion units are disconnected, their corresponding photovoltaic strings are disconnected separately by at least three protection switches.

In a fourth aspect, an embodiment of the present disclosure provides an inverter of a photovoltaic power generation system. The inverter of the photovoltaic power generation system includes a plurality of power conversion units and the fault protection device as described above. The fault protection device is provided between the plurality of power conversion units and the plurality of photovoltaic string units, to disconnect, in response to a fault in the photovoltaic power generation system, part or all of connections between the plurality of power conversion units and the plurality of photovoltaic string units, such that when the protection switch units corresponding to the co-positive power conversion units or the co-negative power conversion units are disconnected, their corresponding photovoltaic strings are disconnected separately by at least three protection switches.

In a fifth aspect, an embodiment of the present disclosure provides a photovoltaic power generation system. The photovoltaic power generation system includes a plurality of photovoltaic string units. Each of the plurality of photovoltaic string units includes at least N photovoltaic strings, where N is an integer greater than or equal to 3. The photovoltaic power generation system further includes: the fault protection device according to the foregoing; or the combiner box according to the foregoing; or the inverter according to the foregoing.

Additional aspects and advantages of the present disclosure is provided in part in the following description, or becomes apparent in part from the following description, or can be learned from practicing of the present disclosure.

DETAILED DESCRIPTION

Figure 1:
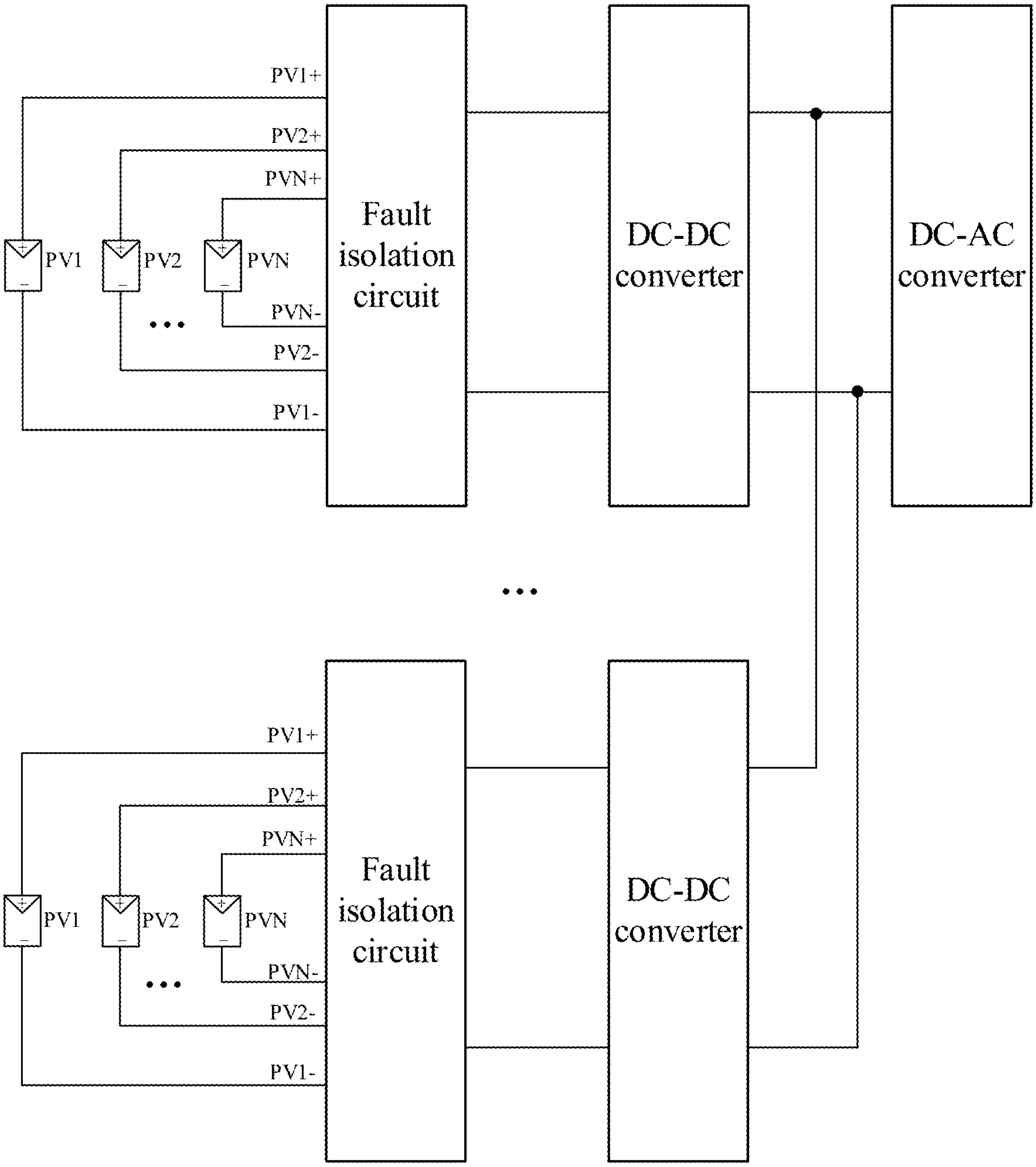
FIG. 1 is a schematic diagram of a structure of a photovoltaic power generation system in the related art.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

Referring to FIG. 1, a photovoltaic power generation system includes a plurality of photovoltaic strings, a plurality of fault isolation circuits, a plurality of DC-DC converters, and a DC-AC converter. Each fault isolation circuit is connected to N corresponding photovoltaic strings including PV1, PV2, . . . , PVN. The N photovoltaic strings are connected to the DC-DC converter through the fault isolation circuit, to provide the generated power to the DC-DC converter through the fault isolation circuit. Further, the generated power is transmitted to the DC-AC converter through the DC-DC converter. DC refers to a direct current. AC refers to alternating current. DC-DC converter refers to a direct-current to direct-current converter. DC-AC converter refers to a direct-current to alternating-current converter.

The fault isolation circuit uses a direct current switch with a disconnection function. The direct current switch can be controlled to be disconnected manually or controlled to be disconnected through a control portion in the system. When a fault occurs in the photovoltaic power generation system, for example, a fault like a short circuit or a reverse connection occurs in the photovoltaic string, a fault occurs inside the power conversion unit, and the like. Disconnection of the direct-current switch may be manually controlled or automatically controlled by the control portion. In this way, it is realized that the photovoltaic string is allowed to be isolated from the DC-DC converter and the DC-AC converter.

In the related art, there are two main connection manners between the fault isolation circuit and the plurality of photovoltaic strings. However, each of the two connection manners results in a high-cost problem in the fault isolation circuit.

The following takes two DC-DC converters, two fault isolation circuits, and each fault isolation circuit to be connected to five photovoltaic strings as an example for description.

Figure 2:
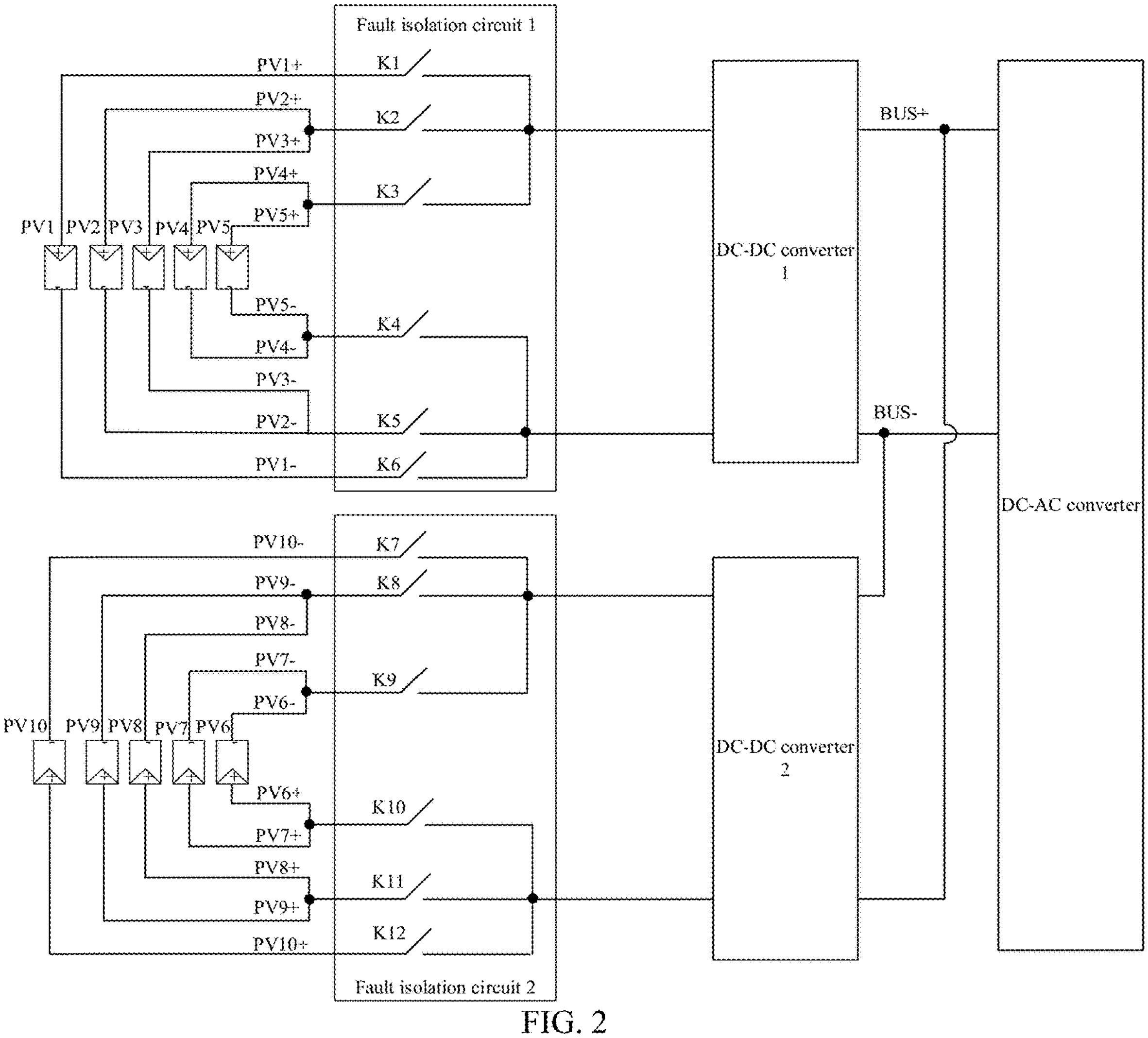
FIG. 2 is a first connection manner of a fault isolation circuit and a plurality of photovoltaic strings in the related art.

Exemplarily, FIG. 2 shows a first connection manner between the fault isolation circuit and the plurality of photovoltaic strings.

Referring to FIG. 2, the fault isolation circuit 1 includes direct current switches K1, K2, . . . , K6. The fault isolation circuit 2 includes direct current switches K7, K8, . . . , K12. The direct current switch K1 is connected to a positive electrode PV1+ of a photovoltaic string PV1. The direct current switch K2 is connected to a positive electrode PV2+ of a photovoltaic string PV2 and a positive electrode PV3+ of a photovoltaic string PV3. The direct current switch K3 is connected to a positive electrode PV4+ of a photovoltaic string PV4 and a positive electrode PV5+ of a photovoltaic string PV5, and so on. As illustrated in FIG. 2, its details will not be described herein.

When the reverse connection fault occurs in the photovoltaic string, the direct current switch needs to be disconnected to protect the photovoltaic string. When the direct current switch is disconnected, a number of the direct current switches is 0 or 4 in a loop formed by a photovoltaic string with occurrence of the reverse connection fault and a photovoltaic string without the occurrence of the reverse connection fault, i.e., four direct current switches connected in series are disconnected when subjected to two times a voltage of the photovoltaic string. For example, when a reverse connection fault occurs in the photovoltaic string PV1, in a loop formed by the photovoltaic string PV1 and the photovoltaic string PV2, the direct current switches K2, K1, K6, and K5 are disconnected when subjected to voltages of the photovoltaic string PV1 and the photovoltaic string PV2.

Figure 3A:
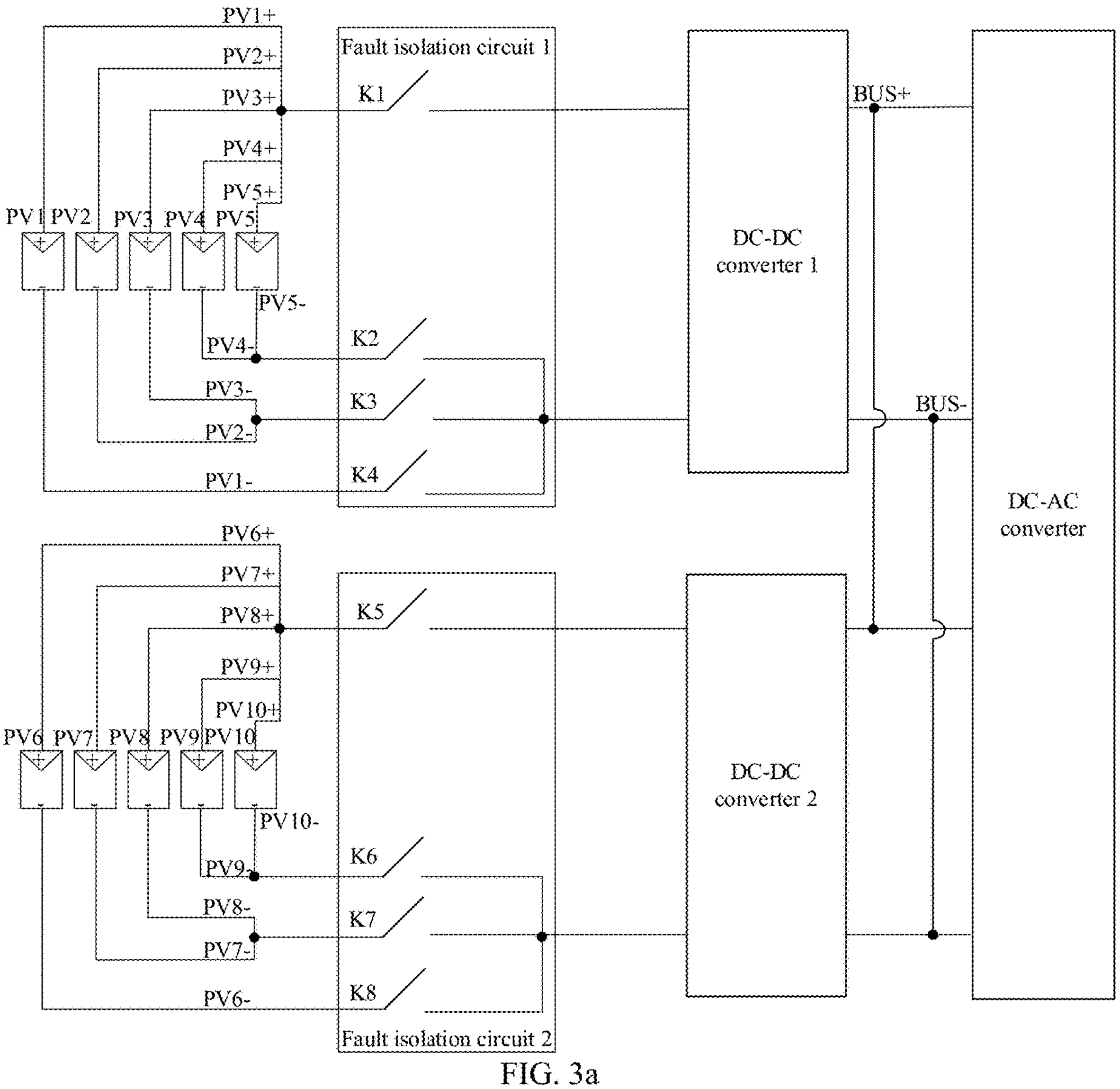
FIG. 3*a* and FIG. 3*b* are a second connection manner of a fault isolation circuit and a plurality of photovoltaic strings in the related art.
Figure 3B:
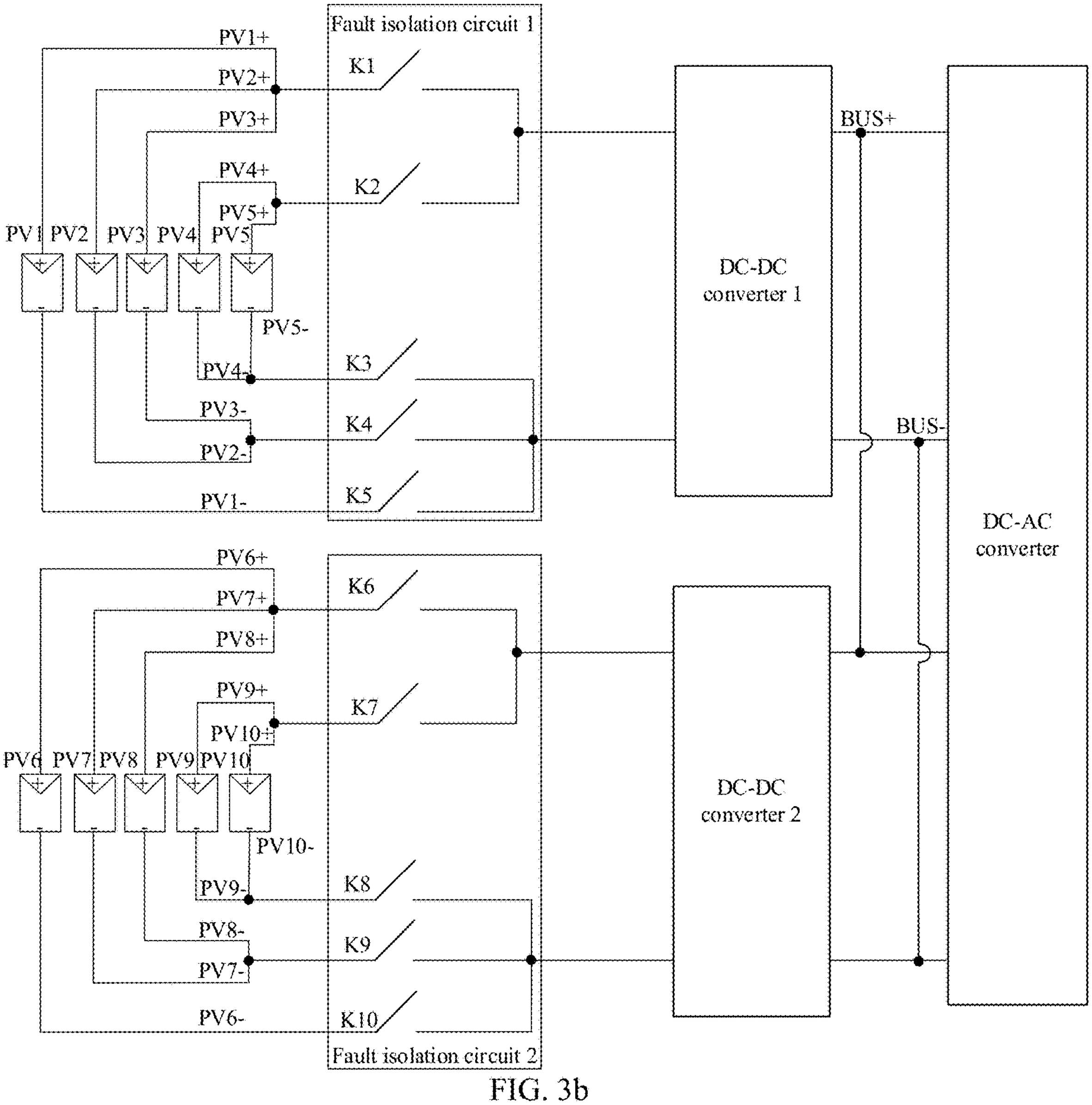

FIG. 3*a* and FIG. 3*b* show a second connection manner of the fault isolation circuit and the plurality of photovoltaic strings.

Referring to FIG. 3*a*, the fault isolation circuit 1 includes direct current switches K1, K2, K3, and K4. The fault isolation circuit 2 includes direct current switches K5, K6, K7, and K8. In an exemplary embodiment of the present disclosure, a connection relationship with photovoltaic strings PV1, PV2, . . . , PV10 are illustrated in FIG. 3*a*, and will not be described herein.

When a reverse connection fault occurs in the photovoltaic string, the direct current switch needs to be disconnected to protect the photovoltaic string. When the direct current switch is disconnected, the number of the direct current switches is 0 or 2 in the loop formed by the photovoltaic string with the occurrence of the reverse connection fault and the photovoltaic string without the occurrence of the reverse connection fault, i.e., two direct current switches connected in series are disconnected when subjected to two times the voltage of the photovoltaic string. For example, when a reverse connection fault occurs in the photovoltaic string PV1, in the loop formed by the photovoltaic string PV1 and the photovoltaic string PV2, the direct current switches K4 and K3 are disconnected when subjected to voltages of the photovoltaic string PV1 and the photovoltaic string PV2.

Referring to FIG. 3*b*, the fault isolation circuit 1 includes direct current switches K1, K2, . . . , K5. The fault isolation circuit 2 includes direct current switches K6, K7, . . . , K10. In an exemplary embodiment of the present disclosure, a connection relationship with photovoltaic strings PV1, PV2, . . . , PV10 are illustrated in FIG. 3*b*, and will not be described herein.

When a reverse connection fault occurs in the photovoltaic string, the direct current switch needs to be disconnected to protect the photovoltaic string. When the direct current switch is disconnected, the number of the direct current switches is 0 or 2 in the loop formed by the photovoltaic string with the occurrence of the reverse connection fault and the photovoltaic string without the occurrence of the reverse connection fault, i.e., two direct current switches connected in series are disconnected when subjected to two times the voltage of the photovoltaic string. For example, when a reverse connection fault occurs in the photovoltaic string PV1, in the loop formed by the photovoltaic string PV1 and the photovoltaic string PV2, the direct current switches K5 and K4 are disconnected when subjected to voltages of the photovoltaic string PV1 and the photovoltaic string PV2.

It should be noted that the direct current switch can be divided into a high-voltage direct current switch and a low-voltage direct current switch according to a disconnection voltage of the direct current switch. A direct current switch is disconnected when subjected to two times the voltage of the photovoltaic string when two or fewer direct current switches are connected in series is referred to as the high-voltage direct current switch. A direct current switch is disconnected when subjected to two times the voltage of the photovoltaic string when three or more direct current switches are connected in series is referred to as the low-voltage direct current switch.

On this basis, for the first connection manner between the fault isolation circuit and the plurality of photovoltaic strings illustrated in FIG. 2, although the fault isolation circuit can use a low-cost and low-voltage direct current switch to be disconnected when subjected to two times the voltage of the photovoltaic string, each low-voltage direct current switch is most connected to two photovoltaic strings. Therefore, 12 low-voltage direct current switches need to be used. Moreover, there are a large number of the low-voltage direct current switches, causing the fault isolation circuit to have a high cost.

For the second connection manner between the fault isolation circuit and the plurality of photovoltaic strings illustrated in FIG. 3*a* and FIG. 3*b*, although the number of direct current switches may be reduced by increasing a number of photovoltaic strings connected by the direct current switch, such as the direct current switch K1 as illustrated in FIG. 3*a* being connected to five photovoltaic strings and the direct current switch K1 illustrated in FIG. 3*b* being connected to three photovoltaic strings, i.e., three or more photovoltaic strings may be connected through a direct current switch to reduce the number of direct current switches. However, at this time, a high-voltage direct current switch with a high cost is required, resulting in a high cost of the fault isolation circuit.

Based on the above analysis, each of two connection manners of the fault isolation circuit and the plurality of photovoltaic strings in the related art causes the problem of high cost in the fault isolation circuit.

Based on this, the present disclosure provides a photovoltaic power generation system and a fault protection method and device thereof, a combiner box and an inverter, which can lower a number of protection switches without increasing a withstand voltage level of the protection switch, i.e., in a case of using a low-voltage protection switch, thereby reducing a cost and volume of the protection switch unit.

In order to enable a person skilled in the art to better understand the technical solutions of the present disclosure, the technical solutions in the embodiments of the present disclosure are clearly described below in conjunction with the accompanying drawings in the embodiments of the present disclosure.

The photovoltaic power generation system provided in the embodiments of the present disclosure may include a plurality of photovoltaic string units and a plurality of power conversion units. Each of the plurality of photovoltaic string units includes at least N photovoltaic strings, where N is an integer greater than or equal to 3. The fault protection device may include a plurality of protection switch units and a control portion. Each of the plurality of protection switch units includes a plurality of protection switches and is adapted to connect one of the plurality of photovoltaic string units to a corresponding one of the plurality of power conversion units to form at least two photovoltaic string branches. Each of the at least two photovoltaic string branches is adapted to connect to one photovoltaic string or two parallel photovoltaic strings. The control portion is configured to control, when there are co-positive power conversion units or co-negative power conversion units in the plurality of power conversion units and the protection switch units corresponding to the co-positive power conversion units or the co-negative power conversion units share a protection switch when connected to their corresponding photovoltaic string units, part or all of the plurality of protection switch units to be disconnected in response to detecting a fault in the photovoltaic power generation system, such that at most two photovoltaic strings in each of the corresponding photovoltaic string units are connected in parallel. When the protection switch units corresponding to the co-positive power conversion units or the co-negative power conversion units are disconnected, their corresponding photovoltaic strings are disconnected separately by at least three protection switches.

It should be noted that each of the plurality of photovoltaic string units includes at least N photovoltaic strings, where N is an integer greater than or equal to 3, which means that each of the plurality of photovoltaic string units at least includes three photovoltaic strings, and different photovoltaic string units may have a same number of photovoltaic strings or different number of photovoltaic strings. For example, in the plurality of photovoltaic string units, some photovoltaic string units include three photovoltaic strings, and some photovoltaic string units include 4 photovoltaic strings. Alternatively, all the photovoltaic string units include three photovoltaic strings; and so on. Exemplarily, referring to FIG. 5*a*, each of the photovoltaic string unit 1 and the photovoltaic string unit 2 includes three photovoltaic strings. The photovoltaic string may be formed by a series-parallel connection of a plurality of photovoltaic components. For example, the plurality of photovoltaic components are directly connected in series, or the plurality of photovoltaic components are connected in parallel and then connected in series, to form the photovoltaic string. A specific number, parameter, and the like of the photovoltaic components included in the specific photovoltaic string are not limited herein.

The power conversion unit refers to a device capable of converting power generated by the photovoltaic string unit into required power for a user. Exemplarily, the power conversion unit may convert a direct current generated by the photovoltaic string unit into another direct current. The other direct current may be directly supplied to a load, or may be supplied to a load after being inverted by the DC-AC converter, which is exemplarily not limited herein. For example, based on requirements, the power conversion unit may be, but is not limited to, a DC-DC converter.

Figure 4A:
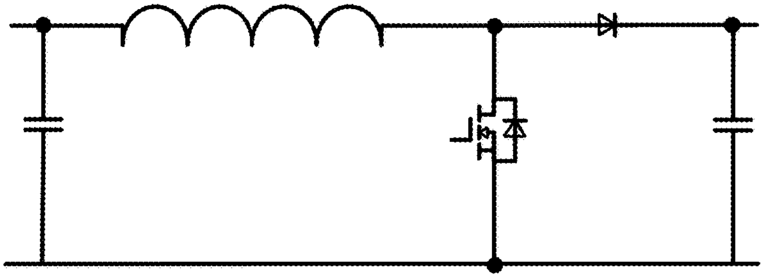
FIG. 4*a* and FIG. 4*b* are schematic diagrams of a structure of a DC-DC converter according to some embodiments of the present disclosure.
Figure 4B:
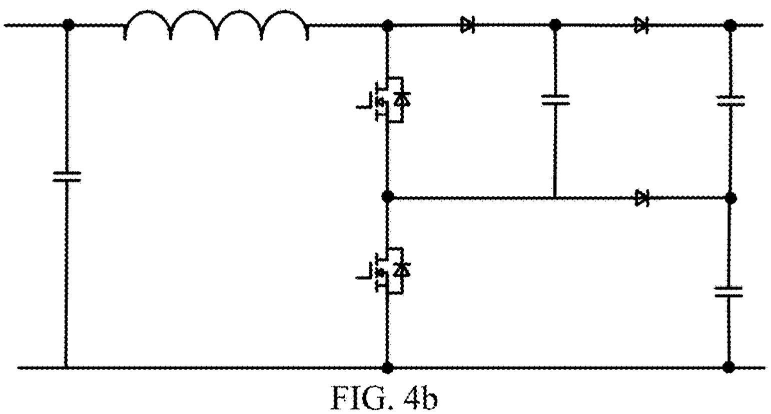

Exemplarily, the DC-DC converter may adopt a topology illustrated in FIG. 4*a*, which is a typical single-tube Boost converter (a boost converter), is suitable for a scenario with a low voltage. Alternatively, the DC-DC converter may also adopt a topology illustrated in FIG. 4*b*, which is a Boost voltage with two tubes connected in series, and is suitable for a scenario with a high voltage. In addition, the DC-DC converter may use, but is not limited to the foregoing two topologies, which is not exemplarily limited herein, and may be determined according to specific situations. All falls within the protection scope of the present disclosure.

The protection switch may be the foregoing direct current switch. Each protection switch unit includes the plurality of protection switches. Exemplarily, referring to FIG. 5*a*, the protection switch unit 1 includes five protection switches K1, K2, . . . , K5. Moreover, the protection switch unit 2 includes five protection switches K6, K7, . . . , K10. Each protection switch unit is adapted to connect one of photovoltaic string units to a corresponding one of power conversion units to form at least two photovoltaic string branches. Exemplarily, referring to FIG. 5*a*, the protection switch unit 1 connects the photovoltaic string unit 1 to the corresponding power conversion unit 1 and forms six photovoltaic string branches (when the protection switch is not shared). Moreover, the protection switch unit 2 connects the photovoltaic string unit 2 to the corresponding power conversion unit 2 and forms six photovoltaic string branches (when the protection switch is not shared). When part or all of the plurality of protection switch units are controlled to be disconnected, a synchronous disconnection between part or all of the plurality of protection switch units is usually required, to better achieve fault isolation between the photovoltaic string unit and the power conversion unit.

The photovoltaic string branch refers to a branch corresponding to each protection switch, i.e., one protection switch corresponds to one photovoltaic string branch. Exemplarily, referring to FIG. 5*a*, the protection switch K1 corresponds to one photovoltaic string branch, and the protection switch K2 corresponds to one photovoltaic string branch, etc. The photovoltaic string branch is adapted to connect one photovoltaic string or two parallel photovoltaic strings. For example, for any protection switch unit, each of at least two formed photovoltaic string branches is adapted to connect one photovoltaic string, or each of at least two formed photovoltaic string branches is adapted to connect two parallel photovoltaic strings, or at least two formed photovoltaic string branches include: at least one photovoltaic string branch adapted to connect one photovoltaic string and at least one photovoltaic string branch adapted to connect two parallel photovoltaic strings.

Figure 5A:
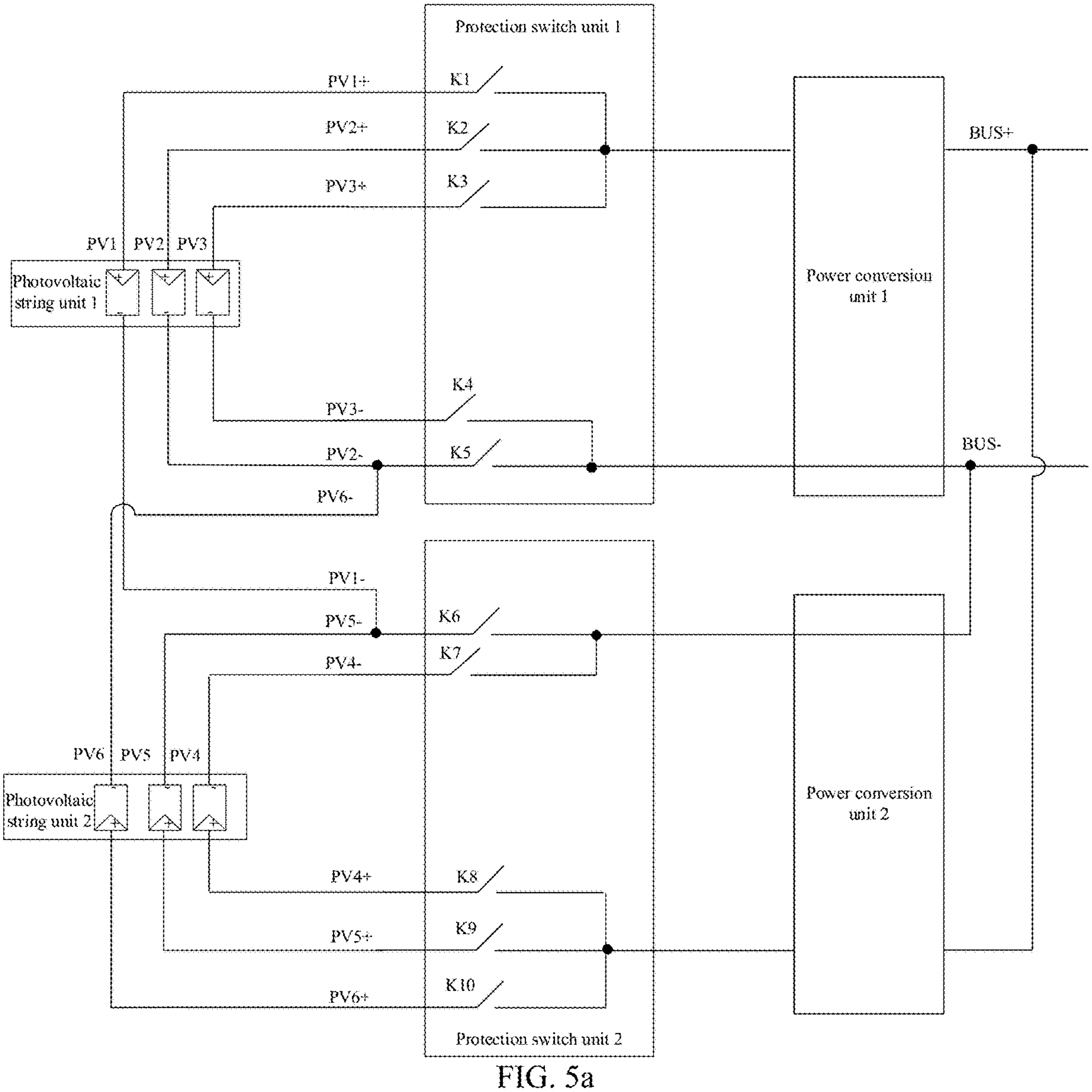
FIG. 5*a* to FIG. 5*c* are schematic diagrams of protection switch units corresponding to two co-negative power conversion units being connected to photovoltaic string units according to some embodiments of the present disclosure.

Exemplarily, referring to FIG. 5*a*, the protection switch unit 1 is adapted to connect the photovoltaic string unit 1 to the corresponding power conversion unit 1, and form six photovoltaic string branches (when the protection switch is not shared). The photovoltaic string branch corresponding to the protection switch K1 is connected to the photovoltaic string PV1 in the photovoltaic string unit 1. The photovoltaic string branch corresponding to the protection switch K2 is connected to the photovoltaic string PV2 in the photovoltaic string unit 1. The photovoltaic string branch corresponding to the protection switch K3 is connected to the photovoltaic string PV3 in the photovoltaic string unit 1. A photovoltaic string branch corresponding to the protection switch K4 is connected to the photovoltaic string PV3 in the photovoltaic string unit 1. The photovoltaic string branch corresponding to the protection switch K5 is connected to the photovoltaic string PV2 in the photovoltaic string unit 1. When the protection switch is not shared, there is also a photovoltaic string branch corresponding to one protection switch to connect to the photovoltaic string PV1 in the photovoltaic string unit 1. For the protection switch unit 2, its details will not be described herein. In this example, each of the at least two photovoltaic string branches formed by each protection switch unit is adapted to connect to one photovoltaic string in the corresponding photovoltaic string unit.

Figure 5B:
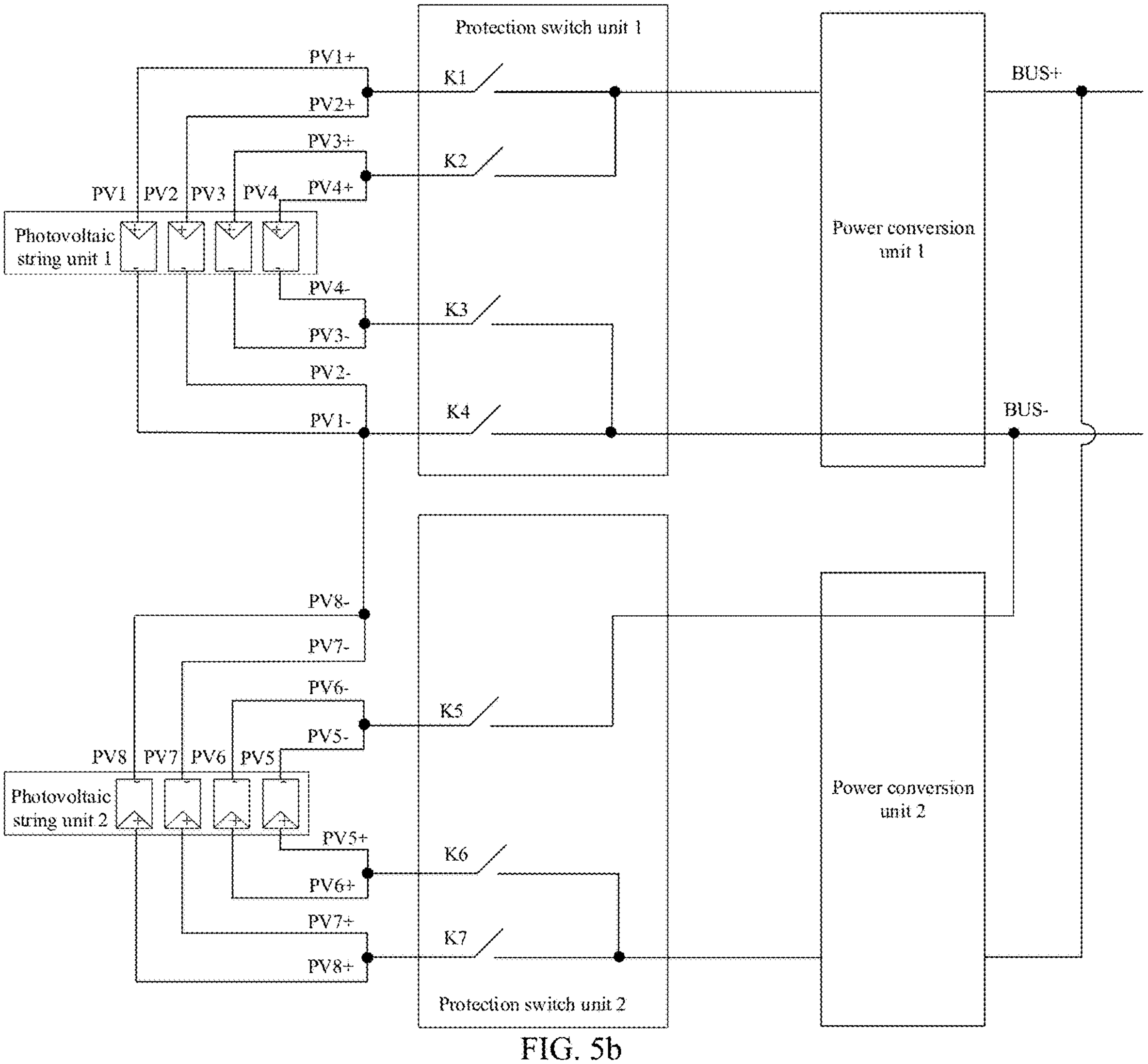

Exemplarily, referring to FIG. 5*b*, the protection switch unit 1 is adapted to connect the photovoltaic string unit 1 to the corresponding power conversion unit 1 and form four photovoltaic string branches (when the protection switch is not shared). The photovoltaic string branch corresponding to the protection switch K1 is connected to the photovoltaic string PV1 and the photovoltaic string PV2 in the photovoltaic string unit 1. The photovoltaic string branch corresponding to the protection switch K2 is connected to the photovoltaic string PV3 and the photovoltaic string PV4 in the photovoltaic string unit 1. The photovoltaic string branch corresponding to the protection switch K3 is connected to the photovoltaic string PV3 and the photovoltaic string PV4 in the photovoltaic string unit 1. The photovoltaic string branch corresponding to the protection switch K4 is connected to the photovoltaic string PV1 and the photovoltaic string PV2 in the photovoltaic string unit 1. For the protection switch unit 2, it should be noted that when the protection switch is not shared, there is also a photovoltaic string branch corresponding to one protection switch to connect to a photovoltaic string PV7 and a photovoltaic string PV8 in the photovoltaic string unit 2. In this example, each of the at least two photovoltaic string branches formed by each protection switch unit is adapted to connect two photovoltaic strings in the corresponding photovoltaic string unit.

Figure 5C:
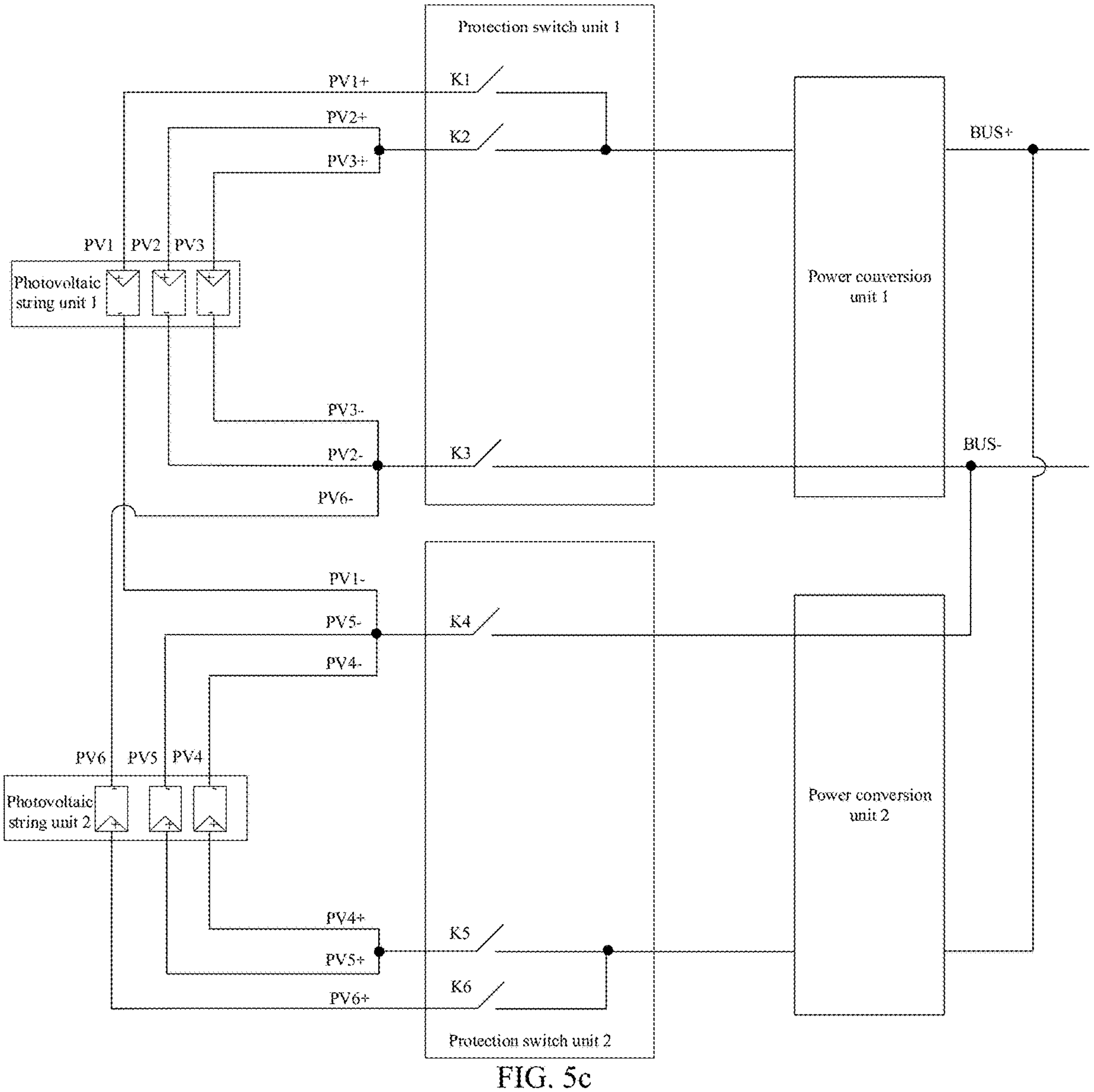

Exemplarily, referring to FIG. 5*c*, the protection switch unit 1 is adapted to connect the photovoltaic string unit 1 to the corresponding power conversion unit 1 and form four photovoltaic string branches (when the protection switch is not shared). The photovoltaic string branch corresponding to the protection switch K1 is connected to the photovoltaic string PV1 in the photovoltaic string unit 1. The photovoltaic string branch corresponding to the protection switch K2 is connected to the photovoltaic string PV2 and the photovoltaic string PV3 in the photovoltaic string unit 1. The photovoltaic string branch corresponding to the protection switch K3 is connected to the photovoltaic string PV2 and the photovoltaic string PV3 in the photovoltaic string unit 1. When the protection switch is not shared, there is also a photovoltaic string branch corresponding to one protection switch to be connected to the photovoltaic string PV1 in the photovoltaic string unit 1. For the protection switch unit 2, its details will not be described herein. In this example, in each of the at least two photovoltaic string branches formed by each protection switch unit, two photovoltaic string branches are adapted to connect to one photovoltaic string in the corresponding photovoltaic string unit, and the two photovoltaic string branches are adapted to connect two photovoltaic strings in the corresponding photovoltaic string unit.

Co-positive power conversion units or co-negative power conversion units occurring in the plurality of power conversion units means that part of the plurality of power conversion units are co-positive or co-negative, or all of the plurality of power conversion units are co-positive or co-negative. The co-positive power conversion unit refers to that positive terminals of any of the plurality of power conversion units are connected together, and these power conversion units are co-positive. The co-negative power conversion unit refers to that negative terminals of any of the plurality of power conversion units are connected together, and these power conversion units are co-negative.

Figure 6A:
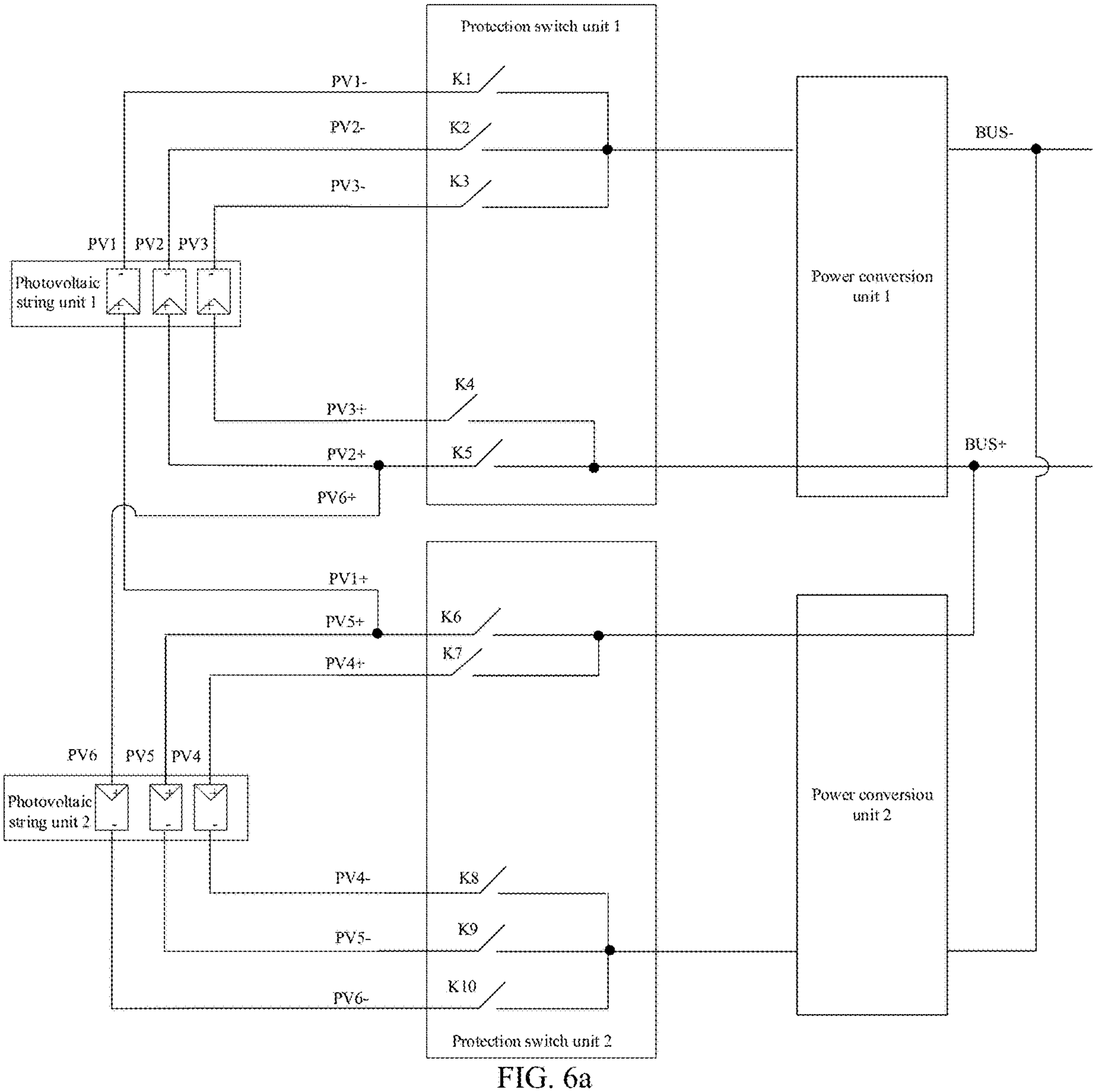
FIG. 6*a* to FIG. 6*c* are schematic diagrams of protection switch units corresponding to two co-positive power conversion units being connected to photovoltaic string units according to some embodiments of the present disclosure.
Figure 6B:
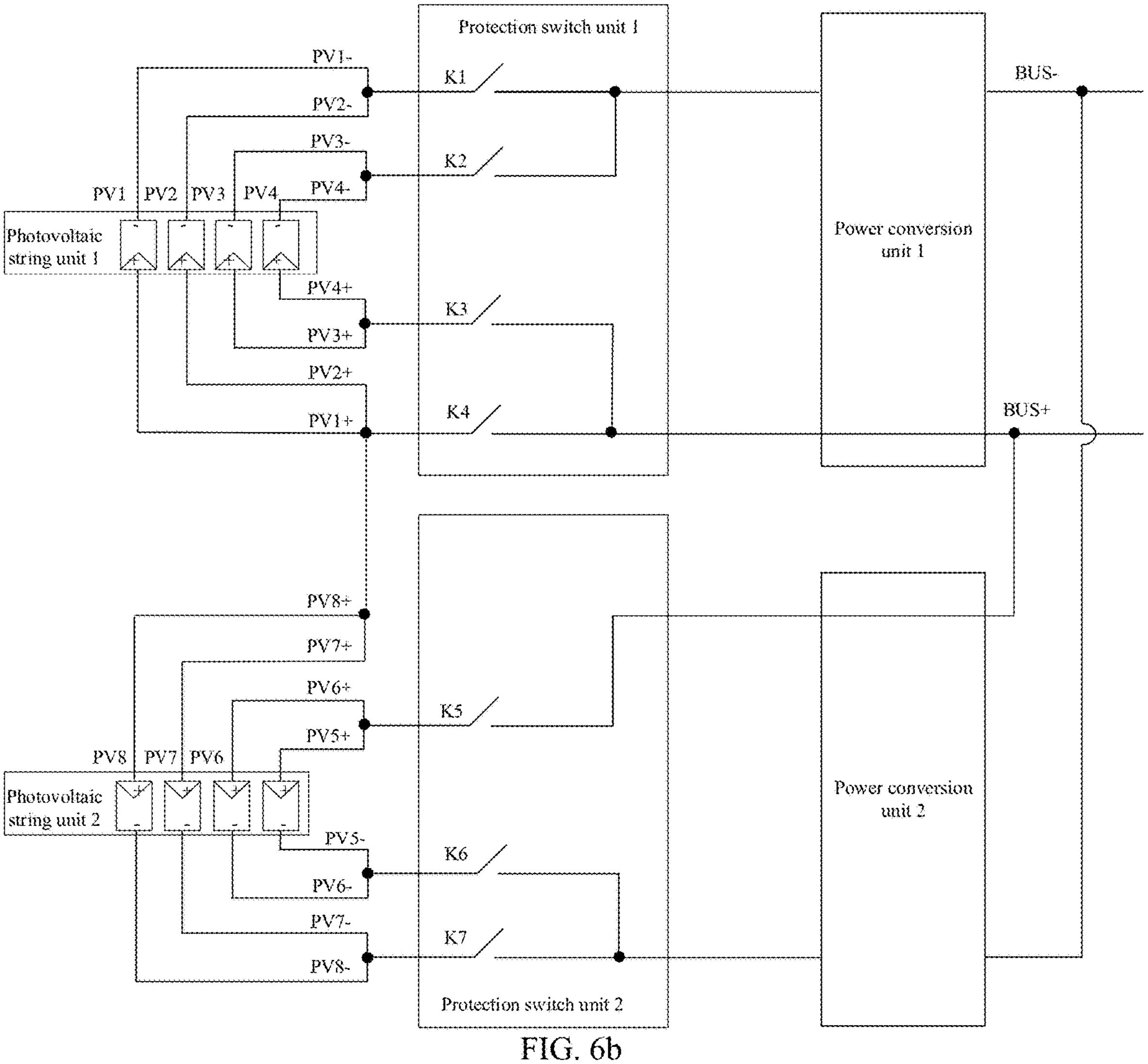
Figure 6C:
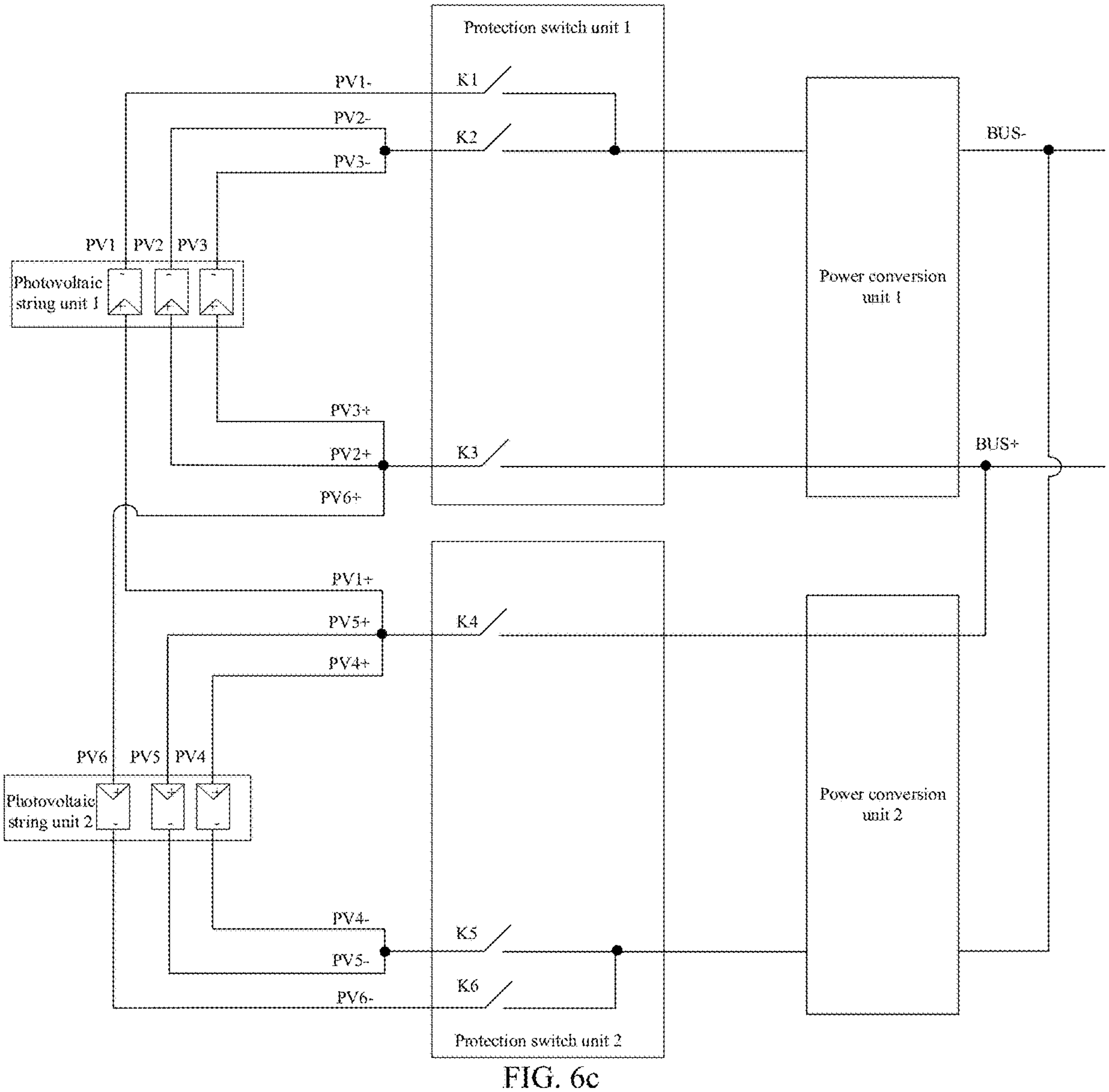

Exemplarily, referring to FIG. 5*a* to FIG. 5*c*, a negative input terminal of the power conversion unit 1 is connected to a negative output terminal of the power conversion unit 1. A negative input terminal of the power conversion unit 2 is connected to a negative output terminal of the power conversion unit 2. Moreover, the negative output terminal of the power conversion unit 1 is connected to the negative output terminal of the power conversion unit 2. For example, the negative output terminal of the power conversion unit 1 and the negative output terminal of the power conversion unit 2 are both connected to a negative electrode BUS− of a direct current bus. At this time, the power conversion unit 1 and the power conversion unit 2 are co-negative. With reference to FIG. 6*a* to FIG. 6*c*, a positive input terminal of the power conversion unit 1 is connected to a positive output terminal of the power conversion unit 1, and a positive input terminal of the power conversion unit 2 is connected to a positive output terminal of the power conversion unit 2. Moreover, the positive output terminal of the power conversion unit 1 is connected to the positive output terminal of the power conversion unit 2. For example, the positive output terminal of the power conversion unit 1 and the positive output terminal of the power conversion unit 2 are both connected to a negative electrode BUS+ of the direct current bus. At this time, the power conversion unit 1 and the power conversion unit 2 are co-positive.

Further, the power conversion unit may include a DC-DC converter. When each power conversion unit includes a DC-DC converter, in response to positive terminals of any two DC-DC converters being connected together, the two power conversion units are co-positive; and in response to negative terminals of any two DC-DC converters being connected together, the two power conversion units are co-negative. For specific description, reference may be made to the foregoing examples, its details will not be described herein.

The protection switch units corresponding to the co-positive power conversion units or the co-negative power conversion units share a protection switch when connected to their corresponding photovoltaic string units, which means that there is at least one protection switch in the plurality of protection switch units corresponding to the co-positive power conversion units or the co-negative power conversion units, and the at least one protection switch is connected to a part of photovoltaic strings of at least two of the plurality of photovoltaic string units corresponding to the co-positive power conversion units or the co-negative power conversion units simultaneously. In this way, the number of the protection switches can be reduced by sharing the protection switch, thereby reducing the cost and volume of the protection switch unit.

Exemplarily, referring to FIG. 5*a*, the power conversion unit 1 and the power conversion unit 2 are co-negative. When the protection switch unit 1 corresponding to the power conversion unit 1 is connected to the corresponding photovoltaic string unit 1, the protection switch K5 is shared. When the protection switch unit 2 corresponding to the power conversion unit 2 is connected to the corresponding photovoltaic string unit 2, the protection switch K6 is shared, i.e., the protection switch K5 is both connected to the photovoltaic string PV2 in the photovoltaic string unit 1 and a photovoltaic string PV6 in the photovoltaic string unit 2 simultaneously. The protection switch K6 is connected to the photovoltaic string PV1 in the photovoltaic string unit 1 and the photovoltaic string PV5 in the photovoltaic string unit 2 simultaneously. The protection switch K5 and the protection switch K6 are shared by the photovoltaic string unit 1 and the photovoltaic string unit 2. When the protection switch K5 and the protection switch K6 are not shared, as described above, in the protection switch unit 1, one protection switch is also required to be connected to a negative electrode PV1− of the photovoltaic string PV1. Meanwhile, in the protection switch unit 2, one protection switch is also required to be connected to a negative electrode PV6− of the photovoltaic string PV6. Compared with the sharing, there are two additional protection switches. Therefore, a number of used protection switches can be reduced by sharing protection switches.

Exemplarily, referring to FIG. 5*b*, the power conversion unit 1 and the power conversion unit 2 are co-negative. When the protection switch unit 1 corresponding to the power conversion unit 1 is connected to the corresponding photovoltaic string unit 1, and when the protection switch unit 2 corresponding to the power conversion unit 2 is connected to the corresponding photovoltaic string unit 2, the protection switch K4 is shared, i.e., the protection switch K4 is connected to the photovoltaic string PV1 and the photovoltaic string PV2 in the photovoltaic string unit 1 and the photovoltaic string PV7 and the photovoltaic string PV8 in the photovoltaic string unit 2 simultaneously. Moreover, the protection switch K4 is shared by the photovoltaic string unit 1 and the photovoltaic string unit 2. If the protection switch K4 is not shared, as described above, in the protection switch unit 2, one protection switch is further required to be connected to a negative electrode PV7− of the photovoltaic string PV7 and a negative electrode PV8− of the photovoltaic string PV8. Compared with the sharing, there are one additional protection switch. Therefore, the number of used protection switches can be reduced by sharing the protection switch.

Exemplarily, referring to FIG. 5*c*, the power conversion unit 1 and the power conversion unit 2 are co-negative. When the protection switch unit 1 corresponding to the power conversion unit 1 is connected to the corresponding photovoltaic string unit 1, the protection switch K3 is shared. Moreover, when the protection switch unit 2 corresponding to the power conversion unit 2 is connected to the corresponding photovoltaic string unit 2, the protection switch K4 is shared. That is, the protection switch K3 is connected to the photovoltaic string PV2 and the photovoltaic string PV3 in the photovoltaic string unit 1 and the photovoltaic string PV6 in the photovoltaic string unit 2 simultaneously. Moreover, the protection switch K4 is connected to the photovoltaic string PV1 in the photovoltaic string unit 1 and the photovoltaic string PV4 and the photovoltaic string PV5 in the photovoltaic string unit 2 simultaneously. The photovoltaic string PV3 and the protection switch K4 are shared by the photovoltaic string unit 1 and the photovoltaic string unit 2. If the photovoltaic string PV3 and the protection switch K4 are not shared, as described above, in the protection switch unit 1, one protection switch is further required to be connected to the negative electrode PV1− of the photovoltaic string PV1. Meanwhile, in the protection switch unit 2, one protection switch is further required to be connected to the negative electrode PV6− of the photovoltaic string PV6. Compared with the sharing, there are two additional protection switches. Therefore, the number of used protection switches can be reduced by sharing protection switches.

It should be noted that, for the sharing of the protection switch when the power conversion unit 1 and the power conversion unit 2 are co-positive, reference may be made to related descriptions when the power conversion unit 1 and the power conversion unit 2 are co-negative, and its details will not be described herein.

The occurrence of a fault in the photovoltaic power generation system may arise from faults like a reverse-connection fault or a short-circuit fault of the photovoltaic string. The reverse-connection fault means to that the positive electrode and the negative electrode of the photovoltaic string are connected reversely. The short-circuit fault means to that the positive electrode and the negative electrode of the photovoltaic string are grounded simultaneously. Disconnection of the protection switch unit means to that all of protection switches in the protection switch unit are disconnected. Exemplarily, referring to FIG. 5*a*, disconnection of the protection switch unit 1 means to that all of the protection switches K1, K2, . . . , K5 are disconnected. Disconnection of part or all of the plurality of protection switch units means that only some of the plurality of protection switch units may be disconnected, or all of the protection switch units may be disconnected, which may be exemplarily determined on the basis of a fault detection result as desired. For example, based on safety consideration of the photovoltaic power generation system, when a fault in the photovoltaic power generation system is detected, all of the plurality of protection switch units can be controlled to be disconnected. Based on power supply reliability of the photovoltaic power generation system, when a fault in the photovoltaic power generation system is detected, part of the plurality of protection switch units are controlled to be disconnected based on the fault detection result, and the rest of the plurality of protection switch units are maintained in a current state. In this way, the photovoltaic power generation system is allowed to continue to supply power. Therefore, reliability of power supply is ensured.

There are a plurality of cases when part of the plurality of protection switch units are controlled to be disconnected based on the fault detection result. For example, without considering costs, a current sensor may be provided at each of the positive electrode and the negative electrode of each photovoltaic string. The photovoltaic string with the occurrence of the reverse-connection fault or the photovoltaic string with the occurrence of the short-circuit fault may be detected through the current sensor, to control the protection switch unit corresponding to the photovoltaic string to be disconnected.

In a case of considering costs and the like, only the current sensor may be provided at the positive electrode of each photovoltaic string. However, the current sensor can only detect the photovoltaic string with the occurrence of the reverse-connection fault and cannot detect the photovoltaic string with the occurrence of the short-circuit fault. In this case, it can be first determined whether a reverse-connection fault or a short-circuit fault occurs in the photovoltaic power generation system, and exemplarily, a voltage can be used. For example, when a reverse-connection fault occurs, the protection switch corresponding to the photovoltaic string withstand two times the voltage of the photovoltaic string. On the basis of the voltage, a reverse-connection fault in the photovoltaic power generation system can be detected. When it is determined that a reverse-connection fault occurs in the photovoltaic power generation system, the photovoltaic string with the occurrence of the reverse-connection fault can be determined based on a current detected by the current sensor, and then the protection switch unit corresponding to the photovoltaic string is controlled to be disconnected. When it is determined that a short-circuit fault occurs in the photovoltaic power generation system, since the photovoltaic string with the occurrence of the short-circuit fault cannot be determined based on the current detected by the current sensor, all of the plurality of protection switch units need to be controlled to be disconnected. Exemplarily, referring to FIG. 5a, when a positive electrode PV1+ of the photovoltaic string PV1 is grounded, since detection on a current of the negative electrode PV1− of the photovoltaic string PV1 may not be performed, it cannot be determined whether the negative electrode PV1− of the photovoltaic string PV1 is grounded. It is possible that the negative electrode PV1− of the photovoltaic string PV1 is grounded or negative electrodes of other photovoltaic strings are grounded. Therefore, it is impossible to determine which photovoltaic string is grounded to cause a short-circuit fault to occur in the photovoltaic string. Therefore, it is necessary to control all of the plurality of protection switch units to be disconnected.

After part or all of the plurality of protection switch units are controlled to be disconnected, the at most two photovoltaic strings in the corresponding photovoltaic string units are connected in parallel. In this way, when one photovoltaic string can withstand a current outputted by at most one normal photovoltaic string, at most one normal photovoltaic group string outputs current to the protection switch unit when a reverse-connection fault or a short-circuit fault occurs in the photovoltaic string. At this time, the current is within a range that can be withstood by the faulty photovoltaic string, thereby protecting the photovoltaic string from being damaged. Exemplarily, referring to FIG. 5a, after the protection switch unit 1 is controlled to be disconnected, there is no parallel connection between photovoltaic strings in the photovoltaic string unit 1. Referring to FIG. 5b, after the protection switch unit 1 is controlled to be disconnected, the photovoltaic string PV1 and the photovoltaic string PV2 in the photovoltaic string unit 1 are connected in parallel, and the photovoltaic string PV3 and the photovoltaic string PV4 are connected in parallel. It is assumed that a reverse-connection fault occurs in the photovoltaic string PV1, the normal photovoltaic string PV2 outputs a current to the faulty photovoltaic string PV1. Since the current does not exceed the range that the photovoltaic string PV 1 can withstand, the photovoltaic string PV 1 is not be damaged. Referring to FIG. 5c, after the protection switch unit 1 is controlled to be disconnected, the photovoltaic string PV2 and the photovoltaic string PV3 in the photovoltaic string unit 1 are connected in parallel. It is assumed that a reverse-connection fault occurs in the photovoltaic string PV2, then the normal photovoltaic string PV3 outputs a current to the faulty photovoltaic string PV2. Since the current does not exceed the range that the photovoltaic string PV2 can withstand, the photovoltaic string PV2 is not be damaged.

When the protection switch units corresponding to the co-positive power conversion units or the co-negative power conversion units are disconnected, at least three protection switches are used to disconnect the corresponding photovoltaic strings, which means that when a fault occurs in the photovoltaic power generation system, such as a reverse-connection fault or a short-circuit fault occurs in the photovoltaic string, at least three protection switches can be disconnected when subjected to two times the voltage of the photovoltaic string in a loop formed by the photovoltaic string with the occurrence of a fault and the photovoltaic strings without the occurrence of a fault. In this way, a low-voltage protection switch with a low cost can continue to be used.

Exemplarily, referring to FIG. 5a, it is assumed that a reverse-connection fault occurs in the photovoltaic string PV1, in the loop formed by the photovoltaic string PV1 and the photovoltaic string PV2, four protection switches K2, K1, K6, and K5 are used to disconnect the photovoltaic string PV1 and the photovoltaic string PV2. The loop formed by the photovoltaic string PV1 and the photovoltaic string PV2 is: the positive electrode PV2+ of the photovoltaic string PV2→the protection switch K2→the protection switch K1→the positive electrode PV1+ of the photovoltaic string PV1→the negative electrode PV1− of the photovoltaic string PV1→the protection switch K6→the negative electrode BUS− of the direct current bus→the protection switch K5→the negative electrode PV2− of the photovoltaic string PV2.

Exemplarily, referring to FIG. 5b, it is assumed that a reverse-connection fault occurs in the photovoltaic string PV7, in a loop formed by the photovoltaic string PV6 and the photovoltaic string PV7, four protection switches K6, K7, K4, and K5 are used to disconnect the photovoltaic string PV6 and the photovoltaic string PV7. The loop formed by the photovoltaic string PV6 and the photovoltaic string PV7 is: a positive electrode PV6+ of the photovoltaic string PV6→the protection switch K6→the protection switch K7→a positive electrode PV7+ of the photovoltaic string PV7→a negative electrode PV7− of the photovoltaic string PV7→the protection switch K4→the negative electrode BUS− of the direct current bus→the protection switch K5→a negative electrode PV6− of the photovoltaic string PV6.

It should be noted that other cases will not be described in detail herein. In addition, two power conversion units and two protection switch units are each used as examples for description, but they cannot be used as a limitation on the present disclosure, including the examples mentioned below, both for ease of description.

The following further analyzes how the fault protection device can reduce the number of protection switches without increasing the withstand voltage level of the protection switch, i.e., in a case where the protection switch with a low cost can continue to be used in combination with the accompanying drawings, thereby reducing the cost and volume of the protection switch unit. In order to be able to form a comparison with the related art, as an example, two power conversion units such as the DC-DC converter, two protection switch units, and each protection switch unit are connected to five photovoltaic strings below for description.

Figure 7A:
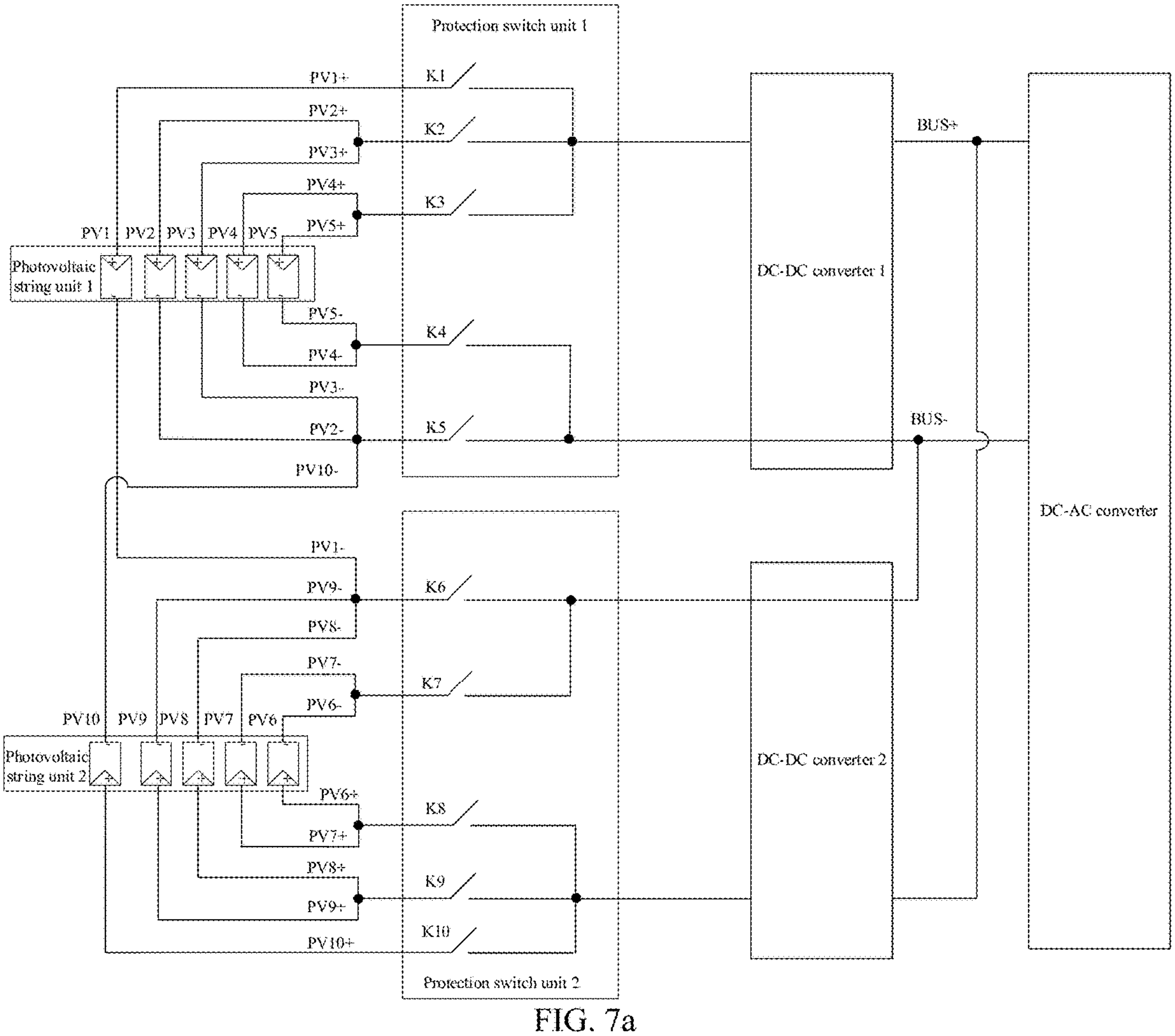
FIG. 7*a* to FIG. 7*g* are schematic diagrams of protection switch units corresponding to two co-negative power conversion units being connected to photovoltaic string units according to some other embodiments of the present disclosure.

Referring to FIG. 7a, a DC-DC converter 1 and a DC-DC converter 2 are co-negative. Moreover, each of the protection switch K5 and the protection switch K6 is shared. Since each of the protection switch K5 and the protection switch K6 is shared, only ten protection switches need to be used. Compared with the twelve direct current switches illustrated in FIG. 2, the number of the protection switches is reduced, thereby lowering the cost of the protection switch and further lowering the cost and volume of the protection switch unit. In this way, by sharing the protection switch, the cost and volume of the protection switch unit can be lowered.

In addition, when a reverse-connection fault occurs in any one photovoltaic string, the loop formed by the photovoltaic string with the occurrence of a reverse-connection fault and the photovoltaic string without the occurrence of a reverse-connection fault, the photovoltaic string with the occurrence of a reverse-connection fault and the photovoltaic string without the occurrence of a reverse-connection fault are disconnected through 0 or 4 protection switches. Therefore, the low-voltage protection switch with a low cost can be used. For example, when a reverse-connection fault occurs in the photovoltaic string PV1, in the loop formed by the photovoltaic string PV1 and the photovoltaic string PV2, the protection switch K2, protection switch K1, protection switch K6, and protection switch K5 are used to disconnect the photovoltaic string PV1 and the photovoltaic string PV2; and so on. In this way, when the protection switch units corresponding to the co-negative power conversion units are disconnected, the corresponding photovoltaic strings are disconnected through the at least three protection switches. Therefore, the low-voltage protection switch with a low cost can continue to be used. However, as illustrated in FIG. 3*a* and FIG. 3*b*, the low-voltage protection switch with a low cost cannot be used.

In addition, after the protection switch unit is disconnected, the at most two photovoltaic strings in each of the corresponding photovoltaic string are connected in parallel. For example, the photovoltaic string PV2 and the photovoltaic string PV3 are connected in parallel. The photovoltaic string PV4 and the photovoltaic string PV5 are connected in parallel. The photovoltaic string PV6 and the photovoltaic string PV7 are connected in parallel. The photovoltaic string PV8 and the photovoltaic string PV9 are connected in parallel. Therefore, when a reverse-connection fault occurs in any one photovoltaic string, a current outputted by a photovoltaic string connected in parallel with the any one photovoltaic string is also within a withstand range of the photovoltaic string where the reverse-connection fault occurs, without damaging the photovoltaic string. For example, when a reverse-connection fault occurs in the photovoltaic string PV2, a current outputted by the photovoltaic string PV3 does not damage the photovoltaic string PV2 and is within a withstand range of the photovoltaic string PV2. In this way, after the protection switch unit is disconnected, the at most two photovoltaic strings in the corresponding photovoltaic string unit are connected in parallel, which can ensure the safety of the photovoltaic string.

Figure 8A:
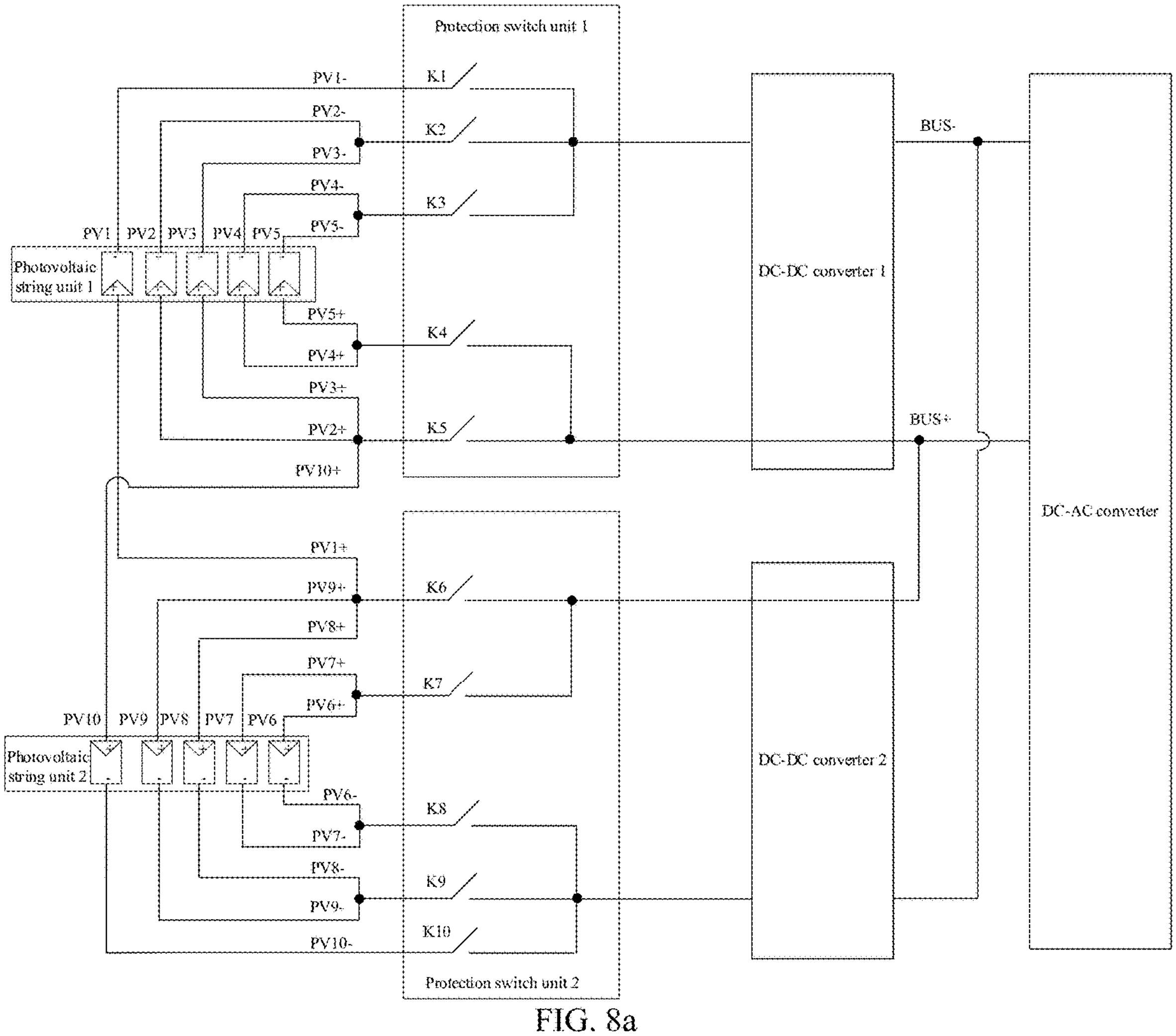
FIG. 8*a* to FIG. 8*g* are schematic diagrams of protection switch units corresponding to two co-positive power conversion units being connected to photovoltaic string units according to some other embodiments of the present disclosure.

It should be noted that FIG. 8*a* is a case where the DC-DC converter 1 and the DC-DC converter 2 are co-positive. The specific analysis may refer to a case where the DC-DC converter 1 and the DC-DC converter 2 are co-negative illustrated in FIG. 7*a*, and will not be described herein.

Based on the above analysis, the number of the protection switches can be lowered in a case where the low-cost protection switch continues to be used by sharing the protection switch or disconnecting the corresponding photovoltaic strings through the at least three protection switches when the protection switch units corresponding to the co-positive power conversion units or the co-negative power conversion units are disconnected. Further, the cost and the volume of the protection switch unit are lowered. Meanwhile, after the protection switch units are disconnected, the at most two photovoltaic strings in each of the corresponding photovoltaic string units are allowed to connected in parallel, which can improve the safety of the photovoltaic string.

In some embodiments, each protection switch unit includes at least two positive connection terminals and at least two negative connection terminals. Each positive connection terminal is adapted to be connected to the at most two photovoltaic strings of a photovoltaic string unit corresponding to a power conversion unit. Each negative connection terminal is adapted to be connected to the at most two photovoltaic strings of a photovoltaic string unit corresponding to a power conversion unit.

It should be noted that the positive connection terminal of the protection switch unit refers to an end connected to the positive electrode of the photovoltaic string. The negative connection terminal of the protection switch unit refers to an end connected to the negative electrode of the photovoltaic string.

When the protection switch is not shared, each protection switch unit includes at least two positive connection terminals and at least two negative connection terminals. Each positive connection terminal and each negative connection terminal are adapted to be connected to one or two photovoltaic strings of a photovoltaic string unit corresponding to a power conversion unit, so that when the protection switch unit is disconnected, the at most two photovoltaic strings in the corresponding photovoltaic string units are connected in parallel, thereby improving the safety of the photovoltaic string.

Exemplarily, referring to FIG. 7*a*, when each of the protection switch K5 and the protection switch K6 is not shared, the protection switch unit 1 includes three positive connection terminals and three negative connection terminals (one negative connection terminal is further required to be connected to the negative electrode PV1− of the photovoltaic string PV1 when each of the protection switch K5 and the protection switch K6 is not shared), and the protection switch unit 2 includes three positive connection terminals and three negative connection terminals (one negative connection terminal is further required to be connected to a negative electrode PV10− of the photovoltaic string PV10 when each of the protection switch K5 and the protection switch K6 is not shared). Moreover, a part of the positive connection terminals is connected to a positive electrode of one photovoltaic string. A part of the negative connection terminals is connected to the positive electrodes of the two photovoltaic strings. A part of the negative connection terminals is connected to a negative electrode of one photovoltaic string. A part of the negative connection terminals is connected to the negative electrodes of the two photovoltaic strings. Based on the connection relationship, after the protection switch unit 1 and the protection switch unit 2 are disconnected, there exists the photovoltaic string PV2 and the photovoltaic string PV3 being connected in parallel, the photovoltaic string PV4 and the photovoltaic string PV5 being connected in parallel, the photovoltaic string PV6 and the photovoltaic string PV7 being connected in parallel, and the photovoltaic string PV8 and the photovoltaic string PV9 being connected in parallel. Since there are at most two photovoltaic strings in each photovoltaic string unit are connected in parallel, when a reverse-connection fault occurs in any one photovoltaic string, only the current of one normal photovoltaic string flows into the faulty photovoltaic string, which does not exceed the range that the faulty photovoltaic string can withstand. Therefore, the faulty photovoltaic string cannot be damaged, thereby improving the safety of the photovoltaic string.

In this way, each positive connection terminal is adapted to be connected to the at most two photovoltaic strings of a photovoltaic string unit corresponding to a power conversion unit. Each negative connection terminal is adapted to be connected to the at most two photovoltaic strings of a photovoltaic string unit corresponding to a power conversion unit, which can improve the safety of the photovoltaic string.

In some embodiments, in the protection switch units corresponding to the co-negative power conversion units, the at least one negative connection terminal is adapted to connect the photovoltaic strings in different photovoltaic string units, such that the protection switch units corresponding to the co-negative power conversion units share the protection switches when connected to their corresponding photovoltaic string units.

That is, for the co-negative power conversion units, the sharing of the protection switch can be achieved by connecting a negative connection terminal of the protection switch unit to photovoltaic strings in different photovoltaic string units, so as to reduce the number of protection switches. During connection, it can be that one or more negative connection terminals are connected to the photovoltaic strings in different photovoltaic string units, to achieve sharing of one or more protection switches.

Exemplarily, referring to FIG. 7*a*, the power conversion unit 1 includes a DC-DC converter 1, and the power conversion unit 2 includes a DC-DC converter 2. The DC-DC converter 1 and the DC-DC converter 2 are co-negative, i.e., the power conversion unit 1 and the power conversion unit 2 are co-negative, and the protection switch units corresponding to the power conversion unit 1 and power conversion unit 2 that are co-negative are the protection switch unit 1 and the protection switch unit 2. A negative connection terminal of the protection switch unit 1 corresponding to the protection switch K5 is connected to the photovoltaic string PV2 and the photovoltaic string PV3 in the photovoltaic string unit 1 and the photovoltaic string PV10 in the photovoltaic string unit 2. The negative connection terminal of the protection switch unit 2 corresponding to the protection switch K6 is connected to the photovoltaic string PV8 and the photovoltaic string PV9 in the photovoltaic string unit 2 and the photovoltaic string PV1 in the photovoltaic string unit 1. The protection switch K5 and the protection switch K6 are shared by the photovoltaic string unit 1 and the photovoltaic string unit 2. Compared with no sharing of the protection switch K5 and the protection switch K6, two protection switches are reduced, and the number of the protection switches is reduced.

Figure 7B:
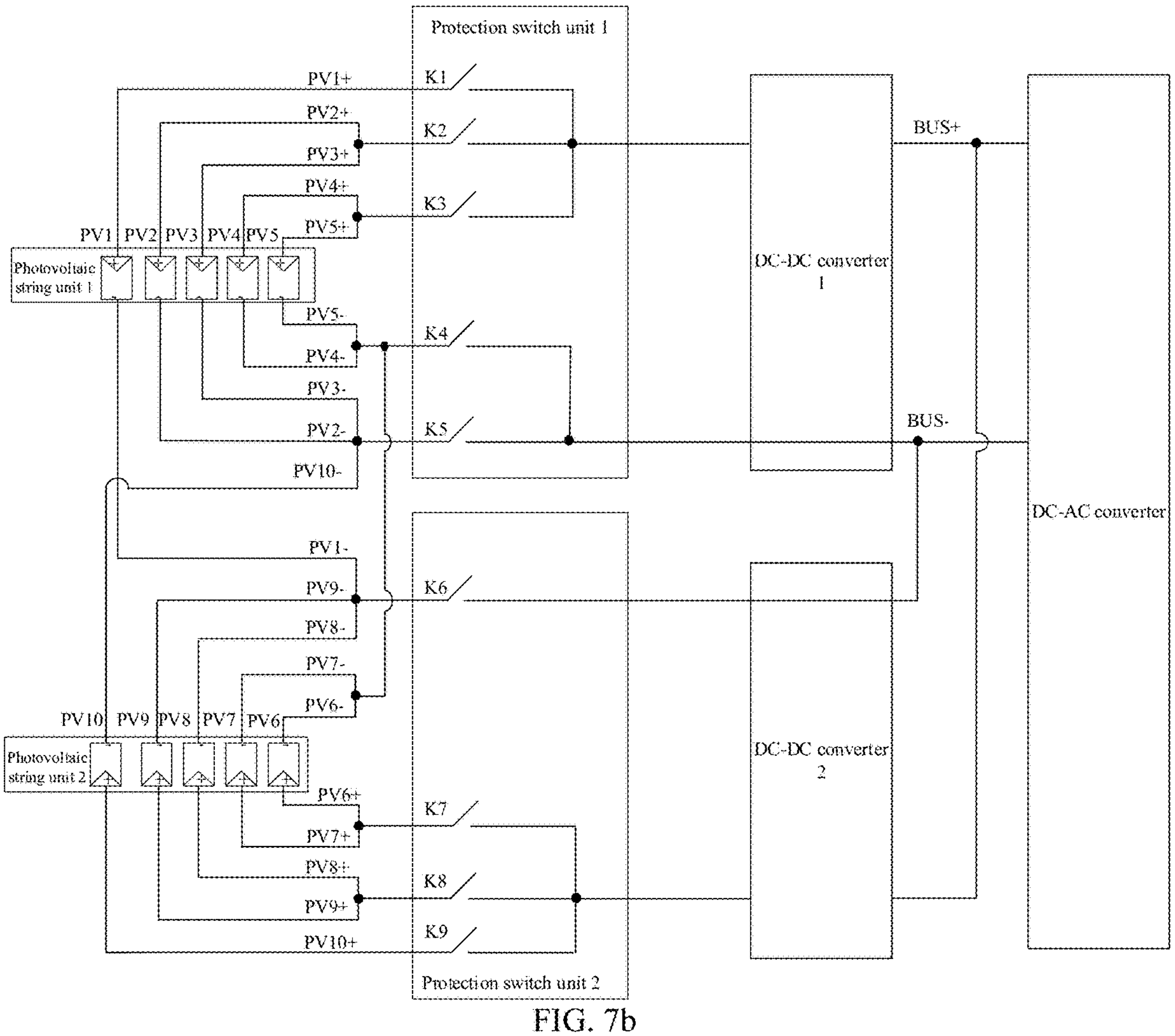

Exemplarily, referring to FIG. 7*b*, in the protection switch unit 1, the negative connection terminal of the protection switch unit 1 corresponding to the protection switch K5 is connected to the photovoltaic string PV2 and the photovoltaic string PV3 in the photovoltaic string unit 1 and the photovoltaic string PV10 in the photovoltaic string unit 2. The negative connection terminal of the protection switch unit 1 corresponding to the protection switch K4 is connected to the photovoltaic string PV4 and the photovoltaic string PV5 in the photovoltaic string unit 1 and the photovoltaic string PV6 and the photovoltaic string PV7 in the photovoltaic string unit 2 in the protection switch unit 2. In the protection switch unit 2, the negative connection terminal of the protection switch unit 2 corresponding to the protection switch K6 is connected to the photovoltaic string PV8 and the photovoltaic string PV9 in the photovoltaic string unit 2 and the photovoltaic string PV1 in the photovoltaic string unit 1. The protection switch K4, protection switch K5, and protection switch K6 are shared by the photovoltaic string unit 1 and the photovoltaic string unit 2. Compared with no sharing of the protection switch K4, protection switch K5, and protection switch K6, three protection switches are reduced, and the number of the protection switches is reduced. Compared with the sharing of FIG. 7*a*, one additional protection switch is reduced, and the number of protection switches is further reduced.

In this way, for the co-negative power conversion units, the number of the protection switches can be reduced by connecting the photovoltaic strings in different photovoltaic string units through one or more negative connection terminals of the corresponding protection switch units, thereby reducing the cost and volume of the protection switch unit.

In some embodiments, when the co-negative power conversion units include a first power conversion unit and a second power conversion unit, one of the at least two negative connection terminals is adapted to be connected to two parallel photovoltaic strings corresponding to the first power conversion unit and one photovoltaic string corresponding to the second power conversion unit; or one of the at least two negative connection terminals is adapted to be connected to two parallel photovoltaic strings corresponding to the first power conversion unit and two parallel photovoltaic strings corresponding to the second power conversion unit; or one of the at least two negative connection terminals is adapted to be connected to one photovoltaic string corresponding to the first power conversion unit and one photovoltaic string corresponding to the second power conversion unit.

In an exemplary embodiment of the present disclosure, each protection switch unit includes at least two negative connection terminals. Each negative connection terminal is adapted to be connected to one or two photovoltaic strings of a photovoltaic string unit corresponding to one power conversion unit. Therefore, for the co-negative power conversion units, one or two photovoltaic strings of a photovoltaic string unit corresponding to one power conversion unit and one or two photovoltaic strings of a photovoltaic string unit corresponding to another power conversion unit can be connected to a same negative connection terminal, to achieve the sharing of the protection switch corresponding to the negative connection terminal, thereby realizing the sharing of the at least one protection switch, where there are various sharing manners of the protection switch.

Exemplarily, referring to FIG. 7*a*, the first power conversion unit may be a power conversion unit 1, and its corresponding photovoltaic strings are photovoltaic strings PV1, PV2, . . . , PV5 in the photovoltaic string unit 1. The second power conversion unit may be a power conversion unit 2, and its corresponding photovoltaic strings are photovoltaic strings PV6, PV7, . . . , PV10 in the photovoltaic string unit 2. When the protection switch is shared, in the protection switch unit 1, the negative connection terminal of the protection switch unit 1 corresponding to the protection switch K5 is connected to two parallel photovoltaic strings PV2 and PV3 corresponding to the power conversion unit 1 and one photovoltaic string PV10 corresponding to the power conversion unit 2. In this way, based on that one negative connection terminal is connected to two parallel photovoltaic strings corresponding to one power conversion unit and one photovoltaic string corresponding to another power conversion unit, the sharing of the protection switch K5 is achieved.

Exemplarily, referring to FIG. 7*b*, the first power conversion unit may be a power conversion unit 1, and its corresponding photovoltaic strings are photovoltaic strings PV1, PV2, . . . , PV5 in the photovoltaic string unit 1. The second power conversion unit may be a power conversion unit 2, and its corresponding photovoltaic strings are photovoltaic strings PV6, PV7, . . . , PV10 in the photovoltaic string unit 2. When the protection switch is shared, in the protection switch unit 1, the negative connection terminal of the protection switch unit 1 corresponding to the protection switch K4 is connected to two parallel photovoltaic strings PV4 and PV5 corresponding to the power conversion unit 1 and two parallel photovoltaic strings PV6 and PV7 corresponding to the power conversion unit 2. In this way, based on one negative connection terminal being connected to two parallel photovoltaic strings corresponding to one power conversion unit and two parallel photovoltaic strings corresponding to another power conversion unit, the sharing of the protection switch K4 is achieved.

Figure 7C:
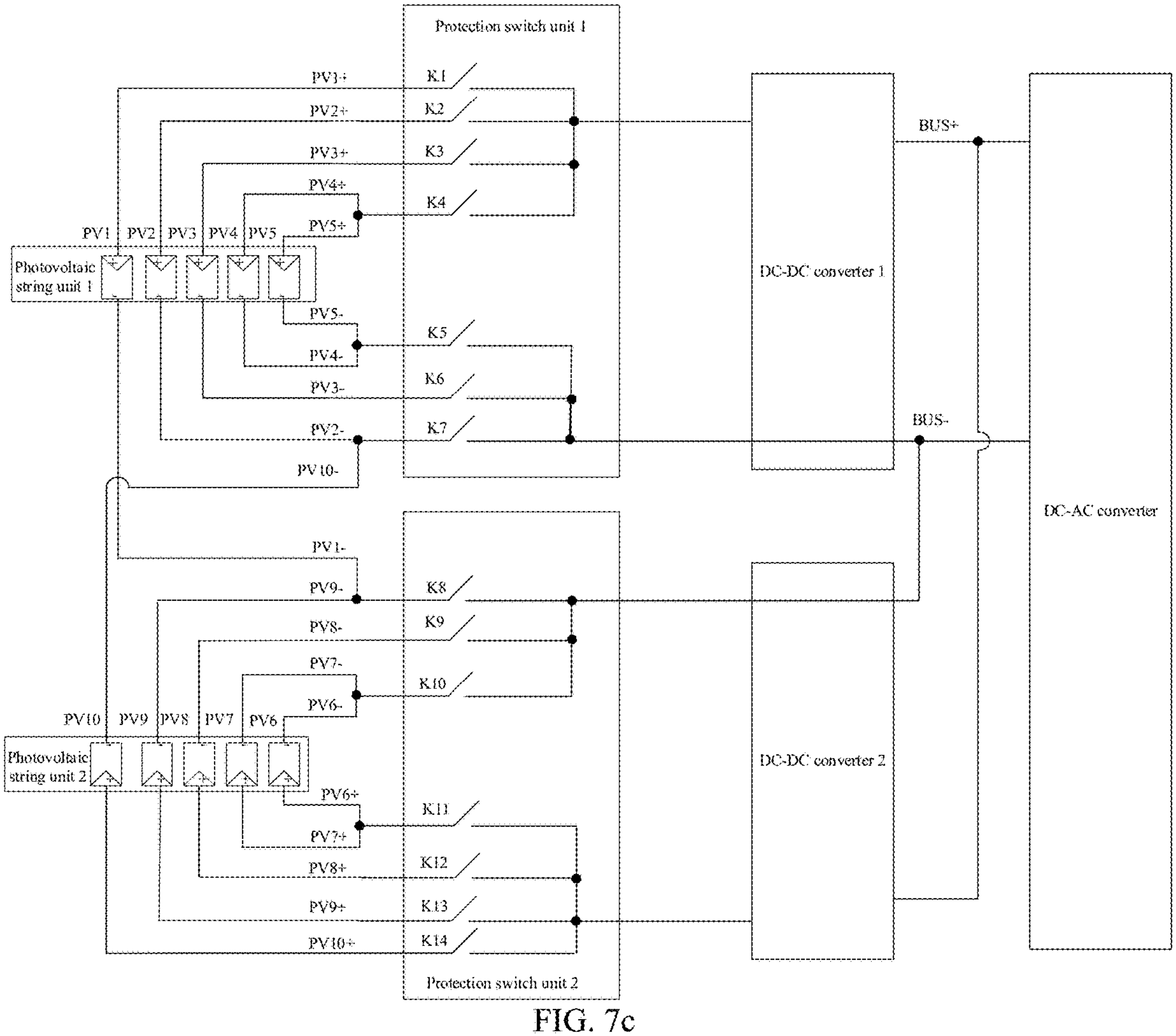

Exemplarily, referring to FIG. 7*c*, the first power conversion unit may be a power conversion unit 1, and its corresponding photovoltaic strings are photovoltaic strings PV1, PV2, . . . , PV5 in the photovoltaic string unit 1. The second power conversion unit may be a power conversion unit 2, and its corresponding photovoltaic strings are photovoltaic strings PV6, PV7, . . . , PV10 in the photovoltaic string unit 2. When the protection switch is shared, in the protection switch unit 1, the negative connection terminal of the protection switch unit 1 corresponding to the protection switch K7 is connected to one photovoltaic string PV2 corresponding to the power conversion unit 1 and one photovoltaic string PV10 corresponding to the power conversion unit 2. In this way, based on one negative connection terminal being connected to one photovoltaic string corresponding to one power conversion unit and one photovoltaic string corresponding to another power conversion unit, the sharing of the protection switch K7 is achieved.

In this way, for the co-negative power conversion units, the sharing of at least one protection switch may be implemented in a variety of manners.

In some embodiments, when the co-negative power conversion units include a first power conversion unit and a second power conversion unit, one of the at least two negative connection terminals is adapted to be connected to one photovoltaic string corresponding to the first power conversion unit and one photovoltaic string corresponding to the second power conversion unit, and the other one of the at least two negative connection terminals is adapted to be connected to two parallel photovoltaic strings corresponding to the first power conversion unit and two parallel photovoltaic strings corresponding to the second power conversion unit; or one of the at least two negative connection terminals is adapted to be connected to one parallel photovoltaic string corresponding to the first power conversion unit and one photovoltaic string corresponding to the second power conversion unit, and the other one of the at least two negative connection terminals is adapted to be connected to one photovoltaic string corresponding to the first power conversion unit and two parallel photovoltaic strings corresponding to the second power conversion unit; or one of the at least two negative connection terminals is adapted to be connected to two parallel photovoltaic strings corresponding to the first power conversion unit and two parallel photovoltaic strings corresponding to the second power conversion unit, and the other one of the at least two negative connection terminals is adapted to be connected to one photovoltaic string corresponding to the first power conversion unit and two parallel photovoltaic strings corresponding to the second power conversion unit.

In an exemplary embodiment of the present disclosure, each protection switch unit includes at least two negative connection terminals. Each negative connection terminal is adapted to be connected to one or two photovoltaic strings of a photovoltaic string unit corresponding to one power conversion unit. Therefore, for the co-negative power conversion units, one or two photovoltaic strings of a photovoltaic string unit corresponding to one power conversion unit and one or two photovoltaic strings of a photovoltaic string unit corresponding to another power conversion unit can be connected to the same negative connection terminal, to achieve the sharing of the protection switch corresponding to the negative connection terminal, thereby realizing the sharing of the at least two protection switches, where there are various sharing manners of the protection switch.

Figure 7D:
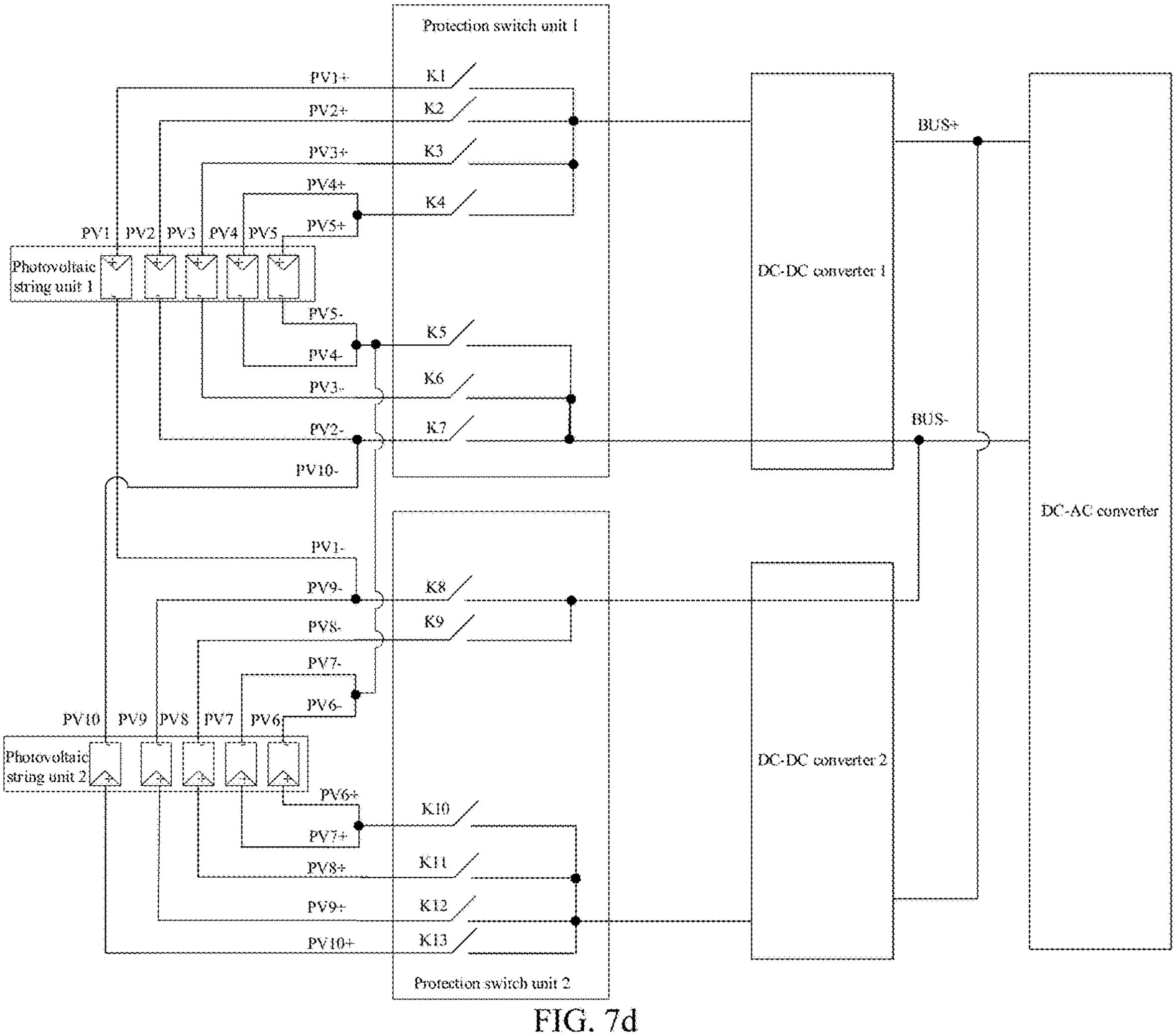

Exemplarily, referring to FIG. 7*d*, the first power conversion unit may be a power conversion unit 1, and its corresponding photovoltaic strings are photovoltaic strings PV1, PV2, . . . , PV5 in the photovoltaic string unit 1. The second power conversion unit may be a power conversion unit 2, and its corresponding photovoltaic strings are photovoltaic strings PV6, PV7, . . . , PV10 in the photovoltaic string unit 2. When the protection switch is shared, in the protection switch unit 1, the negative connection terminal of the protection switch unit 1 corresponding to the protection switch K7 is connected to one photovoltaic string PV2 corresponding to the power conversion unit 1 and one photovoltaic string PV10 corresponding to the power conversion unit 2, and the negative connection terminal of the protection switch unit 1 corresponding to the protection switch K5 is connected to two parallel photovoltaic strings PV4 and PV5 corresponding to the power conversion unit 1 and two parallel photovoltaic strings PV6 and PV7 corresponding to the power conversion unit 2. In this way, based on that one negative connection terminal is connected to one photovoltaic string corresponding to one power conversion unit and one photovoltaic string corresponding to another power conversion unit and that another negative connection terminal is connected to two parallel photovoltaic strings corresponding to one power conversion unit and two parallel photovoltaic strings corresponding to another power conversion unit, the sharing of the protection switch K7 and the protection switch K5 is achieved.

Figure 7E:
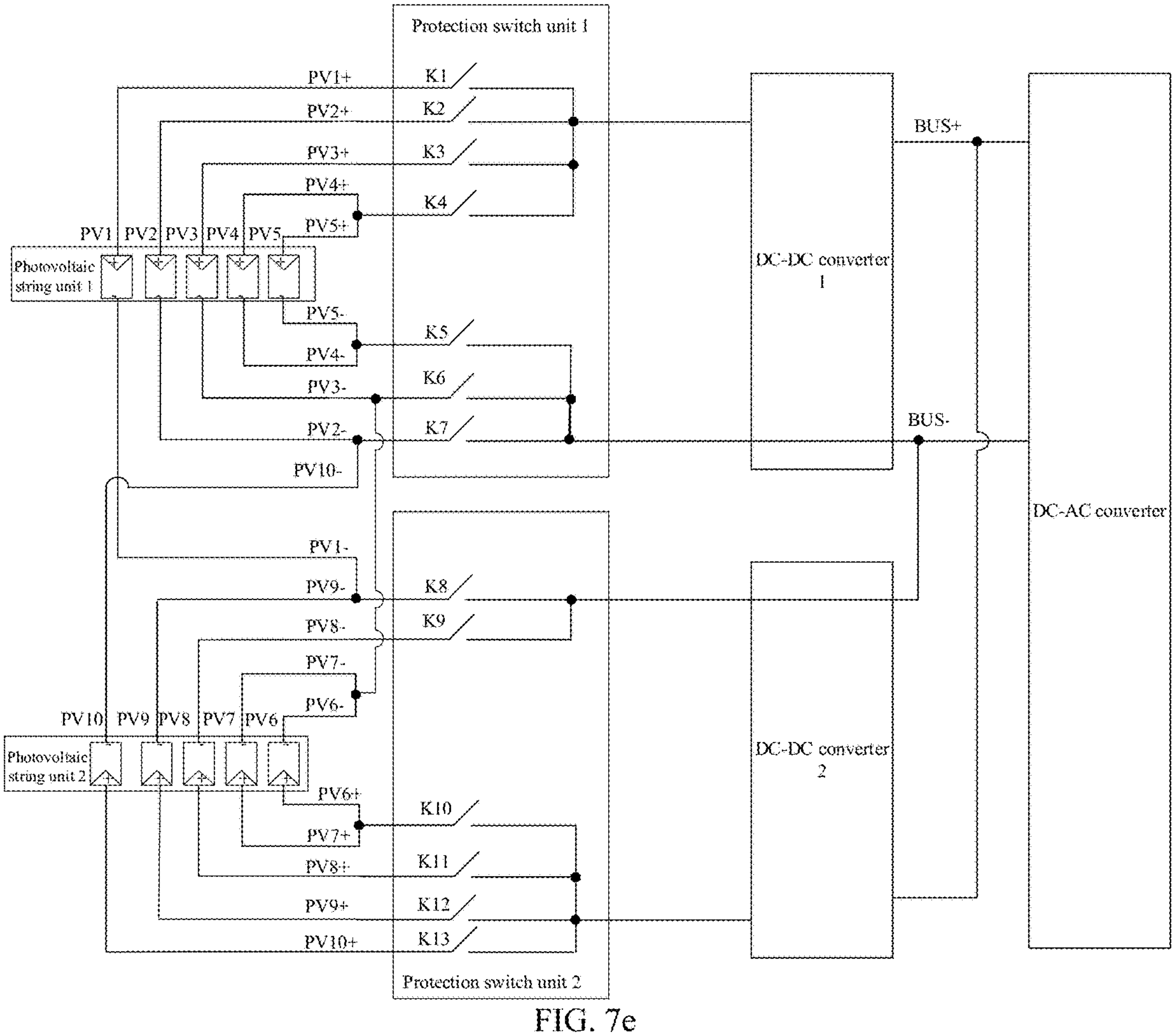

Exemplarily, referring to FIG. 7*e*, the first power conversion unit may be a power conversion unit 1, and its corresponding photovoltaic strings are photovoltaic strings PV1, PV2, . . . , PV5 in the photovoltaic string unit 1. The second power conversion unit may be a power conversion unit 2, and its corresponding photovoltaic strings are photovoltaic strings PV6, PV7, . . . , PV10 in the photovoltaic string unit 2. When the protection switch is shared, in the protection switch unit 1, the negative connection terminal of the protection switch unit 1 corresponding to the protection switch K7 is connected to one photovoltaic string PV2 corresponding to the power conversion unit 1 and one photovoltaic string PV10 corresponding to the power conversion unit 2, and the negative connection terminal of the protection switch unit 1 corresponding to the protection switch K6 is connected to one photovoltaic strings PV3 corresponding to the power conversion unit 1 and the two parallel photovoltaic strings PV6 and PV7 corresponding to the power conversion unit 2. In this way, based on that one negative connection terminal is connected to one photovoltaic string corresponding to one power conversion unit and one photovoltaic string corresponding to another power conversion unit and that another negative connection terminal is connected to one photovoltaic string corresponding to one power conversion unit and two parallel photovoltaic strings corresponding to another power conversion unit, the sharing of the protection switch K7 and the protection switch K6 is achieved.

Figure 7F:
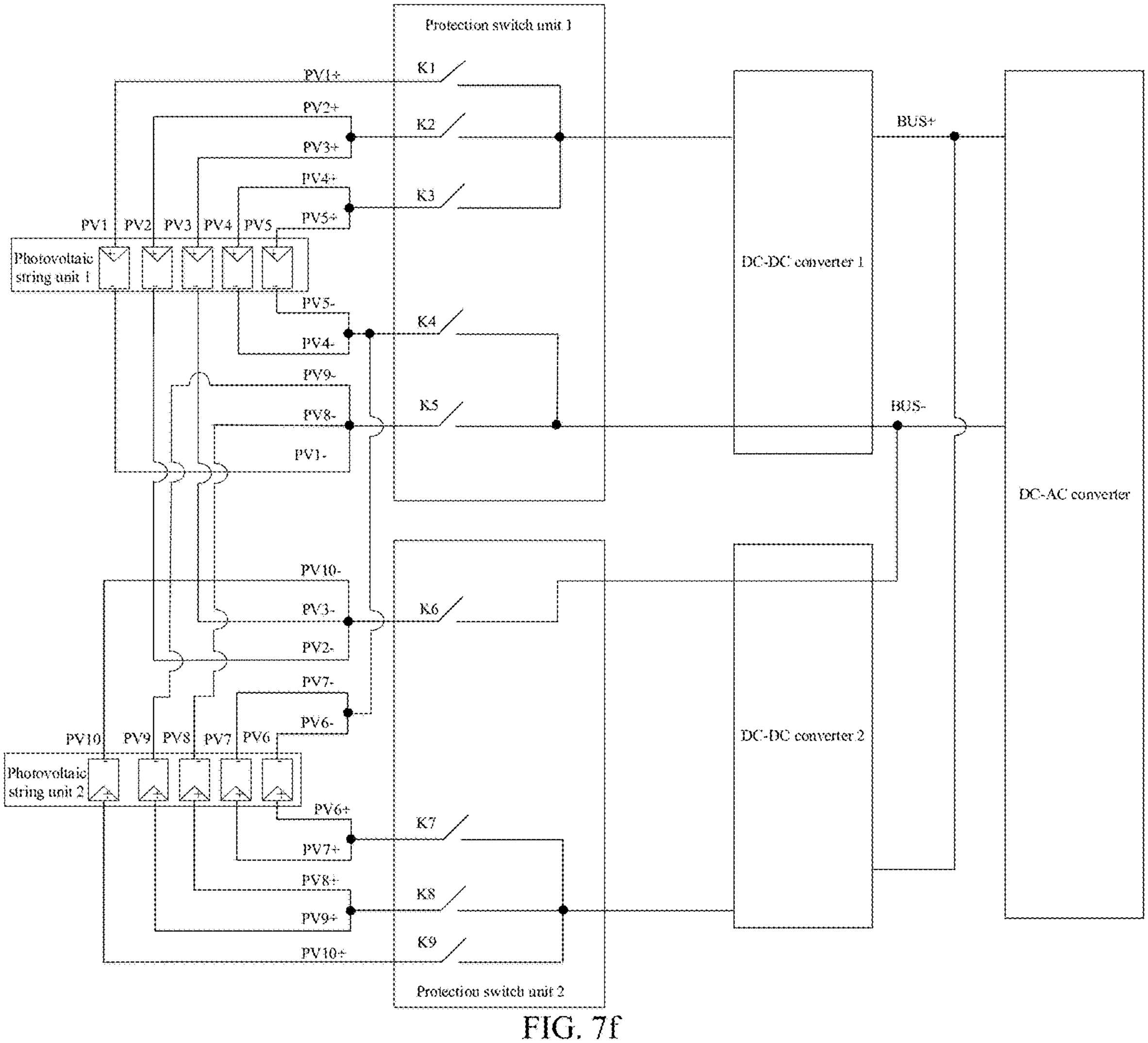

Exemplarily, referring to FIG. 7*f*, the first power conversion unit may be a power conversion unit 1, and its corresponding photovoltaic strings are photovoltaic strings PV1, PV2, . . . , PV5 in the photovoltaic string unit 1. The second power conversion unit may be a power conversion unit 2, and its corresponding photovoltaic strings are photovoltaic strings PV6, PV7, . . . , PV10 in the photovoltaic string unit 2. When the protection switch is shared, in the protection switch unit 1, the negative connection terminal of the protection switch unit 1 corresponding to the protection switch K4 is connected to the two parallel photovoltaic strings PV4 and PV5 corresponding to the power conversion unit 1 and two parallel photovoltaic strings PV6 and PV7 corresponding to the power conversion unit 2, and the negative connection terminal of the protection switch unit 1 corresponding to the protection switch K6 is connected to the one photovoltaic strings PV1 corresponding to the power conversion unit 1 and two parallel photovoltaic strings PV8 and PV9 corresponding to the power conversion unit 2. In this way, based on that one negative connection terminal is connected to two parallel photovoltaic strings corresponding to one power conversion unit and two parallel photovoltaic strings corresponding to another power conversion unit and that another negative connection terminal is connected to one photovoltaic string corresponding to one power conversion unit and two parallel photovoltaic strings corresponding to another power conversion unit, the sharing of the protection switch K4 and the protection switch K6 is achieved.

In this way, for the co-negative power conversion units, the sharing of at least two protection switches may be implemented in a variety of manners.

In some embodiments, when the co-negative power conversion units include a first power conversion unit and a second power conversion unit, and there are at least three negative connection terminals. A first negative connection terminal of the at least three negative connection terminals is adapted to be connected to two parallel photovoltaic strings corresponding to the first power conversion unit and two parallel photovoltaic strings corresponding to the second power conversion unit. A second negative connection terminal of the at least three negative connection terminals is adapted to be connected to one photovoltaic string corresponding to the first power conversion unit and two parallel photovoltaic strings corresponding to the second power conversion unit. A third negative connection terminal of the at least three negative connection terminals is adapted to be connected to one photovoltaic string corresponding to the first power conversion unit and one photovoltaic string corresponding to the second power conversion unit.

In an exemplary embodiment of the present disclosure, each protection switch unit includes at least three negative connection terminals. Each negative connection terminal is adapted to be connected to one or two photovoltaic strings of a photovoltaic string unit corresponding to one power conversion unit. Therefore, for the co-negative power conversion units, one or two photovoltaic strings of a photovoltaic string unit corresponding to one power conversion unit and one or two photovoltaic strings of a photovoltaic string unit corresponding to another power conversion unit can be connected to the same negative connection terminal, to achieve the sharing of the protection switch corresponding to the negative connection terminal, thereby realizing the sharing of the at least three protection switches.

Figure 7G:
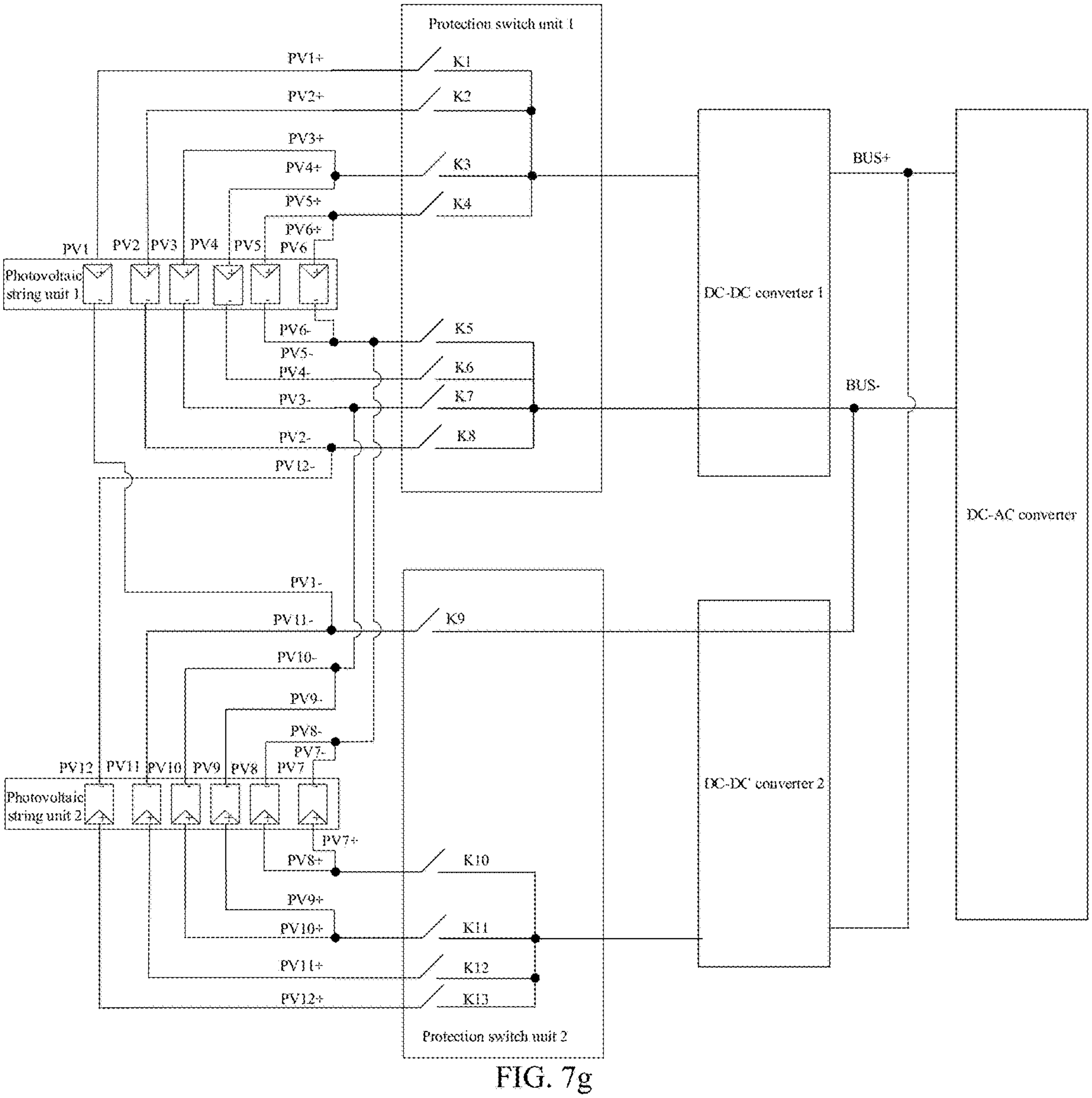

Exemplarily, referring to FIG. 7*g*, the first power conversion unit may be a power conversion unit 1, and its corresponding photovoltaic strings are photovoltaic strings PV1, PV2, . . . , PV6 in the photovoltaic string unit 1. The second power conversion unit may be a power conversion unit 2, and its corresponding photovoltaic strings are photovoltaic strings PV7, PV8, . . . , PV12 in the photovoltaic string unit 2. When the protection switch is shared, in the protection switch unit 1, the negative connection terminal of the protection switch unit 1 corresponding to the protection switch K5 is connected to two parallel photovoltaic strings PV5 and PV6 corresponding to the power conversion unit 1 and two parallel photovoltaic strings PV7 and PV8 corresponding to the power conversion unit 2, the negative connection terminal of the protection switch unit 1 corresponding to the protection switch K7 is connected to one photovoltaic string PV3 corresponding to the power conversion unit 1 and two parallel photovoltaic strings PV9 and PV10 corresponding to the power conversion unit 2, and the negative connection terminal of the protection switch unit 1 corresponding to the protection switch K8 is connected to one photovoltaic string PV2 corresponding to the power conversion unit 1 and one photovoltaic string PV12 corresponding to the power conversion unit 2. In this way, sharing of the protection switch K5, the protection switch K7, and the protection switch K8 is realized based on a connection relationship between the three negative connection terminals and the photovoltaic strings corresponding to the two power conversion units.

In this way, for the co-negative power conversion units, the sharing of at least three protection switches may be implemented in a variety of manners.

In some embodiments, in the protection switch units corresponding to the co-positive power conversion units, at least one positive connection terminal is adapted to be connected to photovoltaic strings in different photovoltaic string units, allowing such that the protection switch units corresponding to the co-positive power conversion units share a protection switch when connected to their corresponding photovoltaic string units.

That is, for the co-positive power conversion units, the sharing of the protection switch can be realized by connecting the positive connection terminal of the protection switch unit to the photovoltaic strings in different photovoltaic string units, to reduce the number of protection switches. During connection, it can be that one or more positive connection terminals are connected to the photovoltaic strings in different photovoltaic string units, to achieve the sharing of one or more protection switches Exemplarily, referring to FIG. 8*a*, the power conversion unit 1 includes a DC-DC converter 1, the power conversion unit 2 includes a DC-DC converter 2, and the DC-DC converter 1 and the DC-DC converter 2 are co-positive, i.e., the power conversion unit 1 and the power conversion unit 2 are co-positive, and the protection switch units corresponding to the power conversion unit 1 and power conversion unit 2 that are co-positive are the protection switch unit 1 and the protection switch unit 2. The positive connection terminal of the protection switch unit 1 corresponding to the protection switch K5 is connected to the photovoltaic string PV2 and the photovoltaic string PV3 in the photovoltaic string unit 1 and the photovoltaic string PV10 in the photovoltaic string unit 2. The positive connection terminal of the protection switch unit 2 corresponding to the protection switch K6 is connected to the photovoltaic string PV8 and the photovoltaic string PV9 in the photovoltaic string unit 2 and the photovoltaic string PV1 in the photovoltaic string unit 1. The protection switch K5 and the protection switch K6 are shared by the photovoltaic string unit 1 and the photovoltaic string unit 2. Compared with no sharing of the protection switch K5 and the protection switch K6, the two protection switches are reduced, and the number of the protection switches is reduced.

Figure 8B:
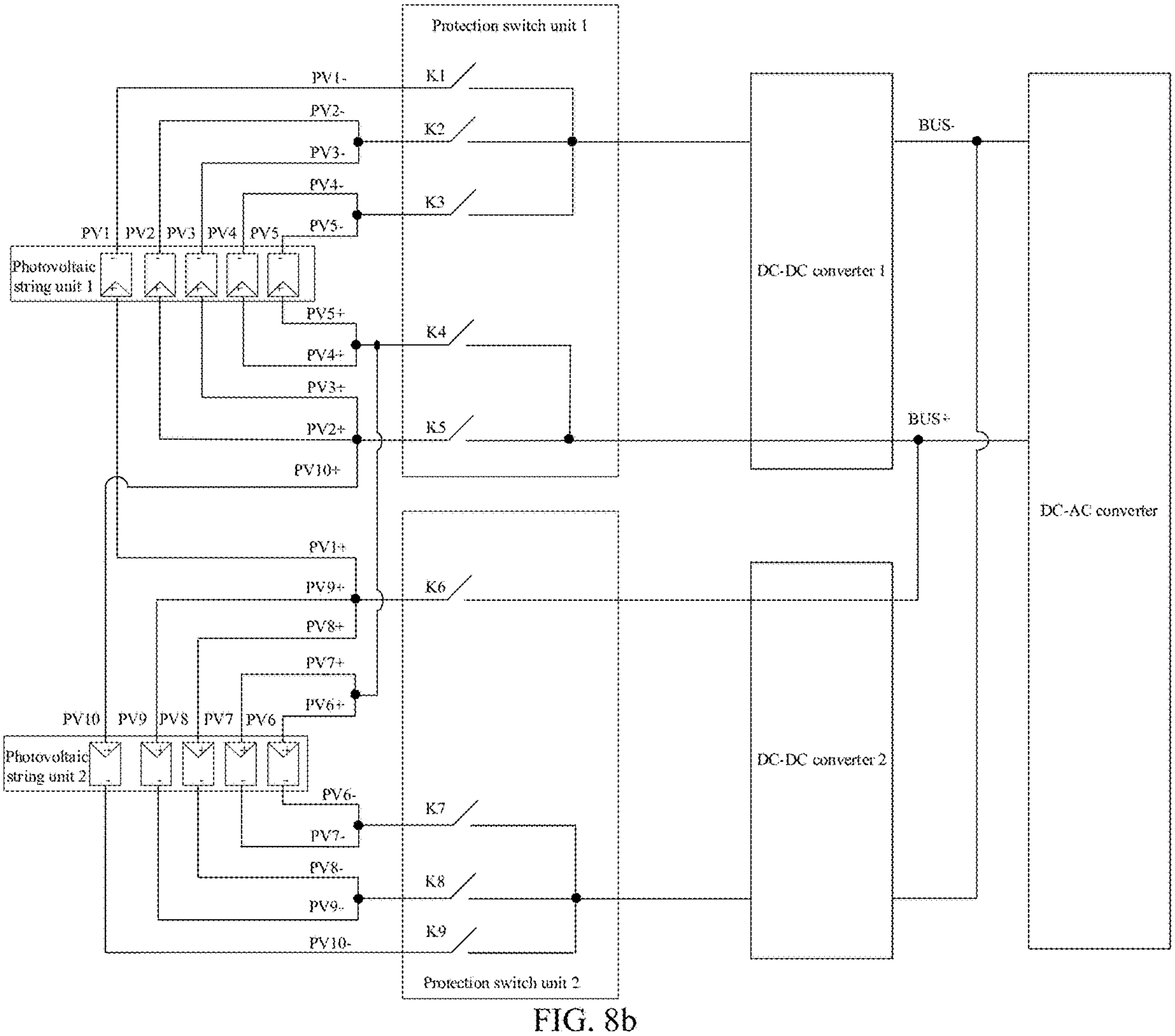

Exemplarily, referring to FIG. 8*b*, in the protection switch unit 1, the positive connection terminal of the protection switch unit 1 corresponding to the protection switch K5 is connected to the photovoltaic string PV2 and the photovoltaic string PV3 in the photovoltaic string unit 1 and the photovoltaic string PV10 in the photovoltaic string unit 2. The positive connection terminal of the protection switch unit 1 corresponding to the protection switch K4 is connected to the photovoltaic string PV4 and the photovoltaic string PV5 in the photovoltaic string unit 1 and the photovoltaic string PV6 and the photovoltaic string PV7 in the photovoltaic string unit 2. In the protection switch unit 2, the positive connection terminal of the protection switch unit 2 corresponding to the protection switch K6 is connected to the photovoltaic string PV8 and the photovoltaic string PV9 in the photovoltaic string unit 2 and the photovoltaic string PV1 in the photovoltaic string unit 1. The protection switch K4, the protection switch K5, and the protection switch K6 are shared by the photovoltaic string unit 1 and the photovoltaic string unit 2. Compared with no sharing of the protection switch K4, the protection switch K5, and the protection switch K6, the three protection switches are reduced, and the number of the protection switches is reduced. Compared with the sharing of FIG. 8*a*, one additional protection switch is reduced, and the number of protection switches is further reduced.

In this way, for the co-positive power conversion units, the number of the protection switches can be reduced by connecting the photovoltaic strings in different photovoltaic string units through one or more positive connection terminals of the corresponding protection switch units, thereby reducing the cost and volume of the protection switch unit.

In some embodiments, when the co-positive power conversion units include a first power conversion unit and a second power conversion unit, one of the at least two positive connection terminals is adapted to be connected to two parallel photovoltaic strings corresponding to the first power conversion unit and one photovoltaic string corresponding to the second power conversion unit; or one of the at least two positive connection terminals is adapted to be connected to two parallel photovoltaic strings corresponding to the first power conversion unit and two parallel photovoltaic strings corresponding to the second power conversion unit; or one of the at least two positive connection terminals is adapted to be connected to one photovoltaic string corresponding to the first power conversion unit and one photovoltaic string corresponding to the second power conversion unit.

In an exemplary embodiment of the present disclosure, each protection switch unit includes at least two positive connection terminals. Each positive connection terminal is adapted to be connected to one or two photovoltaic strings of a photovoltaic string unit corresponding to one power conversion unit. Therefore, for the co-positive power conversion units, one or two photovoltaic strings of a photovoltaic string unit corresponding to one power conversion unit and one or two photovoltaic strings of a photovoltaic string unit corresponding to another power conversion unit can be connected to a same positive connection terminal, to achieve the sharing of the protection switch corresponding to the positive connection terminal, thereby realizing the sharing of the at least one protection switch, where there are various sharing manners of the protection switch.

Exemplarily, referring to FIG. 8*a*, the first power conversion unit may be a power conversion unit 1, and its corresponding photovoltaic strings are photovoltaic strings PV1, PV2, . . . , PV5 in the photovoltaic string unit 1. The second power conversion unit may be a power conversion unit 2, and its corresponding photovoltaic strings are photovoltaic strings PV6, PV7, . . . , PV10 in the photovoltaic string unit 2. When the protection switch is shared, in the protection switch unit 1, the positive connection terminal of the protection switch unit 1 corresponding to the protection switch K5 is connected to the two parallel photovoltaic strings PV2 and PV3 corresponding to the power conversion unit 1 and the one photovoltaic string PV10 corresponding to the power conversion unit 2. In this way, based on that one positive connection terminal is connected to two parallel photovoltaic strings corresponding to one power conversion unit and one photovoltaic string corresponding to another power conversion unit, the sharing of the protection switch K5 is achieved.

Exemplarily, referring to FIG. 8*b*, the first power conversion unit may be a power conversion unit 1, and its corresponding photovoltaic strings are photovoltaic strings PV1, PV2, . . . , PV5 in the photovoltaic string unit 1. The second power conversion unit may be a power conversion unit 2, and its corresponding photovoltaic strings are photovoltaic strings PV6, PV7, . . . , PV10 in the photovoltaic string unit 2. When the protection switch is shared, in the protection switch unit 1, the positive connection terminal of the protection switch unit 1 corresponding to the protection switch K4 is connected to the two parallel photovoltaic strings PV4 and PV5 corresponding to the power conversion unit 1 and the two parallel photovoltaic strings PV6 and PV7 corresponding to the power conversion unit 2. In this way, based on one positive connection terminal being connected to two parallel photovoltaic strings corresponding to one power conversion unit and two parallel photovoltaic strings corresponding to another power conversion unit, the sharing of the protection switch K4 is achieved.

Figure 8C:
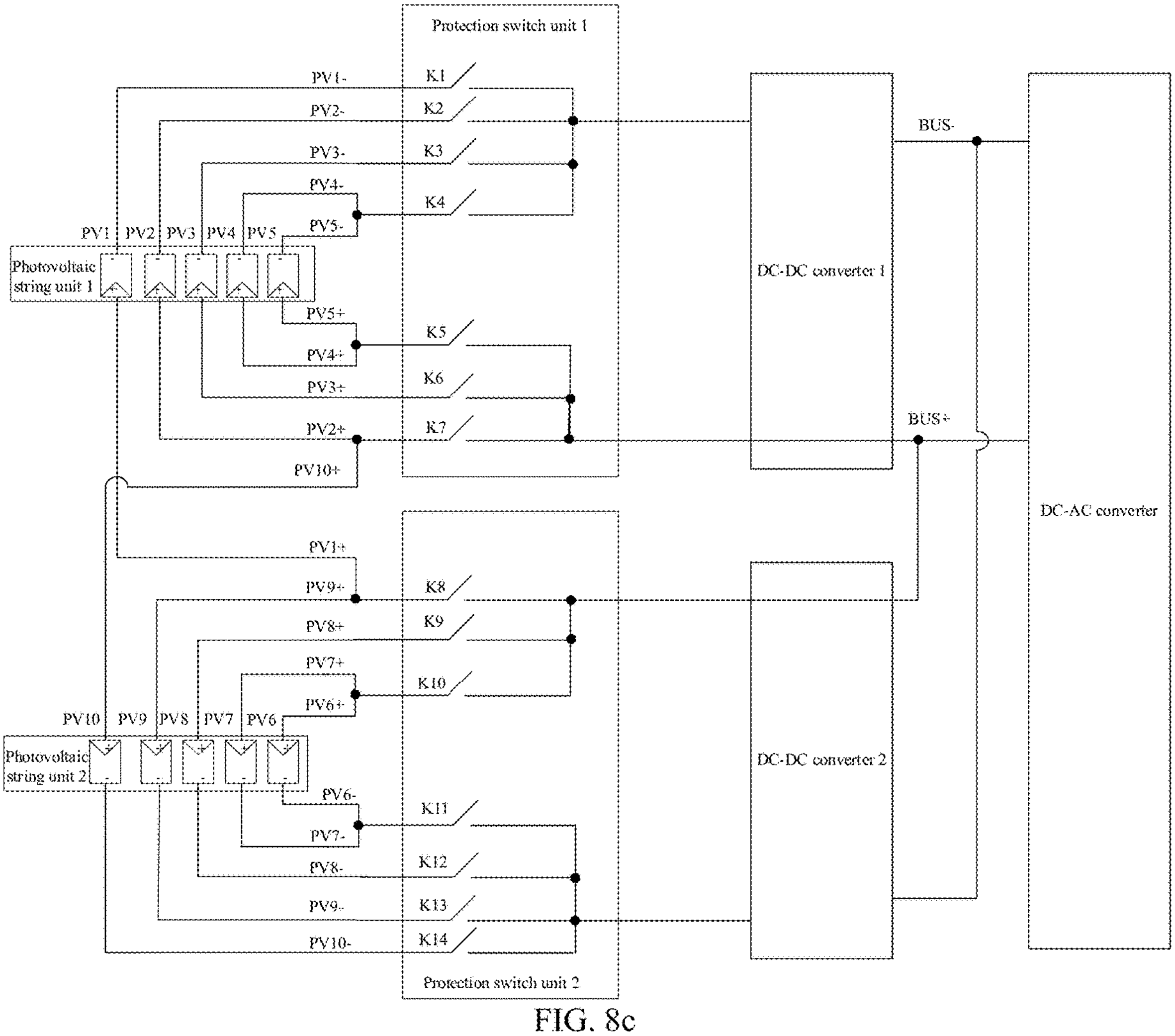

Exemplarily, referring to FIG. 8*c*, the first power conversion unit may be a power conversion unit 1, and its corresponding photovoltaic strings are photovoltaic strings PV1, PV2, . . . , PV5 in the photovoltaic string unit 1. The second power conversion unit may be a power conversion unit 2, and its corresponding photovoltaic strings are photovoltaic strings PV6, PV7, . . . , PV10 in the photovoltaic string unit 2. When the protection switch is shared, in the protection switch unit 1, the positive connection terminal of the protection switch unit 1 corresponding to the protection switch K7 is connected to one photovoltaic string PV2 corresponding to the power conversion unit 1 and one photovoltaic string PV10 corresponding to the power conversion unit 2. In this way, based on one positive connection terminal being connected to one photovoltaic string corresponding to one power conversion unit and one photovoltaic string corresponding to another power conversion unit, the sharing of the protection switch K7 is achieved.

In this way, for the co-positive power conversion units, the sharing of at least one protection switch may be implemented in a variety of manners.

In some embodiments, when the co-positive power conversion units include a first power conversion unit and a second power conversion unit, one of the at least two positive connection terminals is adapted to be connected to one photovoltaic string corresponding to the first power conversion unit and one photovoltaic string corresponding to the second power conversion unit, and the other one of the at least two positive connection terminals is adapted to be connected to two parallel photovoltaic strings corresponding to the first power conversion unit and two parallel photovoltaic strings corresponding to the second power conversion unit; or one of the at least two positive connection terminals is adapted to be connected to one parallel photovoltaic string corresponding to the first power conversion unit and one photovoltaic string corresponding to the second power conversion unit, and the other one of the at least two positive connection terminals is adapted to be connected to one photovoltaic string corresponding to the first power conversion unit and two parallel photovoltaic strings corresponding to the second power conversion unit; or one of the at least two positive connection terminals is adapted to be connected to two parallel photovoltaic strings corresponding to the first power conversion unit and two parallel photovoltaic strings corresponding to the second power conversion unit, and the other one of the at least two positive connection terminals is adapted to be connected to one photovoltaic string corresponding to the first power conversion unit and two parallel photovoltaic strings corresponding to the second power conversion unit.

In an exemplary embodiment of the present disclosure, each protection switch unit includes at least two positive connection terminals. Each positive connection terminal is adapted to be connected to one or two photovoltaic strings of a photovoltaic string unit corresponding to one power conversion unit. Therefore, for the co-positive power conversion units, one or two photovoltaic strings of a photovoltaic string unit corresponding to one power conversion unit and one or two photovoltaic strings of a photovoltaic string unit corresponding to another power conversion unit can be connected to the same positive connection terminal, to achieve the sharing of the protection switch corresponding to the positive connection terminal, thereby realizing the sharing of the at least two protection switches, where there are various sharing manners of the protection switch.

Figure 8D:
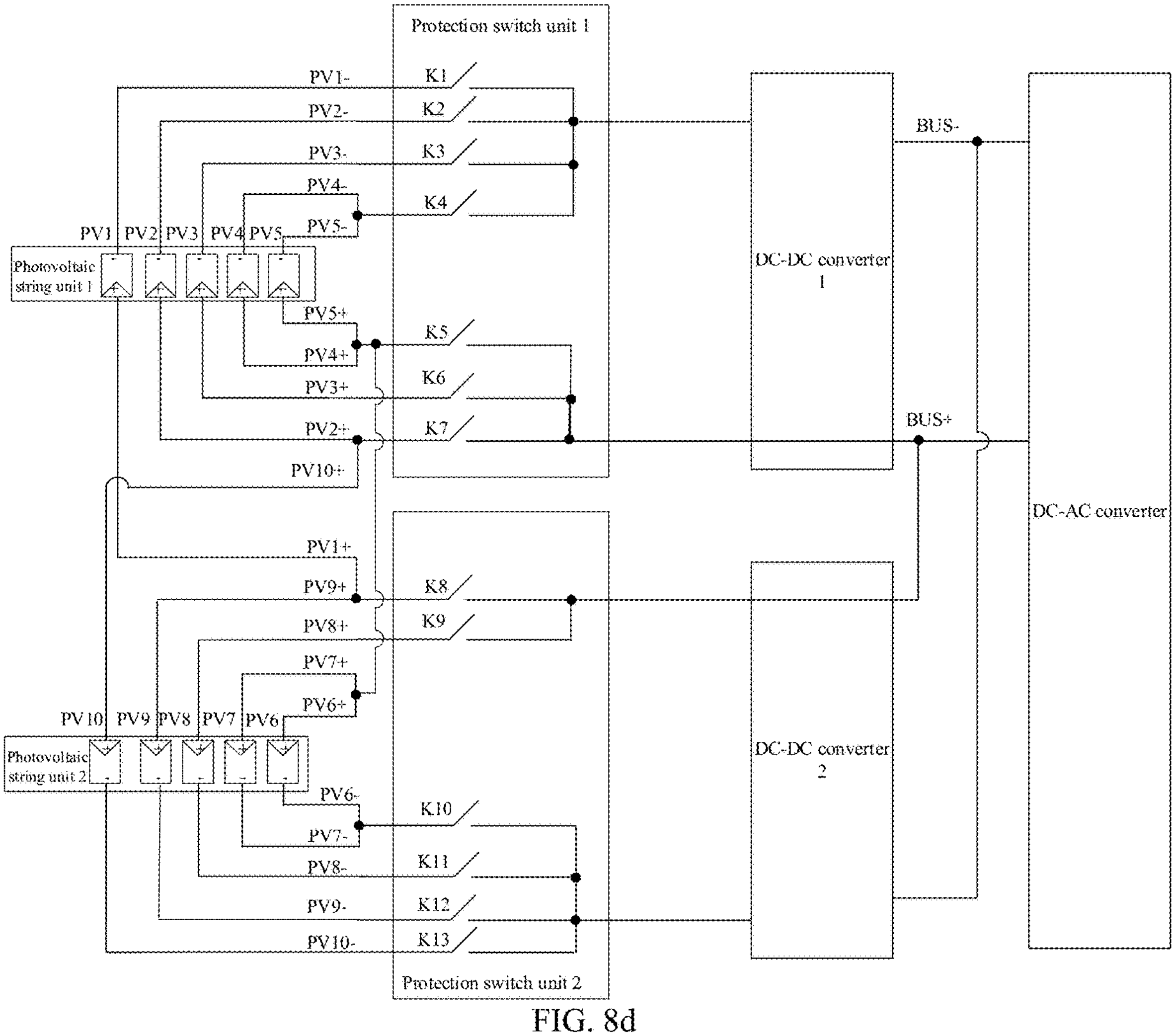

Exemplarily, referring to FIG. 8*d*, the first power conversion unit may be a power conversion unit 1, and its corresponding photovoltaic strings are photovoltaic strings PV1, PV2, . . . , PV5 in the photovoltaic string unit 1. The second power conversion unit may be a power conversion unit 2, and its corresponding photovoltaic strings are photovoltaic strings PV6, PV7, . . . , PV10 in the photovoltaic string unit 2. When the protection switch is shared, in the protection switch unit 1, the negative connection terminal of the protection switch unit 1 corresponding to the protection switch K7 is connected to one photovoltaic string PV2 corresponding to the power conversion unit 1 and one photovoltaic string PV10 corresponding to the power conversion unit 2, and the negative connection terminal of the protection switch unit 1 corresponding to the protection switch K5 is connected to the two parallel photovoltaic strings PV4 and PV5 corresponding to the power conversion unit 1 and two parallel photovoltaic strings PV6 and PV7 corresponding to the power conversion unit 2. In this way, based on that one positive connection terminal is connected to one photovoltaic string corresponding to one power conversion unit and one photovoltaic string corresponding to another power conversion unit and that another positive connection terminal is connected to two parallel photovoltaic strings corresponding to one power conversion unit and two parallel photovoltaic strings corresponding to another power conversion unit, the sharing of the protection switch K7 and the protection switch K5 is achieved.

Figure 8E:
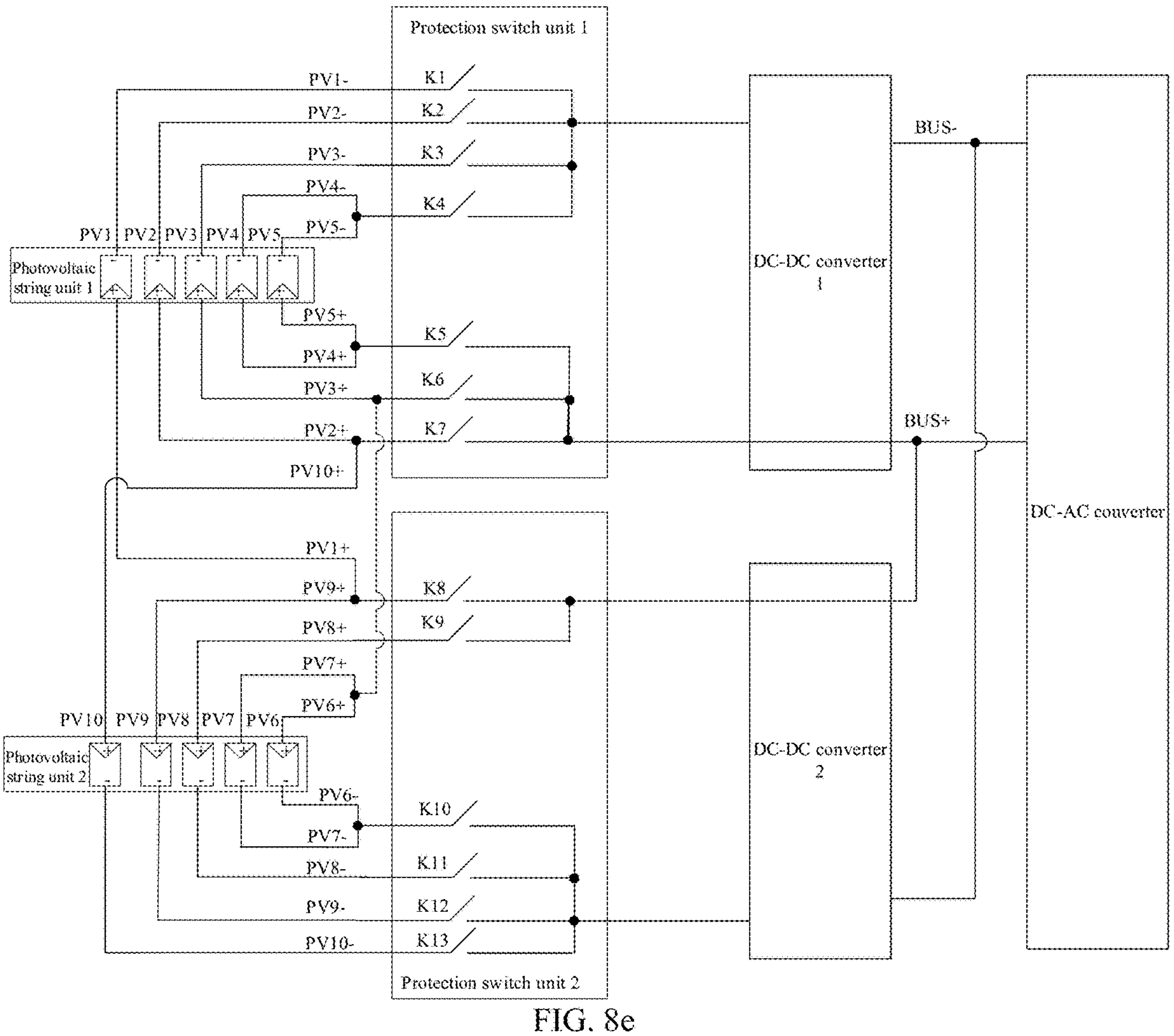

Exemplarily, referring to FIG. 8*e*, the first power conversion unit may be a power conversion unit 1, and its corresponding photovoltaic strings are photovoltaic strings PV1, PV2, . . . , PV5 in the photovoltaic string unit 1. The second power conversion unit may be a power conversion unit 2, and its corresponding photovoltaic strings are photovoltaic strings PV6, PV7, . . . , PV10 in the photovoltaic string unit 2. When the protection switch is shared, in the protection switch unit 1, the positive connection terminal of the protection switch unit 1 corresponding to the protection switch K7 is connected to one photovoltaic string PV2 corresponding to the power conversion unit 1 and one photovoltaic string PV10 corresponding to the power conversion unit 2, and the positive connection terminal of the protection switch unit 1 corresponding to the protection switch K6 is connected to one photovoltaic strings PV3 corresponding to the power conversion unit 1 and the two parallel photovoltaic strings PV6 and PV7 corresponding to the power conversion unit 2. In this way, based on that one positive connection terminal is connected to one photovoltaic string corresponding to one power conversion unit and one photovoltaic string corresponding to another power conversion unit and that another positive connection terminal is connected to one photovoltaic string corresponding to one power conversion unit and two parallel photovoltaic strings corresponding to another power conversion unit, the sharing of the protection switch K7 and the protection switch K6 is achieved.

Figure 8F:
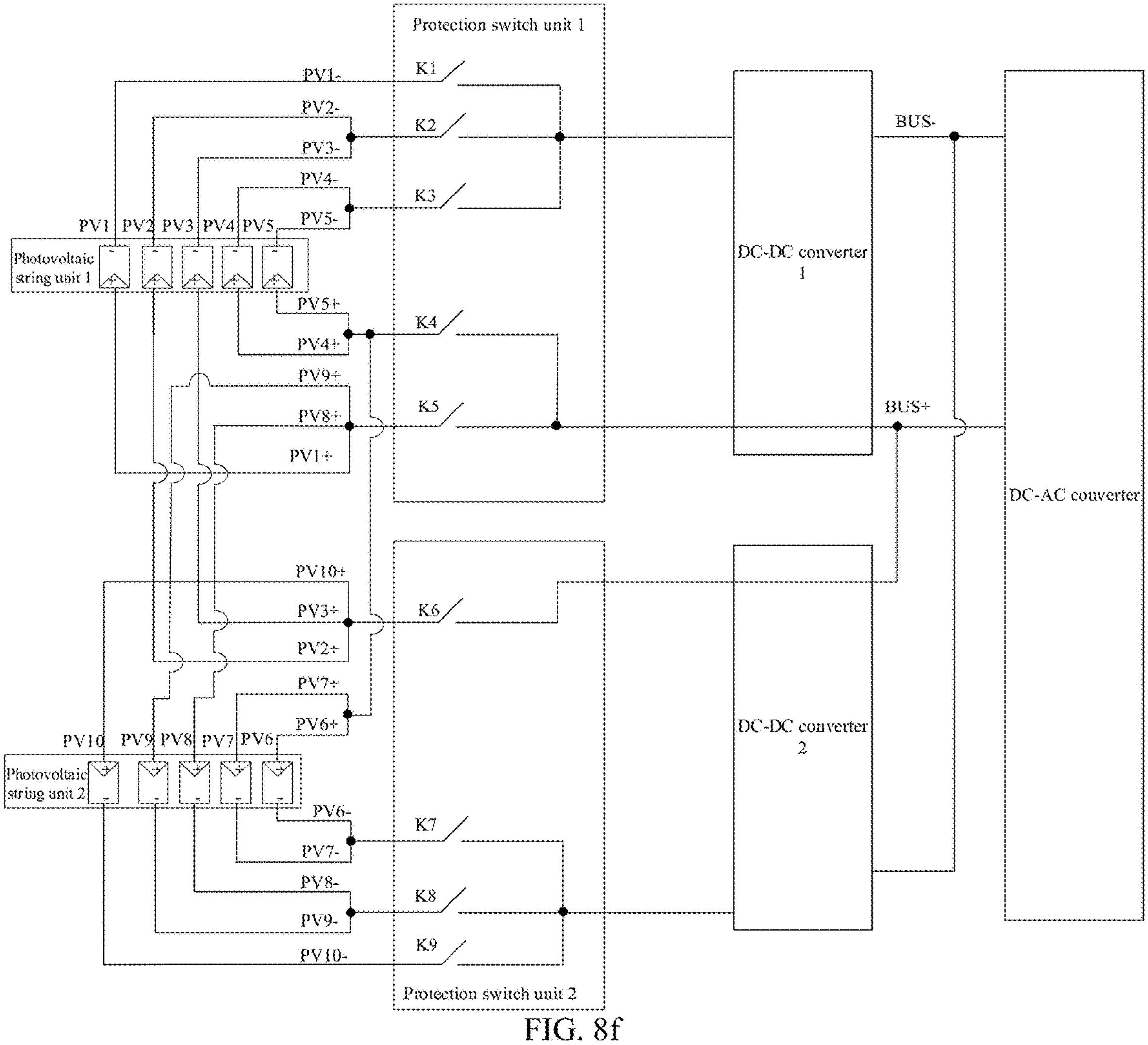

Exemplarily, referring to FIG. 8*f*, the first power conversion unit may be a power conversion unit 1, and its corresponding photovoltaic strings are photovoltaic strings PV1, PV2, . . . , PV5 in the photovoltaic string unit 1. The second power conversion unit may be a power conversion unit 2, and its corresponding photovoltaic strings are photovoltaic strings PV6, PV7, . . . , PV10 in the photovoltaic string unit 2. When the protection switch is shared, in the protection switch unit 1, the positive connection terminal of the protection switch unit 1 corresponding to the protection switch K4 is connected to the two parallel photovoltaic strings PV4 and PV5 corresponding to the power conversion unit 1 and two parallel photovoltaic strings PV6 and PV7 corresponding to the power conversion unit 2, and the positive connection terminal of the protection switch unit 1 corresponding to the protection switch K5 is connected to the one photovoltaic strings PV1 corresponding to the power conversion unit 1 and two parallel photovoltaic strings PV8 and PV9 corresponding to the power conversion unit 2. In this way, based on that one positive connection terminal is connected to two parallel photovoltaic strings corresponding to one power conversion unit and two parallel photovoltaic strings corresponding to another power conversion unit and that another positive connection terminal is connected to one photovoltaic string corresponding to one power conversion unit and two parallel photovoltaic strings corresponding to another power conversion unit, the sharing of the protection switch K4 and the protection switch K5 is achieved.

In this way, for the co-positive power conversion units, the sharing of at least two protection switches may be implemented in a variety of manners.

In some embodiments, when the co-positive power conversion units include a first power conversion unit and a second power conversion unit, and when the at least one positive connection terminal includes at least three positive connection terminals. A first positive connection terminal of the at least three positive connection terminals is adapted to be connected to two parallel photovoltaic strings corresponding to the first power conversion unit and two parallel photovoltaic strings corresponding to the second power conversion unit. A second positive connection terminal of the at least three positive connection terminals is adapted to be connected to one photovoltaic string corresponding to the first power conversion unit and two parallel photovoltaic strings corresponding to the second power conversion unit. A third positive connection terminal of the at least three positive connection terminals is adapted to be connected to one photovoltaic string corresponding to the first power conversion unit and one photovoltaic string corresponding to the second power conversion unit.

In an exemplary embodiment of the present disclosure, each protection switch unit includes at least three positive connection terminals. Each positive connection terminal is adapted to be connected to one or two photovoltaic strings of a photovoltaic string unit corresponding to one power conversion unit. Therefore, for the co-positive power conversion units, one or two photovoltaic strings of a photovoltaic string unit corresponding to one power conversion unit and one or two photovoltaic strings of a photovoltaic string unit corresponding to another power conversion unit can be connected to the same positive connection terminal, to achieve the sharing of the protection switches corresponding to the positive connection terminal, thereby realizing the sharing of the at least three protection switches.

Figure 8G:
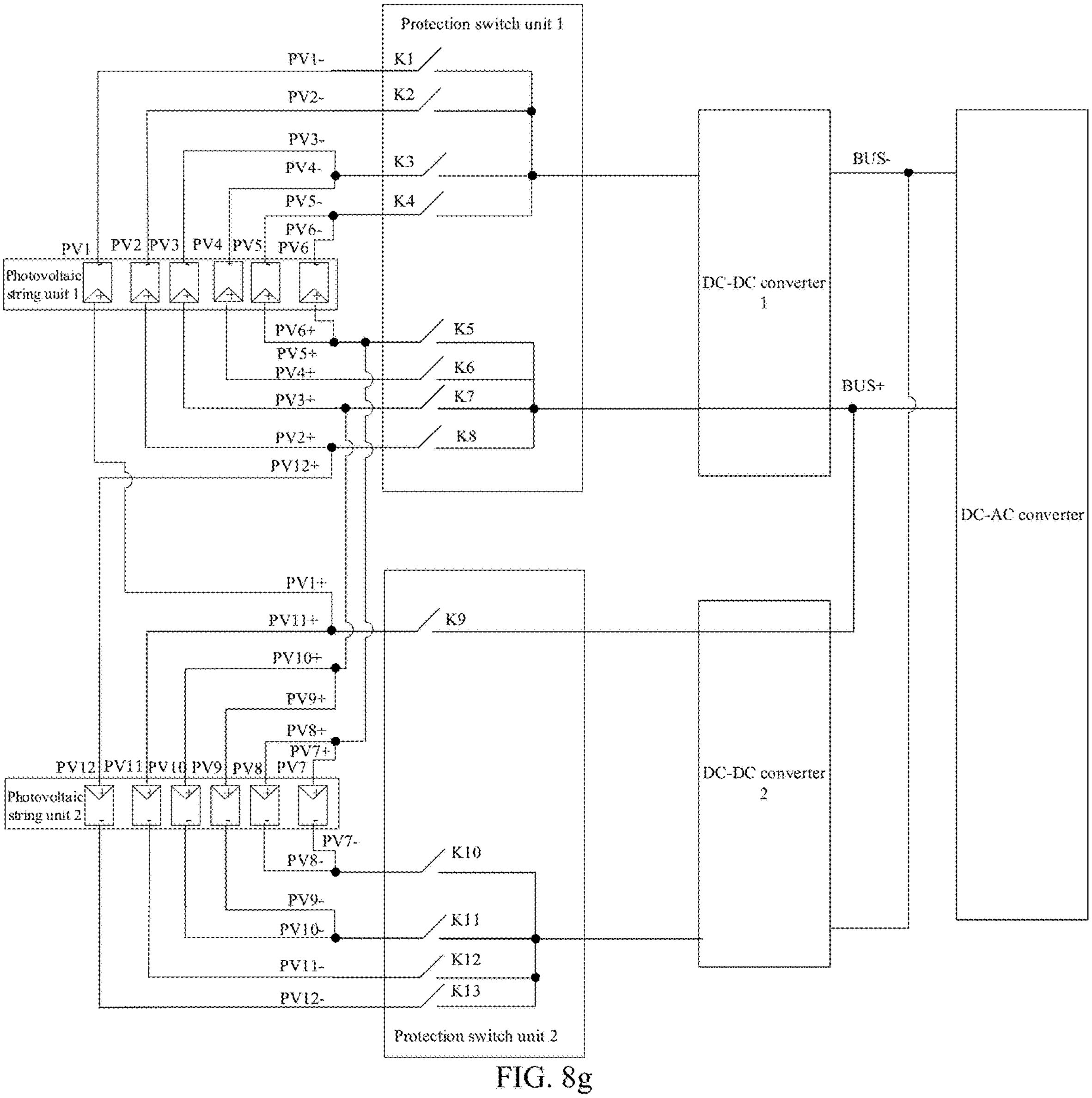

Exemplarily, referring to FIG. 8*g*, the first power conversion unit may be a power conversion unit 1, and its corresponding photovoltaic strings are photovoltaic strings PV1, PV2, . . . , PV6 in the photovoltaic string unit 1. The second power conversion unit may be a power conversion unit 2, and its corresponding photovoltaic strings are photovoltaic strings PV7, PV8, . . . , PV12 in the photovoltaic string unit 2. When the protection switch is shared, in the protection switch unit 1, the positive connection terminal of the protection switch unit 1 corresponding to the protection switch K5 is connected to two parallel photovoltaic strings PV5 and PV6 corresponding to the power conversion unit 1 and two parallel photovoltaic strings PV7 and PV8 corresponding to the power conversion unit 2, the positive connection terminal of the protection switch unit 1 corresponding to the protection switch K7 is connected to one photovoltaic string PV3 corresponding to the power conversion unit 1 and two parallel photovoltaic strings PV9 and PV10 corresponding to the power conversion unit 2, and the positive connection terminal of the protection switch unit 1 corresponding to the protection switch K8 is connected to one photovoltaic string PV2 corresponding to the power conversion unit 1 and one photovoltaic string PV12 corresponding to the power conversion unit 2. In this way, sharing of the protection switch K5, the protection switch K7, and the protection switch K8 is realized based on a connection relationship between the three positive connection terminals and the photovoltaic strings corresponding to the two power conversion units.

In this way, for the co-positive power conversion units, the sharing of at least three protection switches may be implemented in a variety of manners.

In some embodiments, when the plurality of power conversion units include at least three co-negative power conversion units, the at least one negative connection terminal is adapted to be connected to photovoltaic strings in a photovoltaic string unit corresponding to each of the at least three co-negative power conversion units, such that the protection switch units corresponding to the at least three co-negative power conversion units share one protection switch when connected to their corresponding photovoltaic string units.

In an exemplary embodiment of the present disclosure, for the co-negative power conversion units, there may be two, three, or more negative power conversion units. When there are three or more power conversion units, the photovoltaic strings in different photovoltaic string units may be connected through the negative connection terminal of the protection switch unit, so that the protection switch units corresponding to the three or more co-negative power conversion units share a same protection switch when connected to their corresponding photovoltaic string units to reduce the number of protection switches, thereby reducing the cost and volume of the protection switch unit.

In some embodiments, a negative connection terminal corresponding to the one protection switch is adapted to be connected to: one photovoltaic string corresponding to each of the co-negative power conversion units; or two parallel photovoltaic strings corresponding to each of the co-negative power conversion units; or one photovoltaic string corresponding to at least one of the co-negative power conversion units, and two parallel photovoltaic strings corresponding to at least one of the co-negative power conversion units.

Figure 9A:
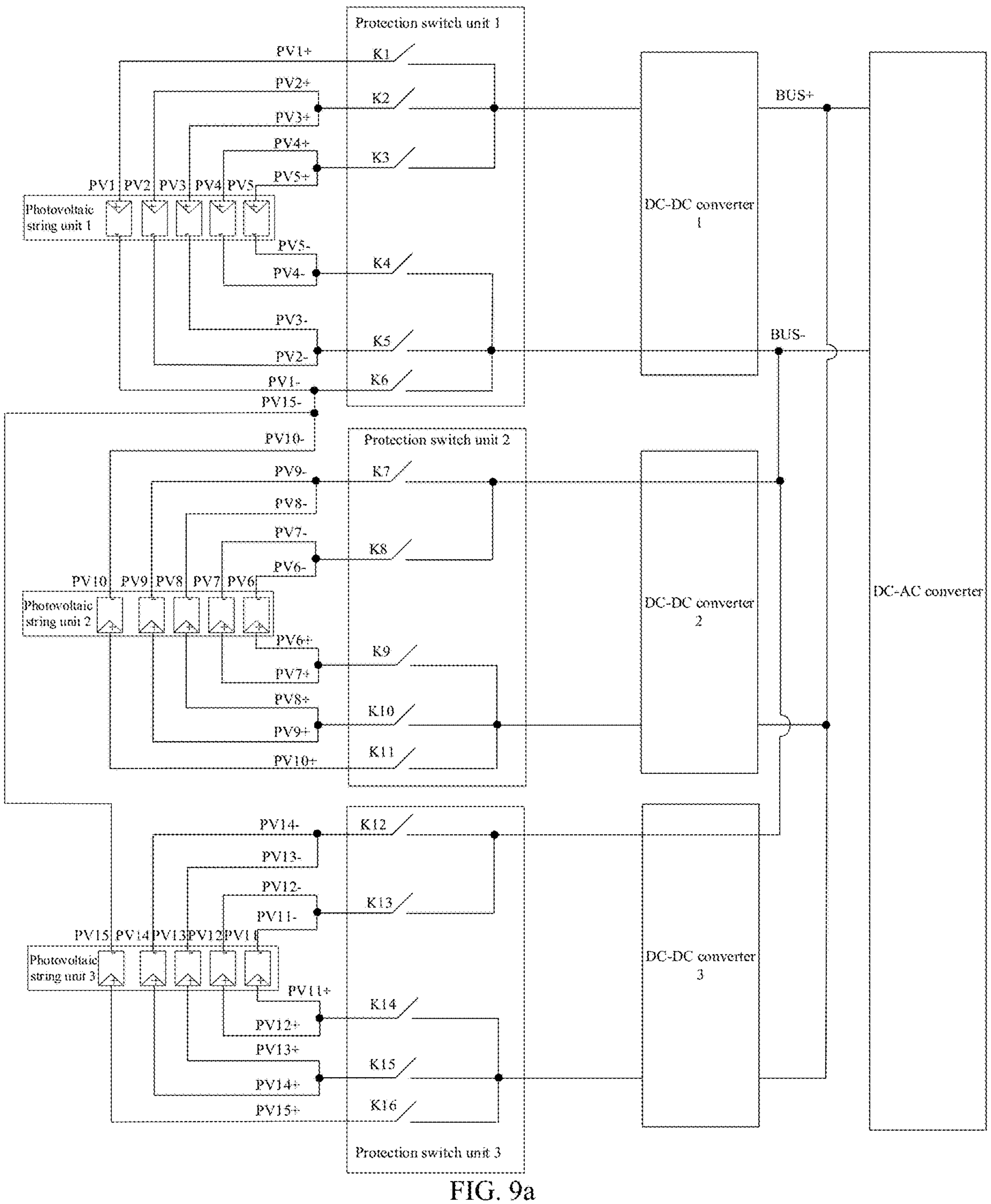
FIG. 9*a* to FIG. 9*d* are schematic diagrams of protection switch units corresponding to three co-negative power conversion units being connected to photovoltaic string units according to some embodiments of the present disclosure.

For example, three co-negative power conversion units 1, 2, and 3 are taken as examples. Referring to FIG. 9*a*, the power conversion unit 1 includes a DC-DC converter 1, the power conversion unit 2 includes a DC-DC converter 2, and the power conversion unit 3 includes a DC-DC converter 3. The DC-DC converter 1, the DC-DC converter 2, and the DC-DC converter 3 are co-negative, i.e., the power conversion unit 1, the power conversion unit 2, and the power conversion unit 3 are co-negative. The protection switch units corresponding to the co-negative power conversion units 1, 2, and 3 are the protection switch unit 1, the protection switch unit 2, and the protection switch unit 3. In the protection switch unit 1, the negative connection terminal of the protection switch unit 1 corresponding to the protection switch K6 is connected to the photovoltaic string PV1 in the photovoltaic string unit 1, the photovoltaic string PV10 in the photovoltaic string unit 2, and a photovoltaic string PV15 in the photovoltaic string unit 3. The protection switch K6 is shared by the photovoltaic string unit 1, the photovoltaic string unit 2, and the photovoltaic string unit 3. Compared with no sharing of the protection switch K6, two protection switches are reduced, and the number of protection switches is reduced. In this way, the negative connection terminal of the protection switch unit corresponding to the same protection switch is connected to one photovoltaic string of each of the co-negative power conversion units, which realizes that the protection switch units corresponding to the co-negative power conversion units share the same protection switch when connected to their corresponding photovoltaic string units.

Figure 9B:
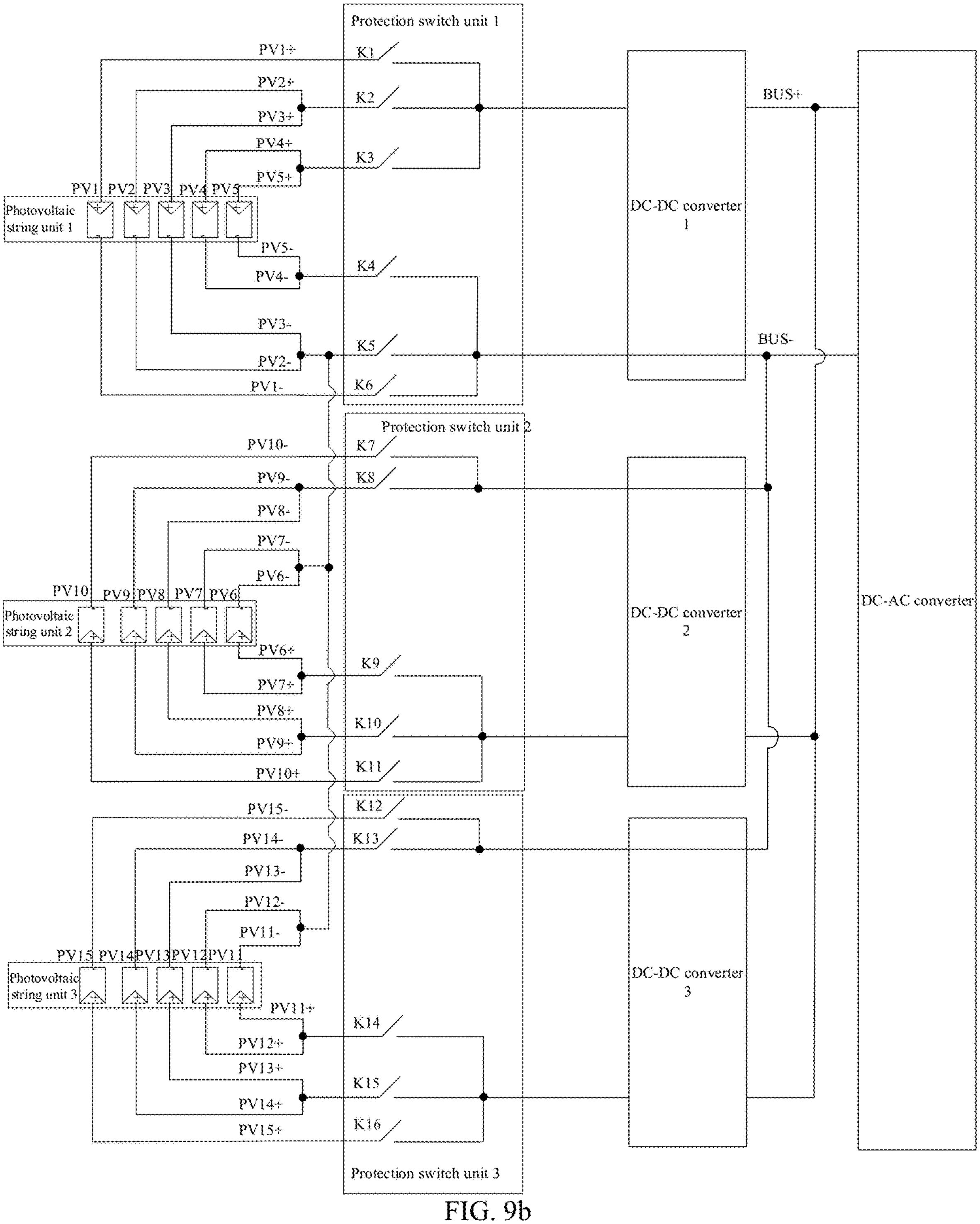

Exemplarily, referring to FIG. 9*b*, in the protection switch unit 1, the negative connection terminal of the protection switch unit 1 corresponding to the protection switch K5 is connected to the two parallel photovoltaic strings PV2 and PV3 in the photovoltaic string unit 1, the two parallel photovoltaic strings PV6 and PV7 in the photovoltaic string unit 2, and the two parallel photovoltaic strings PV11 and PV12 in the photovoltaic string unit 3. The protection switch K5 is shared by the photovoltaic string unit 1, the photovoltaic string unit 2, and the photovoltaic string unit 3. Compared with no sharing of the protection switch K5, two protection switches are reduced, and the number of protection switches is reduced. In this way, the negative connection terminal of the protection switch unit corresponding to the same protection switch is connected to the two parallel photovoltaic strings of each of co-negative power conversion units, which realizes that the protection switch units corresponding to the co-negative power conversion units share the same protection switch when connected to their corresponding photovoltaic string units.

Figure 9C:
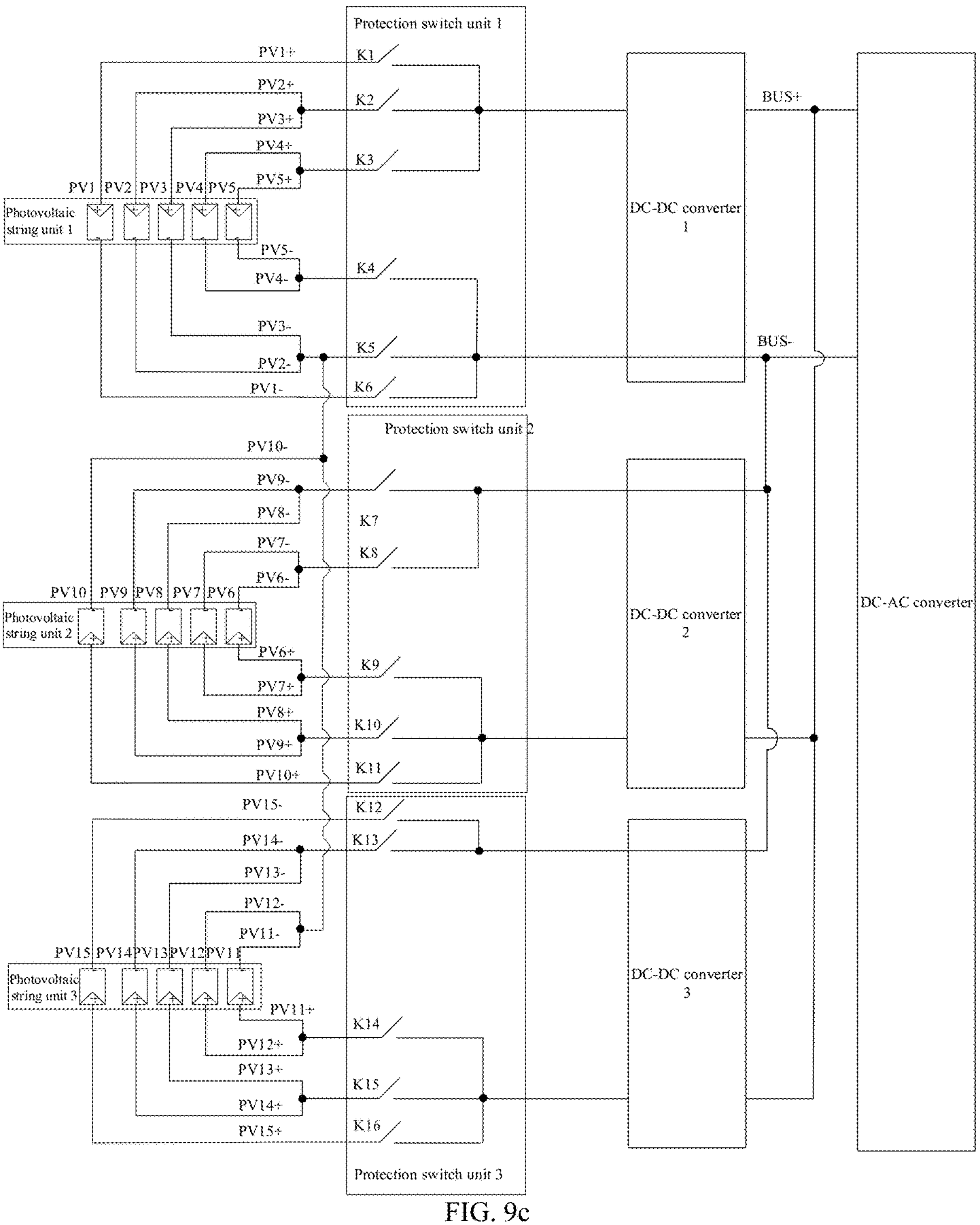

Exemplarily, referring to FIG. 9*c*, in the protection switch unit 1, the negative connection terminal of the protection switch unit 1 corresponding to the protection switch K5 is connected to the two parallel photovoltaic strings PV2 and PV3 in the photovoltaic string unit 1, one photovoltaic string PV10 in the photovoltaic string unit 2, and the two parallel photovoltaic strings PV11 and PV12 in the photovoltaic string unit 3. The protection switch K5 is shared by the photovoltaic string unit 1, the photovoltaic string unit 2, and the photovoltaic string unit 3. Compared with no sharing of the protection switch K5, two protection switches are reduced, and the number of protection switches is reduced. In this way, the negative connection terminal of the protection switch unit corresponding to the same protection switch is connected to the one photovoltaic string corresponding to the at least one of the co-negative power conversion units, and the two parallel photovoltaic strings corresponding to the at least one of the co-negative power conversion units, which realizes that the protection switch units corresponding to the co-negative power conversion units share the same protection switch when connected to their corresponding photovoltaic string units.

Figure 9D:
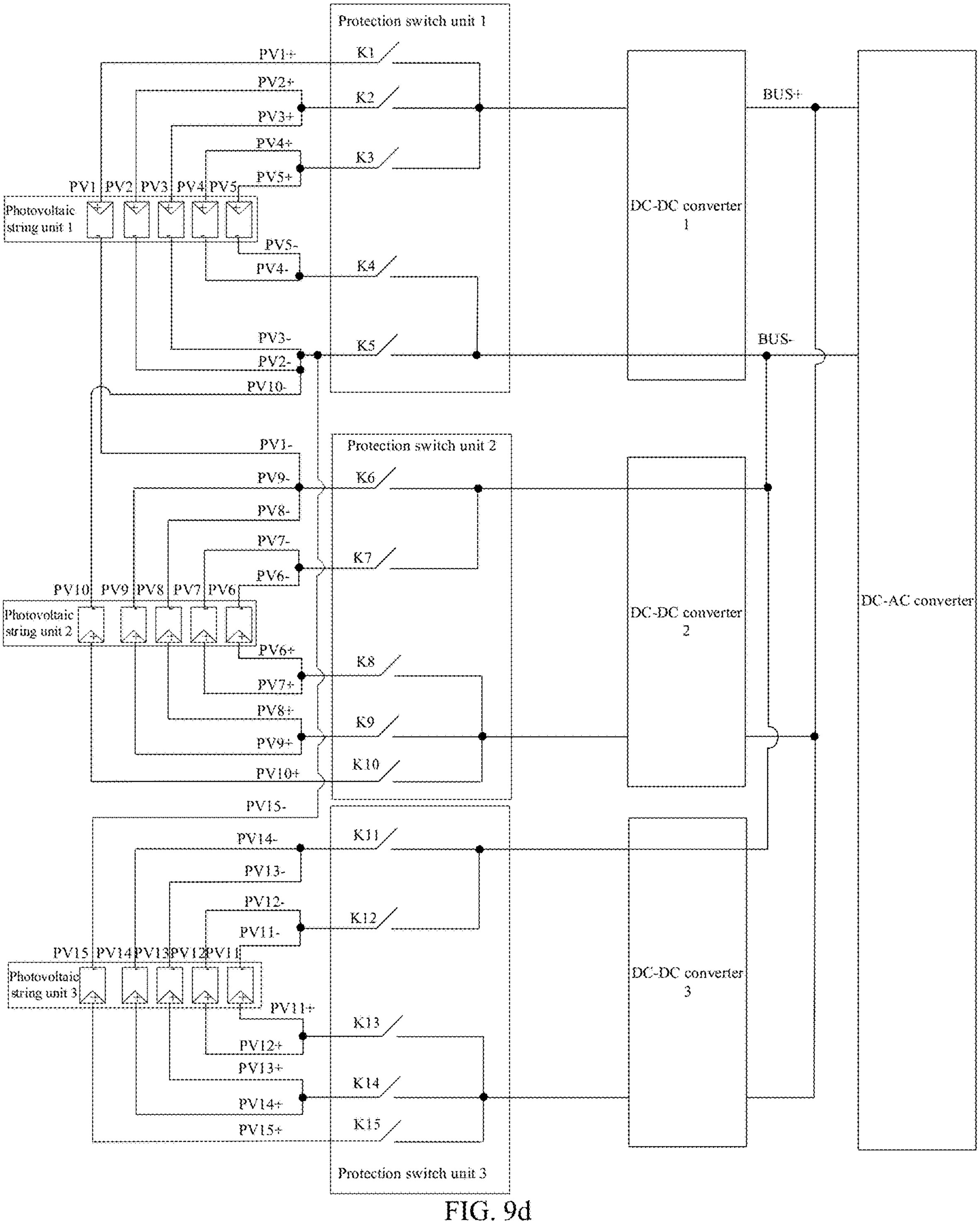

For example, referring to FIG. 9*d*, in the protection switch unit 1, the negative connection terminal of the protection switch unit 1 corresponding to the protection switch K5 is connected to the two parallel photovoltaic strings PV2 and PV3 in the photovoltaic string unit 1, one photovoltaic string PV10 in the photovoltaic string unit 2, and one photovoltaic string PV15 in the photovoltaic string unit 3. The protection switch K5 is shared by the photovoltaic string unit 1, the photovoltaic string unit 2, and the photovoltaic string unit 3. Compared with no sharing of the protection switch K5, three protection switches are reduced, and the number of protection switches is reduced. In this way, the negative connection terminal of the protection switch unit corresponding to the same protection switch is connected to the one photovoltaic string corresponding to the at least one of the co-negative power conversion units, and the two parallel photovoltaic strings corresponding to the at least one of co-negative power conversion units, which realizes that the protection switch units corresponding to the co-negative power conversion units share the same protection switch when connected to their corresponding photovoltaic string units.

It should be noted that, for the sharing of the protection switches of three or more co-negative power conversion units, reference may be made to related descriptions of the three co-negative power conversion units, and its details will not be described herein.

In this way, it can be realized that the protection switch units corresponding to the at least three co-negative power conversion units share the same protection switch when connected to their corresponding photovoltaic string units in various manners.

In an embodiment, when the plurality of power conversion units include at least three co-positive power conversion units, the at least one positive connection terminal is adapted to be connected to one photovoltaic string in one photovoltaic string unit corresponding to each of the co-positive power conversion units, such that the protection switch units corresponding to the at least three co-positive power conversion units share one protection switch when connected to their corresponding photovoltaic string units.

In an exemplary embodiment of the present disclosure, for the co-positive power conversion units, two, three or more co-positive power conversion units may be provided. When there are three or more co-positive power conversion units, it can be realized that the protection switch units corresponding to the three or more common power conversion units share the same protection switch when connected to their corresponding photovoltaic string units by connecting the positive connection terminal of the protection switch to the photovoltaic strings in different photovoltaic string units, to reduce the number of the protection switches, thereby reducing the cost and volume of the protection switch unit.

In an embodiment, a positive connection terminal corresponding to one protection switch is adapted to be connected to: one photovoltaic string corresponding to each of the co-positive power conversion units; or two parallel photovoltaic strings corresponding to each of the co-positive power conversion units; or one photovoltaic string corresponding to at least one of the co-positive power conversion units, and two parallel photovoltaic strings corresponding to at least one of the co-positive power conversion units.

Figure 10A:
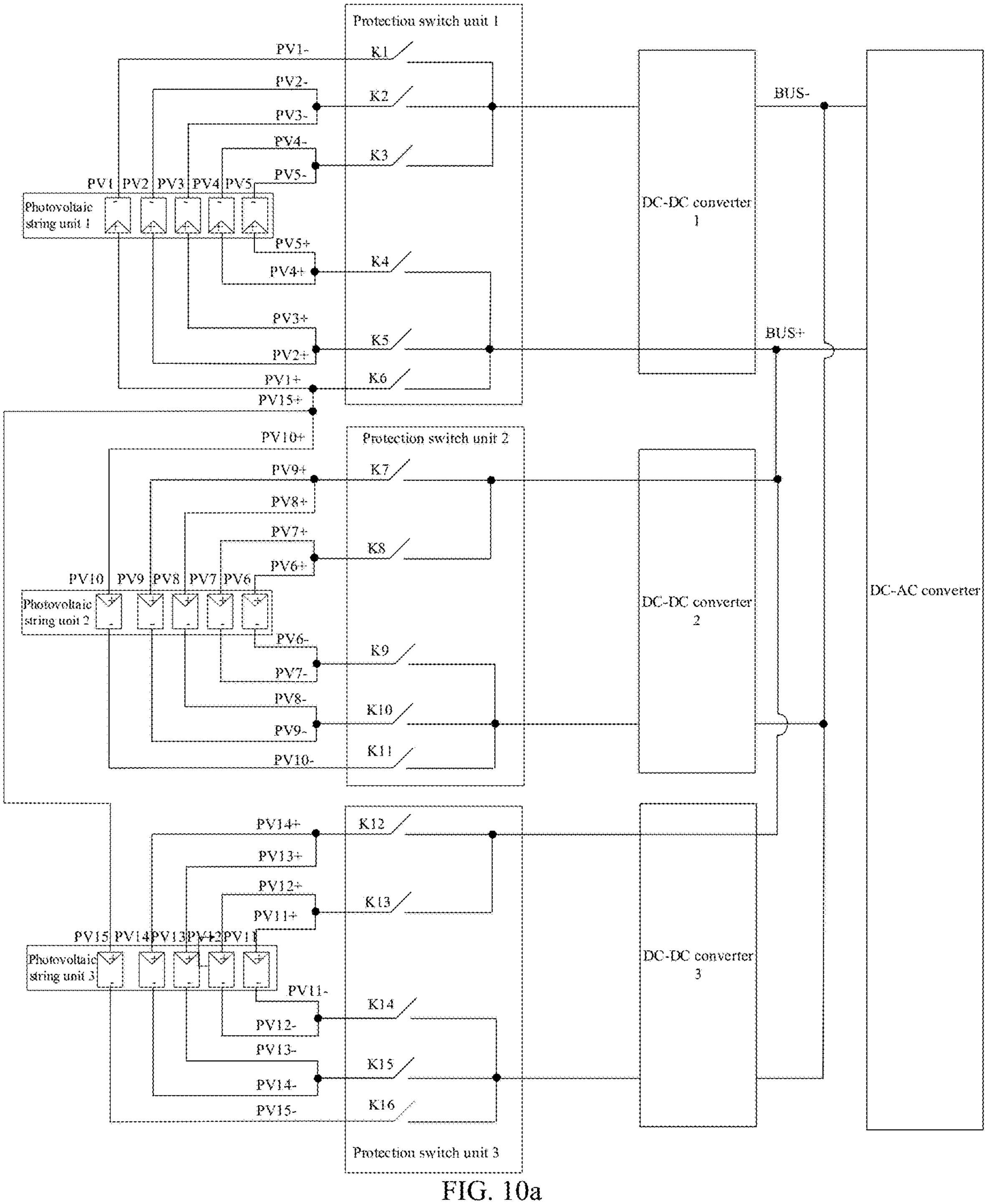
FIG. 10*a* to FIG. 10*d* are schematic diagrams of protection switch units corresponding to three co-positive power conversion units being connected to photovoltaic string units according to some embodiments of the present disclosure.

Exemplarily, three co-positive power conversion units 1, 2, and 3 are taken as examples. Referring to FIG. 10*a*, the power conversion unit 1 includes a DC-DC converter 1, the power conversion unit 2 includes a DC-DC converter 2, and the power conversion unit 3 includes a DC-DC converter 3. The DC-DC converter 1, DC-DC converter 2, and DC-DC converter 3 are co-positive, i.e., the power conversion unit 1, the power conversion unit 2, and the power conversion unit 3 are co-positive, and the protection switch units corresponding to the co-positive power conversion units 1, 2, and 3 are the protection switch unit 1, the protection switch unit 2, and the protection switch unit 3. In the protection switch unit 1, the positive connection terminal of the protection switch unit 1 corresponding to the protection switch K6 is connected to the photovoltaic string PV1 in the photovoltaic string unit 1, the photovoltaic string PV10 in the photovoltaic string unit 2, and the photovoltaic string PV15 in the photovoltaic string unit 3. The protection switch K6 is shared by the photovoltaic string unit 1, the photovoltaic string unit 2, and the photovoltaic string unit 3. Compared with no sharing of the protection switch K6, two protection switches are reduced, and the number of protection switches is reduced. In this way, the positive connection terminal of the protection switch unit corresponding to the same protection switch is connected to one photovoltaic string of each of the co-positive power conversion units, which realizes that the protection switch units corresponding to the co-positive power conversion units share the same protection switch when connected to their corresponding photovoltaic string units.

Figure 10B:
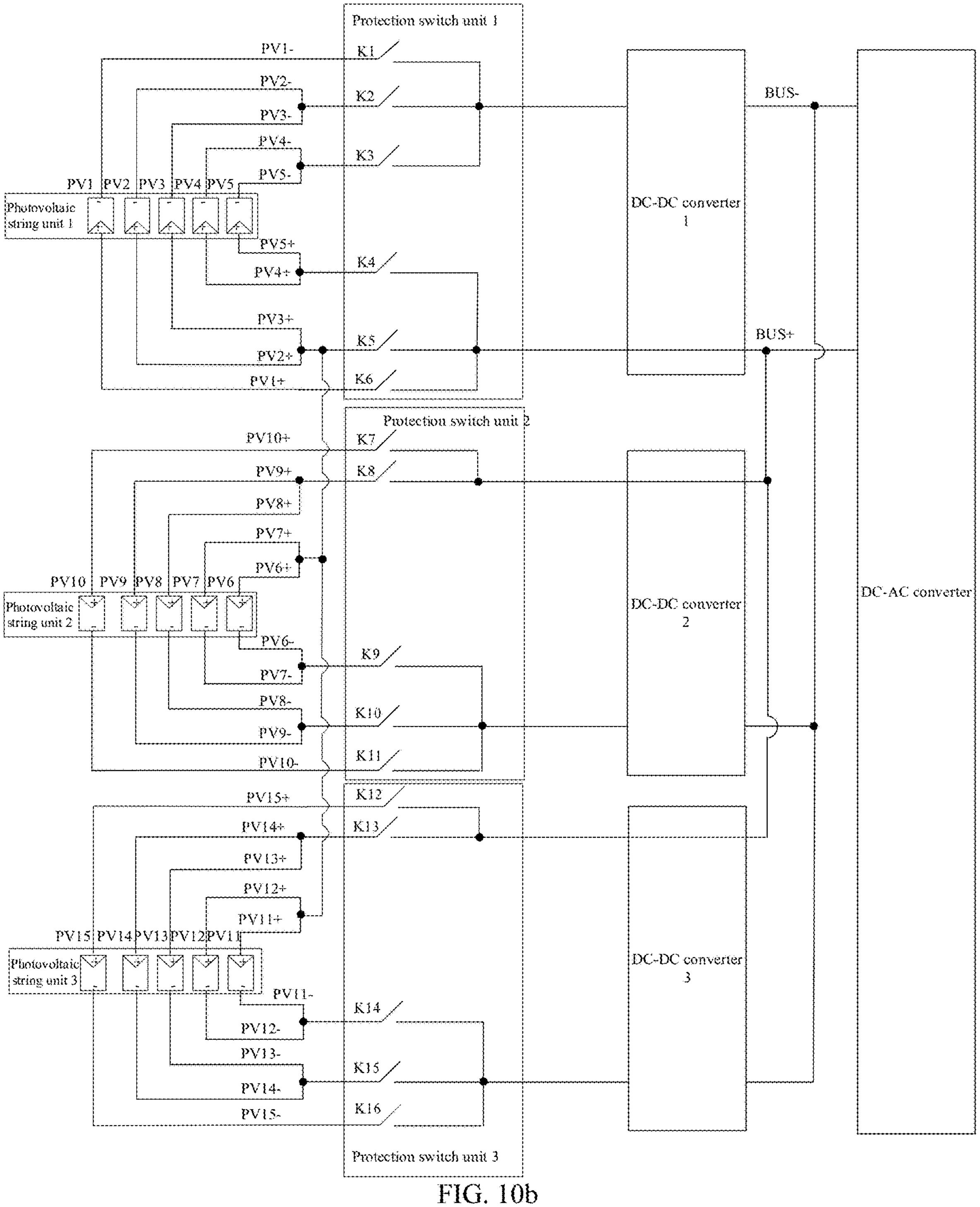

Exemplarily, referring to FIG. 10*b*, in the protection switch unit 1, the positive connection terminal of the protection switch unit 1 corresponding to the protection switch K5 is connected to the two parallel photovoltaic strings PV2 and PV3 in the photovoltaic string unit 1, the two parallel photovoltaic strings PV6 and PV7 in the photovoltaic string unit 2, and the two parallel photovoltaic strings PV11 and PV12 in the photovoltaic string unit 3. The protection switch K5 is shared by the photovoltaic string unit 1, the photovoltaic string unit 2, and the photovoltaic string unit 3. Compared with no sharing of the protection switch K5, two protection switches are reduced, and the number of protection switches is reduced. In this way, the positive connection terminal of the protection switch unit corresponding to the same protection switch is connected to two parallel photovoltaic strings of each of co-positive power conversion units, which realizes that the protection switch units corresponding to the co-positive power conversion units shares a protection switch when connected to their corresponding photovoltaic string units.

Figure 10C:
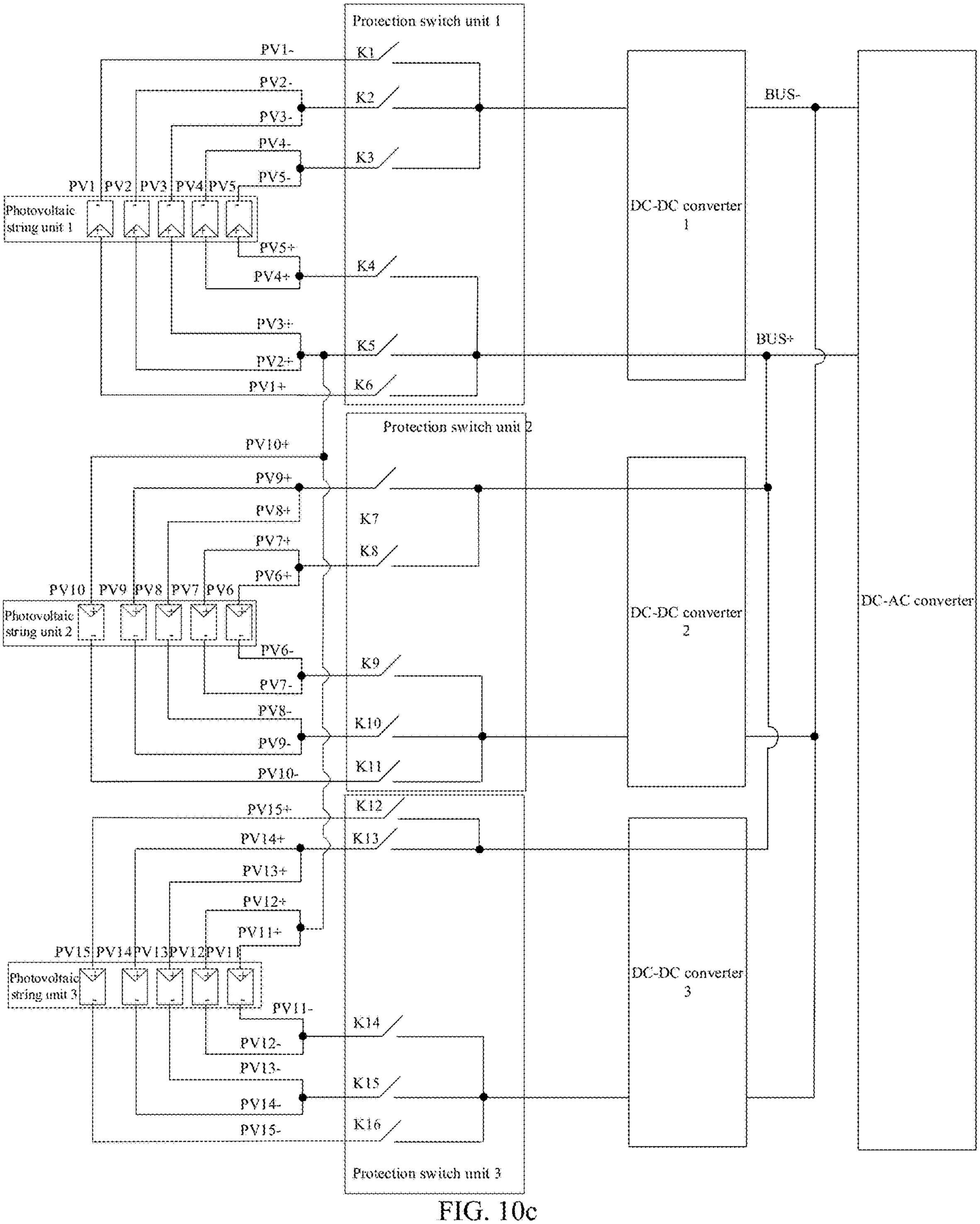

Exemplarily, referring to FIG. 10*c*, in the protection switch unit 1, the positive connection terminal of the protection switch unit 1 corresponding to the protection switch K5 is connected to two parallel photovoltaic strings PV2 and PV3 in the photovoltaic string unit 1, one photovoltaic string PV10 in the photovoltaic string unit 2, and two parallel photovoltaic strings PV11 and PV12 in the photovoltaic string unit 3. The protection switch K5 is shared by the photovoltaic string unit 1, the photovoltaic string unit 2, and the photovoltaic string unit 3. Compared with no sharing of the protection switch K5, two protection switches are reduced, and the number of protection switches is reduced. In this way, the positive connection terminal of the protection switch unit corresponding to the same protection switch is connected to one photovoltaic string corresponding to at least one of the co-positive power conversion units and two parallel photovoltaic strings corresponding to the at least one of the co-positive power conversion units, which realizes that the protection switch units corresponding to the co-positive power conversion units share the same protection switch when connected to their corresponding photovoltaic string units.

Figure 10D:
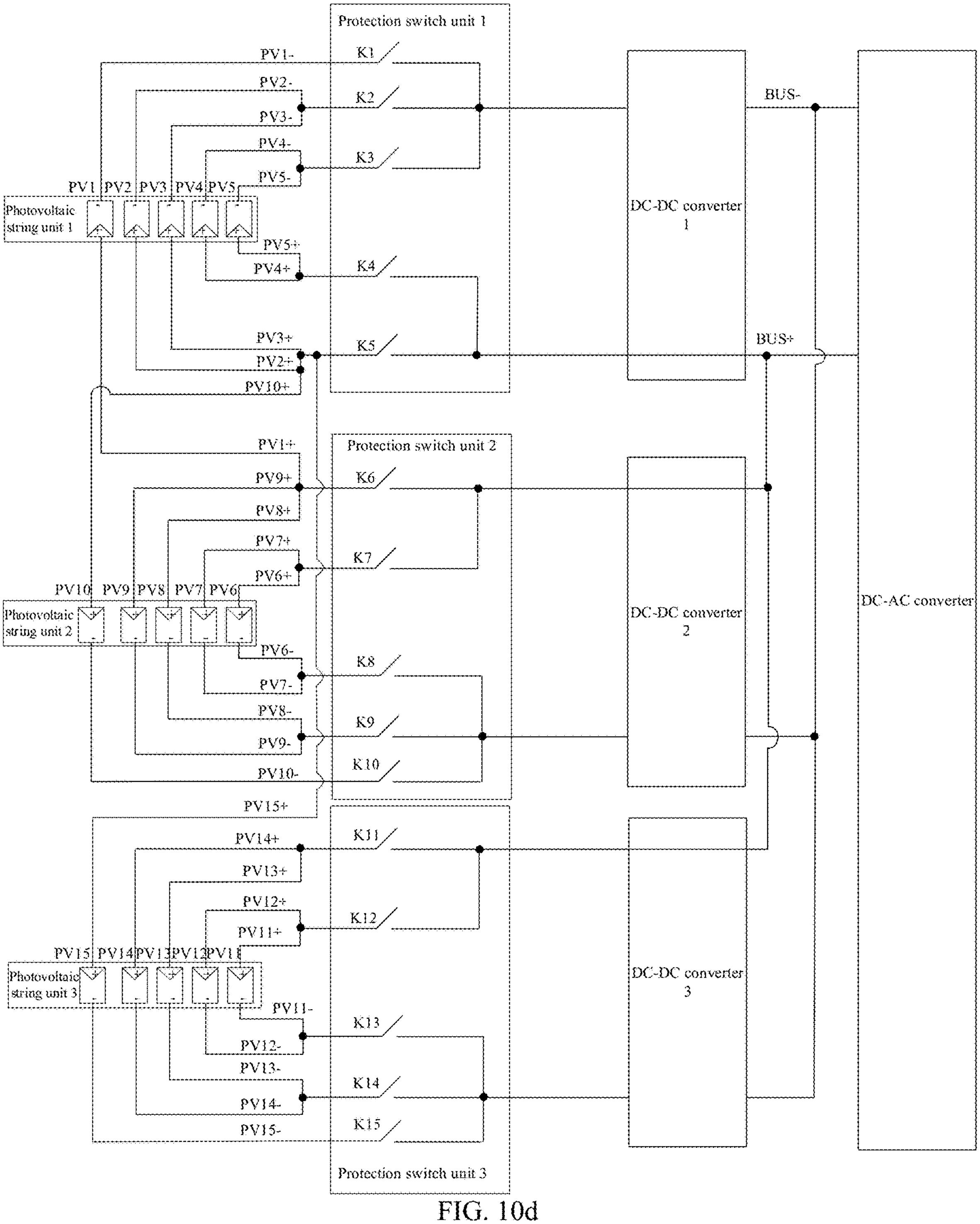

Exemplarily, referring to FIG. 10*d*, in the protection switch unit 1, the positive connection terminal of the protection switch unit 1 corresponding to the protection switch K5 is connected to two parallel photovoltaic strings PV2 and PV3 in the photovoltaic string unit 1, one photovoltaic string PV10 in the photovoltaic string unit 2, and one photovoltaic string PV15 in the photovoltaic string unit 3. The protection switch K5 is shared by the photovoltaic string unit 1, the photovoltaic string unit 2, and the photovoltaic string unit 3. Compared with no sharing of the protection switch K5, three protection switches are reduced, and the number of protection switches is reduced.

It should be noted that, for the sharing of the protection switches of the three or more positive power conversion units, reference may be made to the related description of the three co-positive power conversion units, and its details will not be described herein.

In this way, it can be realized that the protection switch units corresponding to the at least three co-positive power conversion units share the same protection switch when connected to their corresponding photovoltaic string units in various manners.

In some embodiments, when the co-positive power conversion units or co-negative power conversion units include at least three co-positive power conversion units or at least three co-negative power conversion units, at least one power conversion units and other power conversion units share at least one protection switch in their corresponding protection switch units.

That is, when there are three or more co-positive or co-negative power conversion units, there are one or more power conversion units sharing one or more protection switches of the protection switch units corresponding to each of the other power conversion units, to reduce the number of protection switches by sharing the protection switch, thereby reducing the cost and volume of the protection switch unit.

In some embodiments, when the co-positive power conversion units or co-negative power conversion units include a first power conversion unit, a second power conversion unit, and a third power conversion unit, the first power conversion unit and the second power conversion unit share at least one protection switch in their corresponding protection switch units, and the first power conversion unit and the third power conversion unit share at least one protection switch in their corresponding protection switch units; or the second power conversion unit and the first power conversion unit share at least one protection switch in their corresponding protection switch units, and the second power conversion unit and the third power conversion unit share at least one protection switch in their corresponding protection switch units; or the third power conversion unit and the first power conversion unit share at least one protection switch in their corresponding protection switch units, and the third power conversion unit and the second power conversion unit share at least one protection switch in their corresponding protection switch units.

Figure 11A:
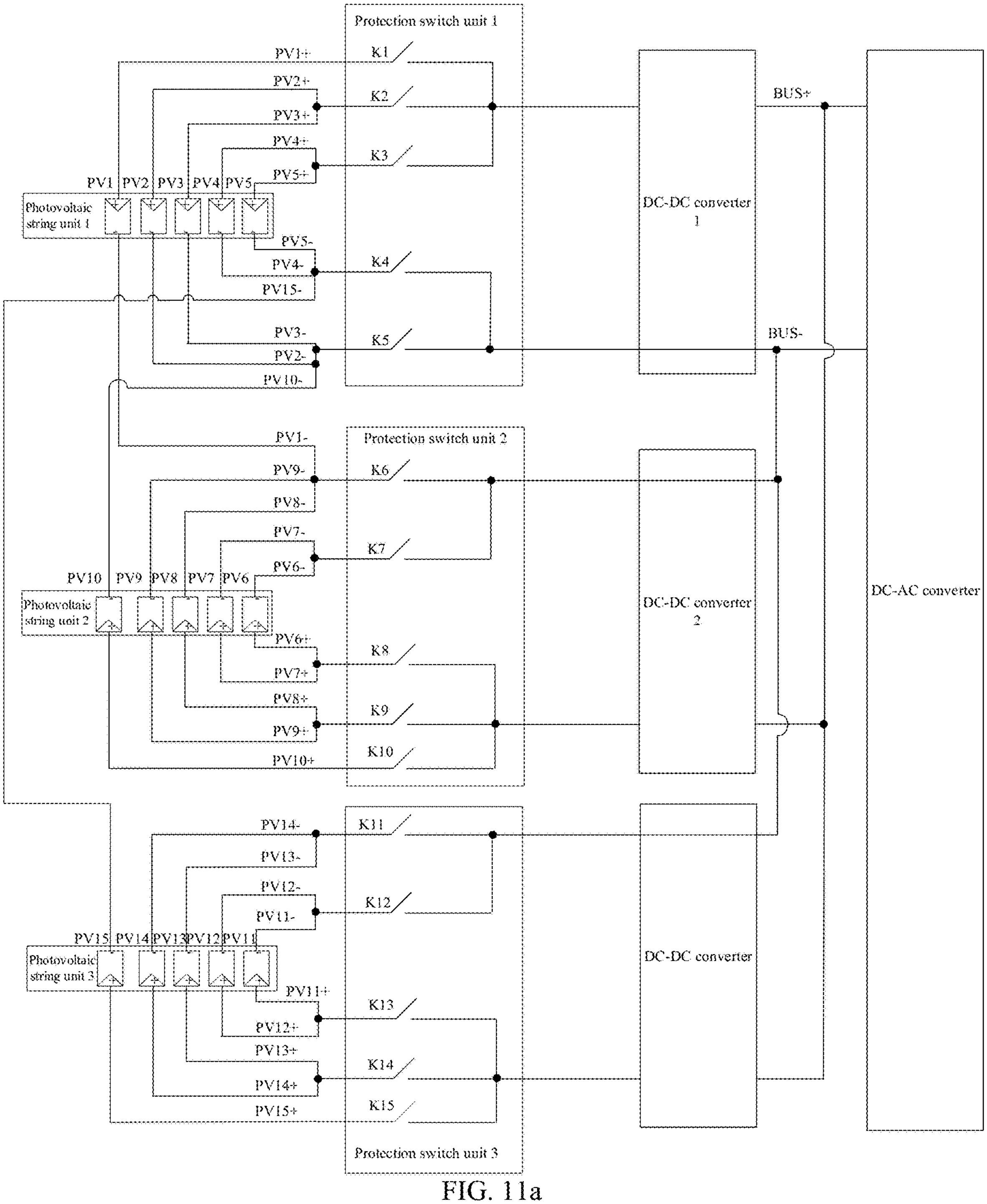
FIG. 11*a* to FIG. 11*c* are schematic diagrams of protection switch units corresponding to three co-negative power conversion units being connected to photovoltaic string units according to some other embodiments of the present disclosure.

Exemplarily, referring to FIG. 11*a*, the first power conversion unit may be a power conversion unit 1, and its corresponding photovoltaic strings are the photovoltaic string PV1, the photovoltaic string PV2, . . . , the photovoltaic string PV5 in the photovoltaic string unit 1. The second power conversion unit may be a power conversion unit 2, and its corresponding photovoltaic strings are the photovoltaic string PV6, the photovoltaic string PV7, . . . , the photovoltaic string PV10 in the photovoltaic string unit 2. The third power conversion unit may be a power conversion unit 3, and its corresponding photovoltaic strings are the photovoltaic string PV11, the photovoltaic string PV12, . . . , the photovoltaic string PV15 in the photovoltaic string unit 3.

When the protection switch is shared, the protection switch K5 is connected to the two parallel photovoltaic strings PV2 and PV3 in the photovoltaic string unit 1 and one photovoltaic string PV10 in the photovoltaic string unit 2. Moreover, the protection switch K5 is shared by the photovoltaic string unit 1 and the photovoltaic string unit 2, i.e., is shared by the power conversion unit 1 and the power conversion unit 2. The protection switch K6 is connected to the two parallel photovoltaic strings PV8 and PV9 in the photovoltaic string unit 2 and one photovoltaic string PV1 in the photovoltaic string unit 1. Moreover, the protection switch K6 is shared by the photovoltaic string unit 1 and the photovoltaic string unit 2, i.e., is shared by the power conversion unit 1 and the power conversion unit 2. The protection switch K4 is connected to the two parallel photovoltaic strings PV4 and PV5 in the photovoltaic string unit 1 and one photovoltaic string PV15 in the photovoltaic string unit 3. Moreover, the protection switch K4 is shared by the photovoltaic string unit 1 and the photovoltaic string unit 3, i.e., is shared by the power conversion unit 1 and the power conversion unit 3. In this way, it is realized that the power conversion unit 1 and each of the other power conversion units share the at least one protection switch in the corresponding protection switch unit.

It can be understood that in FIG. 9*a* to FIG. 10*d*, the power conversion unit 1 also shares least one protection switch in the corresponding protection switch unit 1 with the power conversion unit 2, and the power conversion unit 1 and the power conversion unit 3 share the at least one protection switch in the corresponding protection switch unit 1.

Figure 11B:
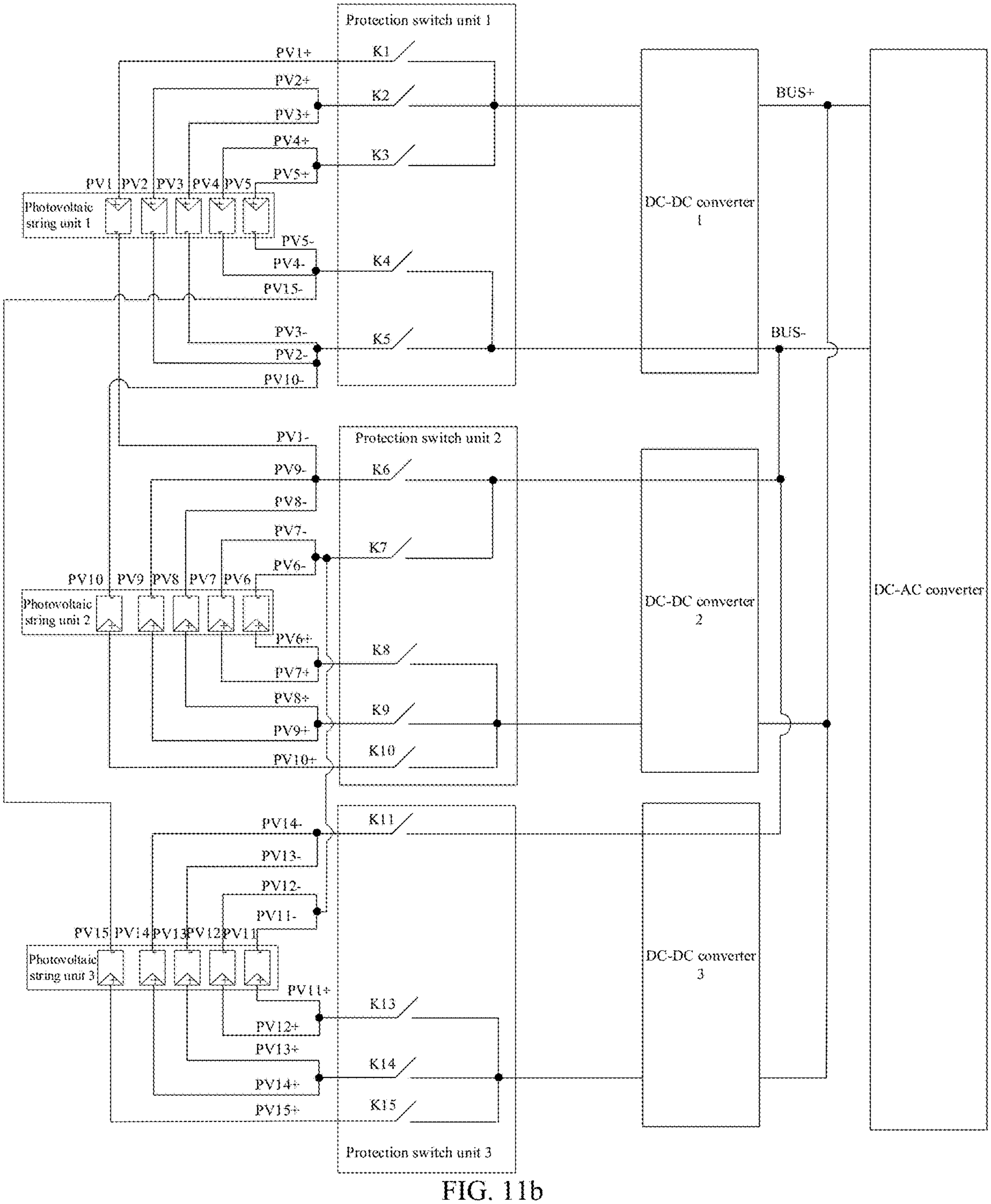

Exemplarily, referring to FIG. 11*b*, when the protection switch is shared, the protection switch K6 is connected to the two parallel photovoltaic strings PV8 and PV9 in the photovoltaic string unit 2 and one photovoltaic string PV1 in the photovoltaic string unit 1. Moreover, the protection switch K6 is shared by the photovoltaic string unit 2 and the photovoltaic string unit 1, i.e., is shared by the power conversion unit 2 and the power conversion unit 1. The protection switch K5 is connected to the two parallel photovoltaic strings PV2 and PV3 in the photovoltaic string unit 1 and one photovoltaic string PV10 in the photovoltaic string unit 2. Moreover, the protection switch K5 is shared by the photovoltaic string unit 2 and the photovoltaic string unit 1, i.e., is shared by the power conversion unit 2 and the power conversion unit 1. The protection switch K7 is connected to the two parallel photovoltaic strings PV6 and PV7 in the photovoltaic string unit 2 and two parallel photovoltaic strings PV11 and PV12 in the photovoltaic string unit 3. Moreover, the protection switch K7 is shared by the photovoltaic string unit 2 and the photovoltaic string unit 3, i.e., is shared by the power conversion unit 2 and the power conversion unit 3. In this way, it is realized that the power conversion unit 2 and each of the other power conversion units share the at least one protection switch in their corresponding protection switch units.

It can be understood that the protection switch K6 may also be connected to the two parallel photovoltaic strings PV11 and PV12 in the photovoltaic string unit 3. Similarly, it can be realized that the power conversion unit 2 and each of the other power conversion units share the at least one protection switch in their corresponding protection switch units.

Figure 11C:
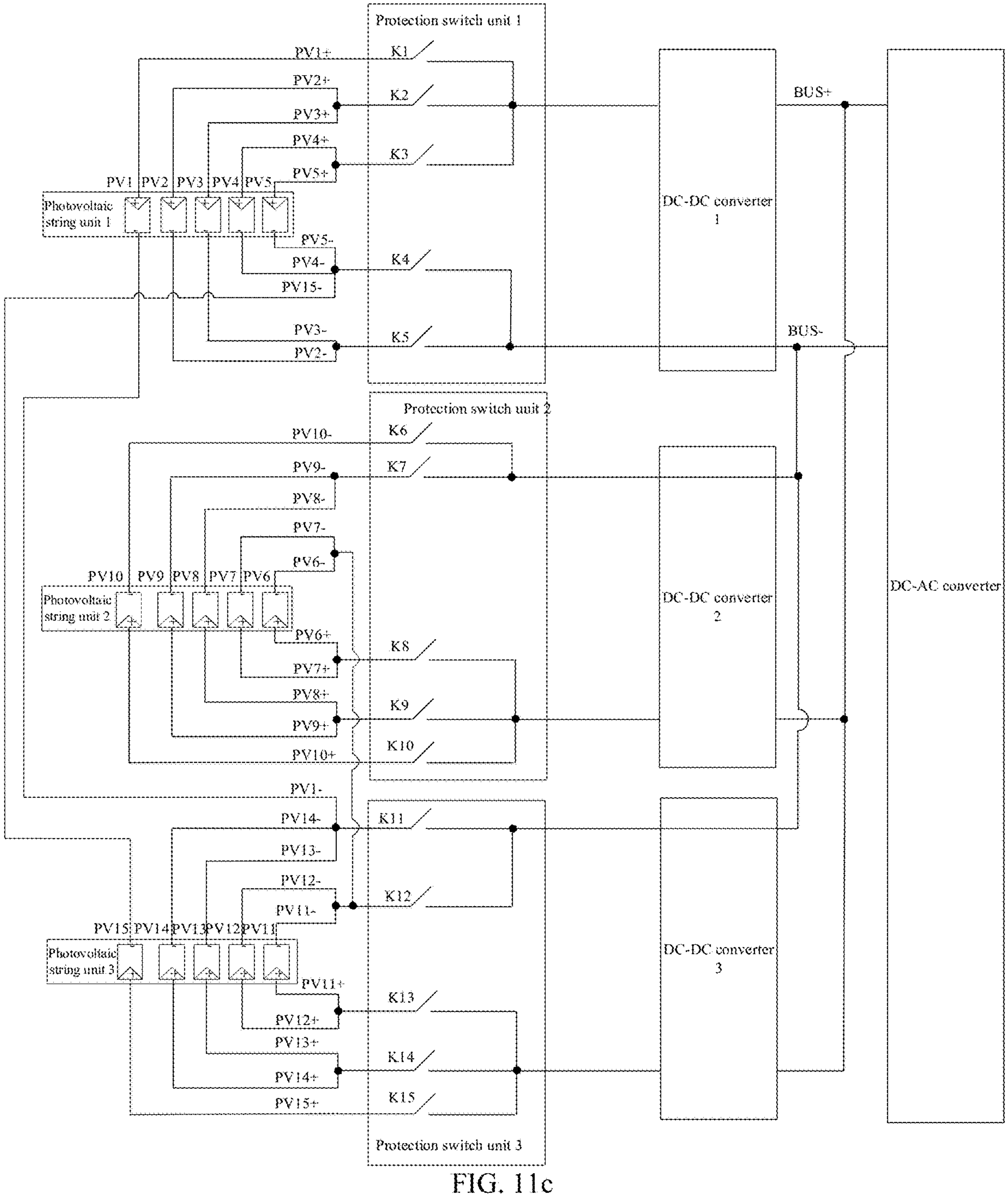

Exemplarily, referring to FIG. 11*c*, when the protection switch is shared, the protection switch K11 is connected to the two parallel photovoltaic strings PV13 and PV14 in the photovoltaic string unit 3 and one photovoltaic string PV1 in the photovoltaic string unit 1. Moreover, the protection switch K11 is shared by the photovoltaic string unit 3 and the photovoltaic string unit 1, i.e., is shared by the power conversion unit 3 and the power conversion unit 1. The protection switch K4 is connected to the two parallel photovoltaic strings PV4 and PV5 in the photovoltaic string unit 1 and one photovoltaic string PV15 in the photovoltaic string unit 3. Moreover, the protection switch K4 is shared by the photovoltaic string unit 3 and the photovoltaic string unit 1, i.e., is shared by the power conversion unit 3 and the power conversion unit 1. The protection switch K12 is connected to the two parallel photovoltaic strings PV11 and PV12 in the photovoltaic string unit 3 and two parallel photovoltaic strings PV6 and PV7 in the photovoltaic string unit 2. Moreover, the protection switch K12 is shared by the photovoltaic string unit 3 and the photovoltaic string unit 2, i.e., is shared by the power conversion unit 3 and the power conversion unit 2. In this way, it is realized that the power conversion unit 3 and each of the other power conversion units share the at least one protection switch in their corresponding protection switch units.

It can be understood that the protection switch K11 may also be connected to the two parallel photovoltaic strings PV6 and PV7 in the photovoltaic string unit 2. Similarly, it can be realized that the power conversion unit 3 and each of the other power conversion units share the at least one protection switch in their corresponding protection switch units.

It should be noted that FIG. 11*a* to FIG. 11*c* are described by taking the co-negative power conversion units as an example. For the co-positive power conversion units to be similar to the co-negative power conversion units, its details will not be described herein. In addition, for three or more situations, reference may be made to three situations, and its details will not be described herein.

In this way, when there are three or more co-positive power conversion units or co-negative power conversion units, it can be realized that at least one power conversion unit and each of the other power conversion units share at least one protection switch of the corresponding protection switch units, thereby reducing the number of protection switches.

In some embodiments, when the co-positive power conversion units or co-negative power conversion units include at least three co-positive power conversion units or at least three co-negative power conversion units, any two of the at least three co-positive power conversion units or at least three co-negative power conversion units share at least one protection switch in their corresponding protection switch units.

That is, when there are three or more co-positive power conversion units or co-negative power conversion units, every two power conversion units share one or more protection switches in the corresponding protection switch unit, to reduce the number of protection switches by sharing the protection switch, thereby reducing the cost and volume of the protection switch unit.

In some embodiments, when the co-positive power conversion units or co-negative power conversion units include a first power conversion unit, a second power conversion unit, and a third power conversion unit, the first power conversion unit and the second power conversion unit share at least one protection switch in their corresponding protection switch units; the first power conversion unit and the third power conversion unit share at least one protection switch in their corresponding protection switch units; and the second power conversion unit and the third power conversion unit share at least one protection switch in their corresponding protection switch units.

Figure 12:
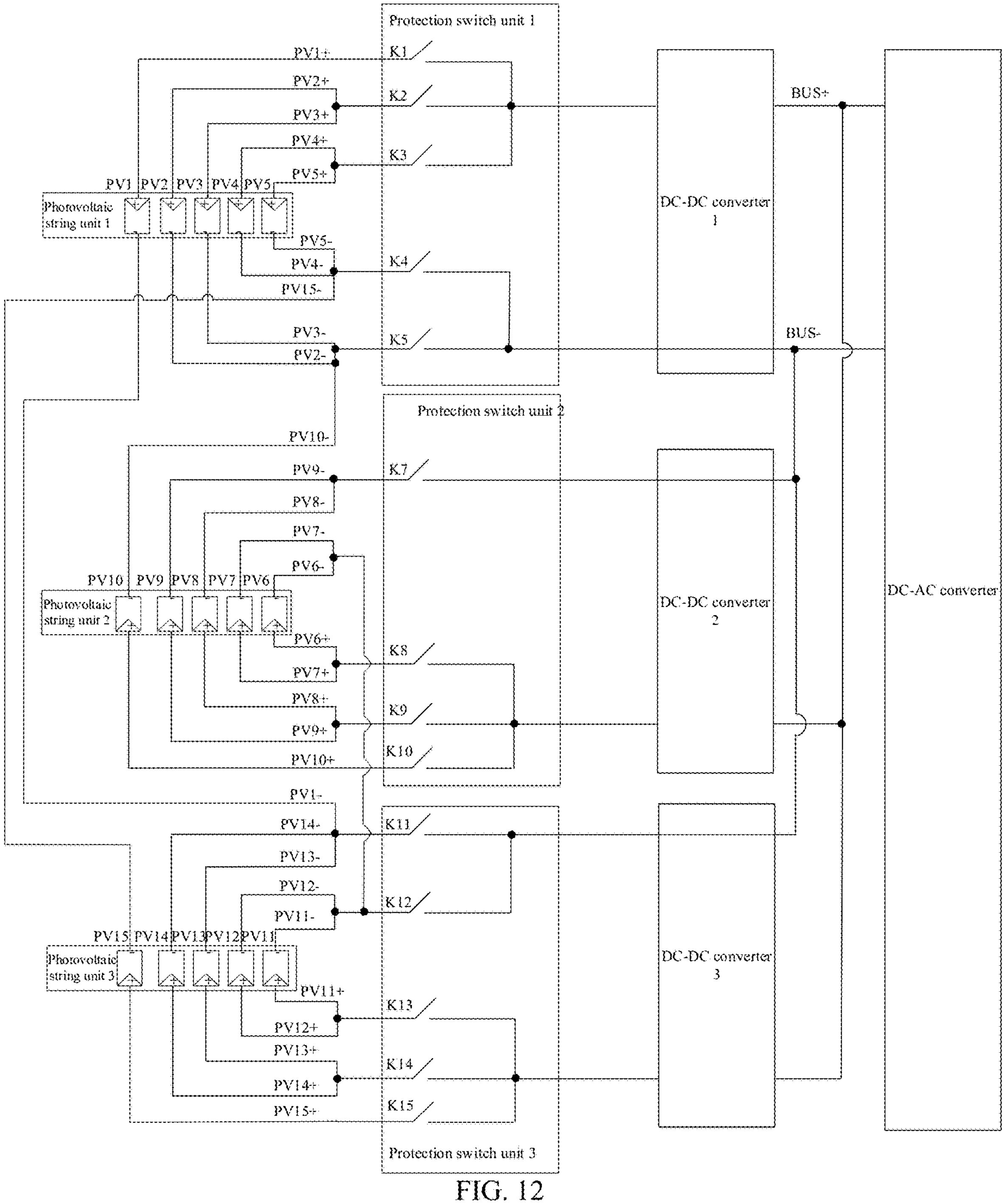
FIG. 12 is a schematic diagram of protection switch units corresponding to three co-negative power conversion units being connected to photovoltaic string units according to yet another embodiment of the present disclosure.

Exemplarily, referring to FIG. 12, the first power conversion unit may be a power conversion unit 1, and its corresponding photovoltaic strings are the photovoltaic string PV1, the photovoltaic string PV2, . . . , the photovoltaic string PV5 in the photovoltaic string unit 1. The second power conversion unit may be a power conversion unit 2, and its corresponding photovoltaic strings are the photovoltaic string PV6, the photovoltaic string PV7, . . . , the photovoltaic string PV10 in the photovoltaic string unit 2. The third power conversion unit may be a power conversion unit 3, and its corresponding photovoltaic strings are the photovoltaic string PV11, the photovoltaic string PV12, . . . , the photovoltaic string PV15 in the photovoltaic string unit 3.

When the protection switch is shared, the protection switch K5 is connected to the two parallel photovoltaic strings PV2 and PV3 in the photovoltaic string unit 1 and one photovoltaic string PV10 in the photovoltaic string unit 2. Moreover, the protection switch K5 is shared by the photovoltaic string unit 1 and the photovoltaic string unit 2, i.e., is shared by the power conversion unit 1 and the power conversion unit 2. The protection switch K4 is connected to the two parallel photovoltaic strings PV4 and PV5 in the photovoltaic string unit 1 and one photovoltaic string PV15 in the photovoltaic string unit 3. Moreover, the protection switch K4 is shared by the photovoltaic string unit 1 and the photovoltaic string unit 3, i.e., is shared by the power conversion unit 1 and the power conversion unit 3. The protection switch K11 is connected to the two parallel photovoltaic strings PV13 and PV14 in the photovoltaic string unit 3 and one photovoltaic string PV1 in the photovoltaic string unit 1. Moreover, the protection switch K11 is shared by the photovoltaic string unit 3 and the photovoltaic string unit 1, i.e., is shared by the power conversion unit 3 and the power conversion unit 1. The protection switch K12 is connected to the two parallel photovoltaic strings PV11 and PV12 in the photovoltaic string unit 3 and two parallel photovoltaic strings PV6 and PV7 in the photovoltaic string unit 2. Moreover, the protection switch K12 is shared by the photovoltaic string unit 3 and the photovoltaic string unit 2, i.e., is shared by the power conversion unit 3 and the power conversion unit 2. In this way, it is realized that any two power conversion units share the at least one protection switch in the corresponding protection switch unit.

It should be noted that FIG. 12 is described by taking the co-negative power conversion units as an example. For the co-positive power conversion units to be similar to the co-negative power conversion units, its details will not be described herein. In addition, for three or more situations, reference may be made to three situations, and its details will not be described herein.

In this way, when there are three or more co-positive power conversion units or co-negative power conversion units, it can be realized that any two power conversion units share at least one protection switch of the corresponding protection switch units, thereby reducing the number of protection switches.

In some embodiments, the plurality of protection switches in each of the plurality of protection switch units is configured as a multi-pole linked switch. The multi-pole linked switch refers to a switch that includes a plurality of linkable pole switches. For example, the plurality of pole switches can be switched on or off simultaneously. The pole switch includes a positive switch and a negative switch. The positive switch refers to a switch, such as the protection switch K1, the protection switch K2, and the protection switch K3 in FIG. 12, connected to the positive electrode of the photovoltaic string. The negative switch refers to a switch connected to the negative electrode of the photovoltaic string, such as the protection switch K4 and the protection switch K5 in FIG. 12. Structures, models, and the like of the positive switch and the negative switch may be the same or different, i.e., the switch itself may not be distinguished, which may each be, but is not limited to, a direct-current circuit breaker, and the like.

Based on the foregoing analysis, it can be seen that in the embodiments of the present disclosure, the number of protection switches can be reduced. Therefore, when the protection switch unit is a multi-pole linked switch, a small number of protection switches are beneficial to lowering manufacturing difficulty of the multi-pole linked switch and improving linked reliability of the multi-pole linked switch.

In some embodiments, when the photovoltaic power generation system has a reverse-connection fault branch, the co-positive power conversion units or the co-negative power conversion units withstand two times the voltage of the photovoltaic string via at least three protection switches when disconnecting corresponding protection switch units based on the reverse-connection fault branch.

It should be noted that the reverse-connection fault branch refers to a photovoltaic string branch with the occurrence of a reverse-connection fault. Exemplarily, referring to FIG. 5*a*, when a feedback fault occurs in the photovoltaic string PV1, the photovoltaic string branch corresponding to the protection switch K1 and the photovoltaic string branch corresponding to the protection switch K6 are reverse-connection fault branches.

Based on the foregoing analysis, it can be seen that when a reverse-connection fault occurs in the photovoltaic power generation system, the photovoltaic string with the occurrence of the reverse-connection fault can be detected, i.e., the reverse-connection fault branch can be detected, and then a protection switch unit corresponding to the reverse-connection fault branch can be controlled to be disconnected. Exemplarily, referring to FIG. 5*a*, when a reverse-connection fault occurs in the photovoltaic string PV1, the protection switch unit 1 and the protection switch unit 2 are controlled to be disconnected. Further, when the protection switch unit 1 and the protection switch unit 2 are controlled to be disconnected, the at least three protection switches withstand two times the voltage of the photovoltaic string. Exemplarily, referring to FIG. 5*a*, when a reverse-connection fault occurs in the photovoltaic string PV1, in a loop formed by the photovoltaic string PV2 and the photovoltaic string PV1, the protection switch K2, protection switch K1, protection switch K6, and protection switch K5 are provided to withstand two times the voltage of the photovoltaic string; in a loop formed by the photovoltaic string PV3 and the photovoltaic string PV1, the protection switch K3, protection switch K1, protection switch K6, and protection switch K4 are provided to withstand two times the voltage of the photovoltaic string, while the photovoltaic string PV4, the photovoltaic string PV5, and the photovoltaic string PV6 cannot form a loop with the photovoltaic string PV1. Accordingly, no protection switch withstands two times the voltage of the photovoltaic string. The low-voltage protection switch with a low cost can be used because of satisfying the requirement of withstanding two times the voltage of the photovoltaic string by the at least three protection switches.

It should be noted that, for other cases, reference may be made to the foregoing, and its details will not be described herein.

In this way, a protection switch with a low voltage level can be used for disconnecting, so that in a case where the withstand voltage level of the protection switch is not increased, i.e., in a case where the low-voltage protection switch with a low cost can continue to be used, the number of the protection switches is reduced, thereby lowering the cost and the volume of the protection switch unit.

In some embodiments, the control portion is further configured to control, in response to detecting the fault in the photovoltaic power generation system, a positive input terminal and a negative input terminal of power conversion units corresponding to a corresponding photovoltaic string unit to be short-circuited. In this way, a maximum disconnection current of the protection switch unit can be reduced, and the safety of the protection switch unit during disconnection is improved. Therefore, the protection switch unit is enabled to disconnect and isolate the fault more safely and reliably.

Figure 13:
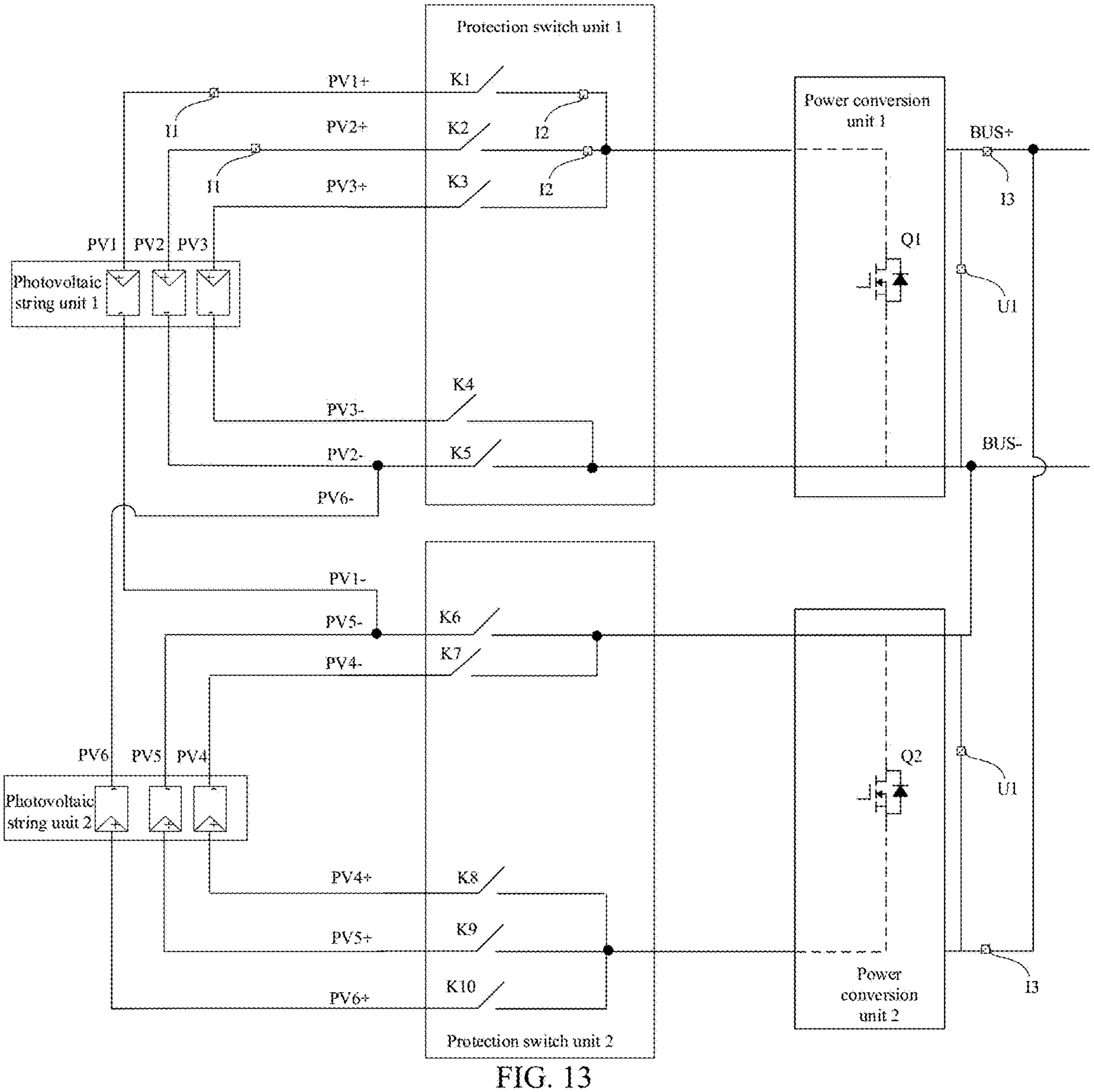
FIG. 13 is a schematic diagram of a positive input terminal and a negative input terminal of the power conversion unit being short-circuited according to an embodiment of the present disclosure.

For example, referring to FIG. 13, when a fault occurs in the photovoltaic power generation system, for example, a reverse-connection fault or a short-circuit fault occurs in the photovoltaic string PV1, and when the photovoltaic power generation system is short-circuited, a current of each of the photovoltaic string PV2 and the photovoltaic string PV3 flows into the photovoltaic string PV1. When the protection switch unit 1 and the protection switch unit 2 are directly disconnected at this time, the protection switch K1 and the protection switch K6 need to be disconnected when subjected to two times a short-circuit current of the single photovoltaic string, i.e., a sum of the current of the photovoltaic string PV2 and the current of the photovoltaic string PV3. During reverse connection, i.e., positions of the positive electrode PV1+ and the negative electrode PV1− of the photovoltaic string PV1 are interchanged, since there is an anti-parallel diode in the photovoltaic component, the current of the photovoltaic string PV2 and the current of the photovoltaic string PV3 are reversely poured to the photovoltaic string PV1. When the protection switch unit 1 and the protection switch unit 2 are directly disconnected at this time, the protection switch K1 and the protection switch K6 need to be disconnected when subjected to two times the short-circuit current of a single photovoltaic string, i.e., the sum of the currents of the photovoltaic string PV2 and the photovoltaic string PV3. When the protection switch unit 1 and the protection switch unit 2 are disconnected, a safety risk occurs. At this time, a switch tube Q1 in the power conversion unit 1 can be controlled to make the positive input terminal and the negative input terminal of the power conversion unit 1 short-circuited, i.e., a new short-circuit channel or reverse-connection channel is formed inside the power conversion unit 1. Since impedance of the switch tube Q1 in the channel is smaller than impedance of the photovoltaic string, most of short-circuit currents or reverse-connection currents pass through the channel, thereby effectively lowering a current flowing through the protection switch K1 and the protection switch K6 corresponding to the photovoltaic string PV1. Therefore, the protection switch K1 and the protection switch K6 are enabled to be disconnected more safely and reliably, enabling the protection switch unit 1 and the protection switch unit 2 to disconnect and isolate the fault more safely and reliably.

For another example, a reverse-connection fault or a short-circuit fault occurs in the photovoltaic string PV4. When the photovoltaic power generation system is short-circuited, a current of each of the photovoltaic string PV5 and the photovoltaic string PV6 flows into the photovoltaic string PV4. When the protection switch unit 1 and the protection switch unit 2 are directly disconnected at this time, the protection switch K8 and the protection switch K7 need to be disconnected when subjected to two times the short-circuit current of the single photovoltaic string, i.e., a sum of the current of the photovoltaic string PV5 and the current of the photovoltaic string PV6. During reverse connection, i.e., positions of the positive electrode PV4+ and the negative electrode PV5− of the photovoltaic string PV4 are interchanged, since there is an anti-parallel diode in the photovoltaic component, the current of the photovoltaic string PV5 and the current of the photovoltaic string PV6 are reversely poured to the photovoltaic string PV4. When the protection switch unit 1 and the protection switch unit 2 are directly disconnected at this time, the protection switch K8 and the protection switch K7 need to be disconnected when subjected to two times the short-circuit current of a single photovoltaic string, i.e., the sum of the currents of the photovoltaic string PV5 and the photovoltaic string PV6. When the protection switch unit 1 and the protection switch unit 2 are disconnected, a safety risk occurs. At this time, a switch tube Q2 in the power conversion unit 2 can be controlled to make the positive input terminal and the negative input terminal of the power conversion unit 2 short-circuited, i.e., a new short-circuit channel or reverse-connection channel is formed inside the power conversion unit 2. Since impedance of the switch tube Q2 in the channel is smaller than impedance of the photovoltaic string, most of short-circuit currents or reverse-connection currents pass through the channel, thereby effectively lowering a current flowing through the protection switch K8 and the protection switch K7 corresponding to the photovoltaic string PV4. Therefore, the protection switch K8 and the protection switch K7 are enabled to be disconnected more safely and reliably, enabling the protection switch unit 1 and the protection switch unit 2 to disconnect and isolate the fault more safely and reliably.

It should be noted that the switch tube Q1 and the switch tube Q2 are generally semiconductor devices, including but not limited to IGBT, MOSFET, and the like. In addition, for other cases, reference may be made to the foregoing, and its details will not be described herein.

In this way, when a fault in the photovoltaic power generation system is detected, the positive input terminal and the negative input terminal of the power conversion unit corresponding to the corresponding photovoltaic string unit are controlled to be short-circuited, which can lower the maximum disconnection current of the protection switch unit and improve the safety of the protection switch unit during disconnection, enabling the protection switch unit to disconnect and isolate the fault more safely and reliably.

In some embodiments, the control portion is further configured to control, subsequent to the positive input terminal and the negative input terminal of the power conversion units corresponding to the corresponding photovoltaic string unit being short-circuited, part or all of the plurality of protection switch units to be disconnected.

Exemplarily, referring to FIG. 13, when a reverse-connection fault or a short-circuit fault occurs in the photovoltaic string PV1, the protection switch unit 1 and the protection switch unit 2 can be controlled to be disconnected while or after controlling the switch tube Q1 in the power conversion unit 1 to make the positive input terminal and the negative input terminal of the power conversion unit 1 short-circuited, so as to disconnect and isolate the fault. When a reverse-connection fault or a short-circuit fault occurs in the photovoltaic string PV4, the protection switch unit 1 and the protection switch unit 2 can be controlled to be disconnected while or after controlling the switch tube Q2 in the power conversion unit 2 to make the positive input terminal and the negative input terminal of the power conversion unit 2 short-circuited, so as to disconnect and isolate the fault.

It should be noted that, about whether controlling part or all of the plurality of protection switch units to be disconnected, reference may be made to the foregoing, and its details will not be described herein.

In this example, when the protection switch unit is disconnected, the maximum disconnection current of the protection switch unit is reduced, such that the safety and reliability during disconnection can be improved.

In some embodiments, the control portion is further configured to, after the positive input terminal and the negative input terminal of the power conversion unit corresponding to the corresponding photovoltaic string unit are short-circuited, obtain at least one of a current value of a branch where each photovoltaic string is located, a current value of each photovoltaic string branch, and a current value of a direct current bus, and control the part or all of the plurality of protection switch units to be disconnected in response to determining that a power generation current of the photovoltaic power generation system is smaller than a first predetermined value according to the at least one of the current value of the branch where each photovoltaic string is located, the current value of each photovoltaic string branch, and the current value of the direct current bus.

In an exemplary embodiment of the present disclosure, after the positive input terminal and the negative input terminal of the power conversion unit corresponding to the corresponding photovoltaic string unit are short-circuited, the power generation current of the photovoltaic power generation system can be determined first, and then the corresponding photovoltaic string unit is controlled to be disconnected in a case where the power generation current is small, so that the safety and reliability of the photovoltaic string unit during disconnection are further improved. There are many ways to determine whether the power generation current of the photovoltaic power generation system is smaller than the first set value. For example, it can be determined based on the current value of the branch where the photovoltaic string is located, the current value of the photovoltaic string branch, the current value of the direct current bus, or a mutual combination of the three current values, which is not limited herein.

Exemplarily, referring to FIG. 13, after the positive input terminal and the negative input terminal of the power conversion unit 1 are short-circuited, the current value of the branch where each photovoltaic string is located, such as a current value of a branch where each of the photovoltaic strings PV1, PV2, and PV3 is located, is obtained, and the current values are summed to obtain the power generation current of the photovoltaic power generation system; or the current value of each photovoltaic string branch, such as a current value of a branch where the protection switch K1 is located, a current value of a branch where the protection switch K2 is located, and a current value of a branch where the protection switch K3 is located, is obtained, and the current values are summed to obtain the power generation current of the photovoltaic power generation system; or the current value of the direct current bus BUS+ is obtained to obtain the power generation current of the photovoltaic power generation system. Then, when the power generation current is smaller than the first set value, i.e., when the current flowing into the protection switch unit 1 and the protection switch unit 2 is small, the protection switch unit 1 and the protection switch unit 2 are controlled to be disconnected, so as to further improve safety and reliability when the protection switch units 1 and 2 are disconnected.

In this way, after the positive input terminal and the negative input terminal of the power conversion unit are short-circuited, in a case where it is determined that the power generation current of the photovoltaic power generation system is small, the protection switch unit is controlled to be disconnected, which can further improve the safety and reliability of the protection switch unit during disconnection.

In some embodiments, the control portion is further configured to, after the positive input terminal and the negative input terminal of the power conversion unit corresponding to the corresponding photovoltaic string unit are short-circuited, obtain an illumination intensity and control the part or all of the plurality of protection switch units to be disconnected when the illumination intensity is smaller than a predetermined intensity.

It should be noted that the illumination intensity may be obtained by an illumination sensor or the like. The predetermined intensity value may be calibrated according to the actual situation, which is not limited herein.

Exemplarily, referring to FIG. 13, after the positive input terminal and the negative input terminal of the power conversion unit 1 are short-circuited, the current illumination intensity can be obtained firstly. In a case where the illumination intensity is small, the power generation current of the corresponding photovoltaic power generation system is small, so that the current flowing through the protection switch unit 1 and the protection switch unit 2 is small. In this way, the safety and reliability of the protection switch unit 1 and the protection switch unit 2 can be further improved when the protection switch unit 1 and the protection switch unit 2 are controlled to be disconnected.

In this way, after the positive input terminal and the negative input terminal of the power conversion unit are short-circuited, the protection switch unit is controlled to be disconnected in the case where the illumination intensity is small. The illumination intensity is small, the power generation current of the corresponding photovoltaic power generation system is small, and the current flowing through the protection switch unit is small. Therefore, the safety and reliability of the protection switch unit during disconnection can be further improved.

In some embodiments, the fault protection device further includes a parameter detection portion configured to detect at least one of a parameter value of a branch where each photovoltaic string is located, a parameter value of each photovoltaic string branch, and a parameter value of a direct current bus. The control portion is further configured to detect a fault in the photovoltaic power generation system according to the at least one of the parameter value of the branch where each photovoltaic string is located, the parameter value of each photovoltaic string branch, and the parameter value of the direct current bus.

It should be noted that the fault may include a short-circuit fault or a reverse-connection fault. The parameter value may include a voltage, a current value, a temperature value, or a power value, etc. For example, it can be determined that whether a short-circuit fault or a reverse-connection fault occurs in the photovoltaic power generation system based on a current value, a temperature value, a power value, or the like of the branch where each photovoltaic string is located. For another example, it can be determined that whether a short-circuit fault or a reverse-connection fault occurs in the photovoltaic power generation system based on a current value, a temperature value, a power value, or the like of each photovoltaic string branch. For another example, it can be determined that whether a short-circuit fault or a reverse-connection fault occurs in the photovoltaic power generation system based on a voltage, a current value and a temperature value, or the like of the direct current bus.

For example, during operation of the photovoltaic power generation system, the parameter value, such as the current value, of the branch where each photovoltaic string is located can be obtained in real time through the parameter detection portion. In normal cases, the current value of the branch where each photovoltaic string is located is an output current when the photovoltaic string operates normally. However, when a short circuit or a reverse connection occurs in the photovoltaic string, output currents of other photovoltaic strings are reversely poured to the faulty photovoltaic string, resulting in an increase in the current value of the faulty photovoltaic string. Meanwhile, the current is reversed. Therefore, it is determined that whether a fault occurs in the photovoltaic power generation system simply and accurately based on the current value of the faulty photovoltaic string.

Exemplarily, referring to FIG. 13, in a normal case, the current value of the branch where each photovoltaic string is located is the output current when the photovoltaic string operates normally. However, when a short circuit or a reverse connection occurs in the photovoltaic string PV1, output currents of the photovoltaic string PV2 and the photovoltaic string PV3 are reversely poured to the photovoltaic string PV1, resulting in an increase in a current of a branch where the photovoltaic string PV1 is located to two times an output current of a single photovoltaic string. Moreover, a current direction is opposite a normal direction. Therefore, it can be determined that whether a short-circuit fault or a reverse-connection fault occurs in the photovoltaic power generation system based on the current value of the branch where the photovoltaic string PV1 is located.

For another example, during the operation of the photovoltaic power generation system, the parameter value, such as the current value, of the photovoltaic string branch can be obtained in real time through the parameter detection portion. In normal cases, the current value of each photovoltaic string branch is a sum of an output current or an output current of the photovoltaic string connected thereto. However, when a short circuit or a reverse connection occurs in the photovoltaic string, the current of the corresponding photovoltaic string branch may increase or reverse. Therefore, it can be determined that whether a fault occurs in the photovoltaic power generation system simply and accurately on the basis of the current value of the photovoltaic string branch.

Exemplarily, referring to FIG. 13, in a normal case, a current value of the photovoltaic string branch corresponding to the protection switch K1 is an output current of the photovoltaic string PV1. A current value of the photovoltaic string branch corresponding to the protection switch K2 is an output current of the photovoltaic string PV2. A current value of the photovoltaic string branch corresponding to the protection switch K3 and the protection switch K4 is an output current of the photovoltaic string PV3. A current value of the photovoltaic string branch corresponding to the protection switch K5 is a sum of the output current of the photovoltaic string PV2 and an output current of the photovoltaic string PV6. When a short circuit or a reverse connection occurs in the photovoltaic string PV1, the value of the current flowing through the photovoltaic string branch corresponding to the protection switch K1 is a sum of the output current of the photovoltaic string PV2 and the output current of the photovoltaic string PV3, and the current value is increased. Moreover, the current direction is opposite to the normal direction. Therefore, based on the detected current value of the photovoltaic string branch corresponding to the protection switch K1, it can be determined that a short-circuit fault or a reverse-connection fault occurs in the photovoltaic power generation system.

For yet another example, during operation of the photovoltaic power generation system, the current value of the direct-current bus can be obtained in real time through the parameter detection portion. In a normal case, the current value of the direct-current bus is a sum of output currents of the at least N photovoltaic strings. However, when a short circuit or a reverse connection occurs in the photovoltaic string, less current flows through the direct-current bus. Therefore, a fault in the photovoltaic power generation system can be simply and accurately determined based on the current value of the direct-current bus.

Exemplarily, referring to FIG. 13, in a normal case, the current value of the direct current bus of the power conversion unit 1 is a sum of the output currents of the three photovoltaic strings. When a short circuit or a reverse connection occurs in the photovoltaic string PV1, the output current of the photovoltaic string PV2 and the output current of the photovoltaic string PV3 are reversely poured to the photovoltaic string PV1 through the protection switch unit 1, and there are few currents flowing through the direct current bus of the power conversion unit 1. Therefore, a short circuit or a reverse connection in the current photovoltaic power generation system can be determined based on the detected current value of the direct current bus.

In this way, a fault in the photovoltaic power generation system can be simply and accurately detected by detecting one or more of the parameter value of the branch where the photovoltaic string is located, the parameter value of the photovoltaic string branch and the parameter value of the direct current bus. Moreover, there are a plurality of detection modes.

In some embodiments, the parameter detection portion includes at least one of a first current sensor and a second current sensor. The first current sensor is configured to detect first current information of a branch where any one photovoltaic string is located and transmit the first current information to the control portion. The second current sensor is configured to detect second current information of any one photovoltaic string branch and transmit the second current information to the control portion. It should be noted that, "any" herein refers to that sensors provided on each branch are not distinguished.

For example, referring to FIG. 13, a first current sensor I1 may be provided on the branch where each photovoltaic string is located. In an exemplary embodiment of the present disclosure, the first current sensor I1 may be provided at a positive electrode of each photovoltaic string. Current information of a branch where a corresponding photovoltaic string is located is obtained through the first current sensor I1, which is recorded as the first current information, may include a current value and a current direction, and transmits the first current information to the control portion.

Alternatively, a second current sensor 12 is provided on each photovoltaic string branch. Current information of the corresponding photovoltaic string branch obtained through the second current sensor 12 is recorded as the second current information, and may include the current value and the current direction. Moreover, the second current information is transmitted to the control portion.

Alternatively, the first current sensor I1 is provided on the branch where each photovoltaic string is located, and the second current sensor 12 is provided on each photovoltaic string branch. The first current information and the second current information are obtained by the first current sensor I1 and the second current sensor 12 and transmitted to the control portion.

Further, the control portion is further configured to: determine a fault in the photovoltaic power generation system in response to determining that a current direction of the branch where the photovoltaic string is located is opposite to a predetermined direction according to the first current information; or determine a fault in the photovoltaic power generation system in response to determining that a current direction of the photovoltaic string branch is opposite to a predetermined direction according to the second current information; or determine the fault in the photovoltaic power generation system in response to determining that the current direction of the branch where the photovoltaic string is located is opposite to a predetermined direction according to the first current information and determining that the current direction of the photovoltaic string branch is opposite to a predetermined direction according to the second current information.

That is, it can be determined the fault in the photovoltaic power generation system based on the current direction of the branch where the photovoltaic string is located, the current direction of the photovoltaic string branch, the current direction of the branch where the photovoltaic string is located, and the current direction of the photovoltaic string branch.

Exemplarily, referring to FIG. 13, in a normal case, the current direction of the branch where each photovoltaic string is located and the current direction of each photovoltaic string branch are each flowing out from the positive electrode of the photovoltaic string and inflowing from the negative electrode of the photovoltaic string. When a short circuit or a reverse connection occurs in the photovoltaic string PV1, the output current of the photovoltaic string PV2 and the output current of the photovoltaic string PV3 are reversely poured to the photovoltaic string PV1, so that the current direction of the branch where the photovoltaic string PV1 is located and the current direction of the photovoltaic string branch corresponding to the protection switch K1 are opposite to their normal directions. Therefore, the fault in the photovoltaic power generation system is determined in response to determining that the current direction of the branch where the photovoltaic string PV1 is located is opposite to the predetermined direction according to the first current information, or determining that the current direction of the photovoltaic string branch corresponding to the protection switch K1 is opposite to the predetermined direction according to the second current information, or determining that the current direction of the branch where the photovoltaic string PV1 is located is opposite to the predetermined direction according to the first current information and determining that the current direction of the photovoltaic string branch corresponding to the protection switch K1 is opposite to the predetermined direction according to the second current information.

In this way, based on the detected current direction, a fault in the photovoltaic power generation system can be simply and accurately detected.

Further, the control portion is further configured to: determine the fault in the photovoltaic power generation system in response to determining that an absolute current value of the branch where the photovoltaic string is located is greater than a first predetermined current threshold according to the first current information; or determine the fault in the photovoltaic power generation system in response to determining that an absolute current value of the photovoltaic string branch is greater than a second predetermined current threshold according to the second current information; or determine the fault in the photovoltaic power generation system in response to determining that the absolute current value of the branch where the photovoltaic string is located is greater than the first predetermined current threshold according to the first current information and determining that the absolute current value of the photovoltaic string branch is greater than the second predetermined current threshold according to the second current information.

That is, the fault in the photovoltaic power generation system can be determined based on the current of the branch where the photovoltaic string is located, the current of the photovoltaic string branch, the current of the branch where the photovoltaic string is located, and the current of the photovoltaic string branch.

Exemplarily, referring to FIG. 13, in a normal case, a current of the photovoltaic string branch corresponding to each protection switch is a sum of the output current or the output current of the photovoltaic string connected thereto. When a short circuit or a reverse connection occurs in the photovoltaic string PV1, the output current of the photovoltaic string PV2 and the output current of the photovoltaic string PV3 are reversely poured to the photovoltaic string PV1 through the protection switch unit 1, allowing the current of the branch where the photovoltaic string PV1 is located to be increased to two times the output current of a single photovoltaic string, and the value of the current flowing through the photovoltaic string branch corresponding to the protection switch K1 is the sum of the output current of the photovoltaic string PV2 and the output current of the photovoltaic string PV3, and the current value increases. Therefore, the fault in the photovoltaic power generation system is determined in response to determining that the absolute current value of the branch where the photovoltaic string PV1 is located is greater than the first predetermined current threshold according to the first current information, or determining that the absolute current value of the photovoltaic string branch corresponding to the protection switch K2 is greater than the second predetermined current threshold according to the second current information, or determining that the absolute current value of the branch where the photovoltaic string PV1 is located is greater than the first predetermined current threshold according to the first current information and determining that the absolute current value of the photovoltaic string branch corresponding to the protection switch K2 is greater than the second predetermined current threshold according to the second current information.

In this way, based on the detected current, a fault in the photovoltaic power generation system can be simply and accurately detected.

In some embodiments, the parameter detection portion further includes a first voltage sensor configured to detect a voltage of the direct current bus and transmit a voltage of the direct current bus to the control portion.

For example, referring to FIG. 13, the first voltage sensor U1 may be provided on a direct current bus of each power conversion unit. In an exemplary embodiment of the present disclosure, the first voltage sensor U1 may be provided between the positive output terminal and the negative output terminal of each power conversion unit. The voltage of the direct current bus of each power conversion unit is detected through the first voltage sensor U1 and transmitted to the control portion.

Further, the control portion is further configured to determine the fault in the photovoltaic power generation system when the voltage of the direct current bus is smaller than the first predetermined voltage threshold.

That is, the control portion may determine the fault in the photovoltaic power generation system based on the voltage of the direct current bus.

Exemplarily, referring to FIG. 13, in a normal case, the voltage of the direct current bus of the power conversion unit 1 is a voltage after the three photovoltaic strings are connected in parallel. When a short circuit or a reverse connection occurs in the photovoltaic string PV1, the output current of the photovoltaic string PV2 and the output current of the photovoltaic string PV3 are reversely poured to the photovoltaic string PV1 through the protection switch unit 1. However, there are few currents flowing through the direct current bus of the power conversion unit 1, and the voltage of the direct current bus of the power conversion unit 1 is very small. Therefore, when it is determined that the voltage of the direct current bus of the power conversion unit 1 is smaller than the first predetermined voltage threshold, the fault in the photovoltaic power generation system is determined.

In this way, based on the detected voltage, a fault in the photovoltaic power generation system can be simply and accurately detected.

Further, the control portion is further configured to: determine the fault in the photovoltaic power generation system in response to determining that an absolute current value of the branch where the photovoltaic string is located is greater than a first predetermined current threshold according to the first current information and determining that the voltage of the direct current bus is smaller than a first predetermined voltage threshold; or determine the fault in the photovoltaic power generation system in response to determining that an absolute current value of each photovoltaic string branch is greater than a second predetermined current threshold according to the second current information and determining that the voltage of the direct current bus is smaller than a first predetermined voltage threshold.

That is, the fault in the photovoltaic power generation system can be determined based on the current of the branch where the photovoltaic string is located and the voltage of the direct current bus, or based on the current of the photovoltaic string branch and the voltage of the direct current bus.

For example, referring to FIG. 13, in a normal case, the current value of the branch where each photovoltaic string is located is the output current when the photovoltaic string operates normally. The current of the photovoltaic string branch corresponding to each protection switch is the sum of the output current or the output current of the photovoltaic string connected thereto. The voltage of the direct current bus of the power conversion unit 1 is the voltage after the three photovoltaic strings are connected in parallel.

When a short circuit or a reverse connection occurs in the photovoltaic string PV1, the output current of the photovoltaic string PV2 and the output current of the photovoltaic string PV3 are reversely poured to the photovoltaic string PV1, allowing the current of the branch where the photovoltaic string PV1 is located to be increased to two times the output current of a single photovoltaic string, and the current value of the photovoltaic string branch corresponding to the protection switch K1 is the sum of the output current of the photovoltaic string PV2 and the output current of the photovoltaic string PV3, and the current value increases. However, there are few currents flowing through the direct current bus of the power conversion unit 1, and the voltage of the direct current bus of the power conversion unit 1 is very small. Therefore, the fault in the photovoltaic power generation system is determined in response to determining that the absolute current value of the branch where the photovoltaic string PV1 is located is greater than the first predetermined current threshold according to the first current information and determining that the voltage of the direct current bus of the power conversion unit 1 is smaller than the first predetermined voltage threshold, or determining that the absolute current value of the photovoltaic string branch corresponding to the protection switch K1 is greater than the second predetermined current threshold according to the second current information and determining that the voltage of the direct current bus of the power conversion unit 1 is smaller than the first predetermined voltage threshold.

In this way, based on the detected current and the detected voltage, the fault in the photovoltaic power generation system can be simply and accurately detected.

In some embodiments, the parameter detection portion further includes a third current sensor. The third current sensor is configured to detect the current information of the direct current bus and transmit the current information of the direct current bus to the control portion.

For example, referring to FIG. 13, the third current sensor 13 may be provided on the direct current bus of each power conversion unit. In an exemplary embodiment of the present disclosure, the third current sensor 13 may be provided on a positive direct current bus. The current information of the direct current bus is detected by the third voltage sensor 13, may include a current value and is transmitted to the control portion.

Further, the control portion is further configured to: determine an absolute current value of a branch where any photovoltaic string is located according to the first current information, determining an absolute current value of the direct current bus according to the current information of the direct current bus, and determining the fault in the photovoltaic power generation system in response to determining that the absolute current value of the branch where any photovoltaic string is located is greater than the absolute current value of the direct current bus; or determine an absolute current value of any photovoltaic string branch according to the second current information, determining the absolute current value of the direct current bus according to the current information of the direct current bus, and determining the fault in the photovoltaic power generation system in response to determining that the absolute current value of any photovoltaic string branch is greater than the absolute current value of the direct current bus; or determine the absolute current value of the branch where any photovoltaic string is located according to the first current information, determining the absolute current value of the direct current bus according to the current information of the direct current bus, determining the absolute current value of any photovoltaic string branch according to the second current information, and determining the fault in the photovoltaic power generation system in response to determining that the absolute current value of the branch where any photovoltaic string is located is greater than the absolute current value of the direct current bus and determining that the absolute current value of any photovoltaic string branch is greater than the absolute current value of the direct current bus.

That is, the fault in the photovoltaic power generation system can be determined based on a relationship between the current of the branch where the photovoltaic string is located and the current of the direct current bus, or based on a relationship between the current of the photovoltaic string branch and the current of the direct current bus, or based on the relationship between the current of the branch where the photovoltaic string is located and the current of the direct current bus and the relationship between the current of the photovoltaic string branch and the current of the direct current bus.

Exemplarily, referring to FIG. 13, in a normal case, the current value of the branch where each photovoltaic string is located is the output current when the photovoltaic string operates normally. The current of the photovoltaic string branch corresponding to each protection switch is the sum of the output current or the output current of the photovoltaic string connected thereto. The current value of the direct current bus of the power conversion unit 1 is the sum of the output currents of the three photovoltaic strings.

When a short circuit or a reverse connection occurs in the photovoltaic string PV1, the output current of the photovoltaic string PV2 and the output current of the photovoltaic string PV3 are reversely poured to the photovoltaic string PV1. The current of each photovoltaic string and the current of each photovoltaic string branch is at least one times the output current of the photovoltaic string, but only little current flows through the direct current bus. Moreover, the current is smaller than 1 time the output current of the photovoltaic string. Therefore, the fault in the photovoltaic power generation system is determined in response to determining that the absolute current value of the branch where each photovoltaic string is located is greater than the absolute current value of direct current bus of the power conversion unit 1 according to the first current information, or determining that the absolute current value of each photovoltaic string branch is greater than the absolute current value of direct current bus of the power conversion unit 1 according to the second current information, or determining that the absolute current value of the branch where each photovoltaic string is located is greater than the absolute current value of direct current bus of the power conversion unit 1 according to the first current information and determining that the absolute current value of each photovoltaic string branch is greater than the absolute current value of direct current bus of the power conversion unit 1 according to the second current information.

In this way, based on the detected current, a fault in the photovoltaic power generation system can be simply and accurately detected.

It should be noted that the power conversion unit 1 illustrated in FIG. 13 is mainly used for description about determining the fault in the photovoltaic power generation system and determining whether to control the protection switch unit to be disconnected on the basis of the illumination intensity or the current value, but this cannot be used as a limitation on these manners. These manners are applicable to all the system structures involved in the present disclosure, and will not be described herein.

In conclusion, with the fault protection device for the photovoltaic power generation system according to the embodiments of the present disclosure, the photovoltaic string branch is connected to one photovoltaic string or two parallel photovoltaic strings. The protection switch units corresponding to the co-positive power conversion units or co-negative power conversion units share the protection switch when connected to their corresponding photovoltaic string units. Moreover, part or all of the plurality of protection switches are disconnected, allowing a parallel connection to occur in at most two photovoltaic strings in the corresponding photovoltaic string units. Moreover, the protection switch units corresponding to the co-positive power conversion units or co-negative power conversion units when disconnected disconnect the corresponding photovoltaic strings through at least three protection switches. Therefore, in a case where the withstand voltage level of the protection switch is not increased, the number of the protection switches can be reduced, and the cost and the volume of the protection switch unit are further reduced.

Figure 14:
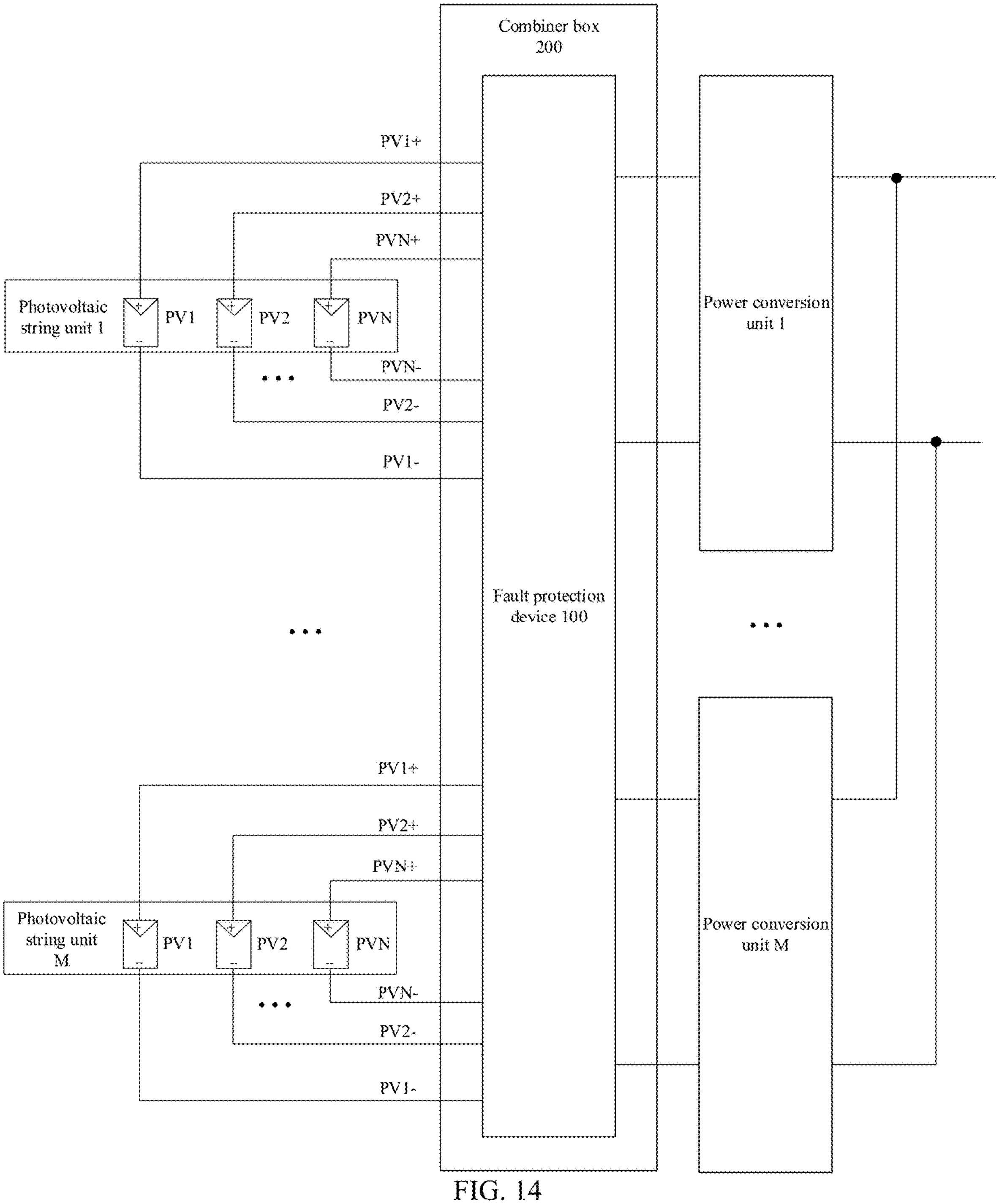
FIG. 14 is a schematic diagram of a combiner box according to an embodiment of the present disclosure.

In some embodiments, a combiner box 200 is further provided. Referring to FIG. 14, the combiner box 200 may include the fault protection device 100 as described above. The fault protection device 100 is configured to disconnect, in response to a fault in the photovoltaic power generation system, part or all of connections between the plurality of power conversion units (such as the power conversion unit 1, . . . , the power conversion unit M) and the plurality of photovoltaic string units (such as the photovoltaic string unit 1, . . . , the photovoltaic string unit M), such that when the protection switch units corresponding to the co-positive power conversion units or the co-negative power conversion units are disconnected, their corresponding photovoltaic strings (such as the photovoltaic string PV1, the photovoltaic string PV2, and the photovoltaic string PVN) are disconnected separately by at least three protection switches.

It should be noted that, in some examples, the combiner box 200 may also include a plurality of power conversion units. The plurality of power conversion units may be, but are not limited to, a DC/DC converter. For the related description for the fault protection device 100, reference may be made to the foregoing, and its details will not be described herein.

With the combiner box of the photovoltaic power generation system according to the embodiments of the present disclosure, based on the foregoing fault protection device, the number of the protection switches can be reduced without increasing the withstand voltage level of the protection switch, thereby reducing the cost and volume of the protection switch unit.

Figure 15:
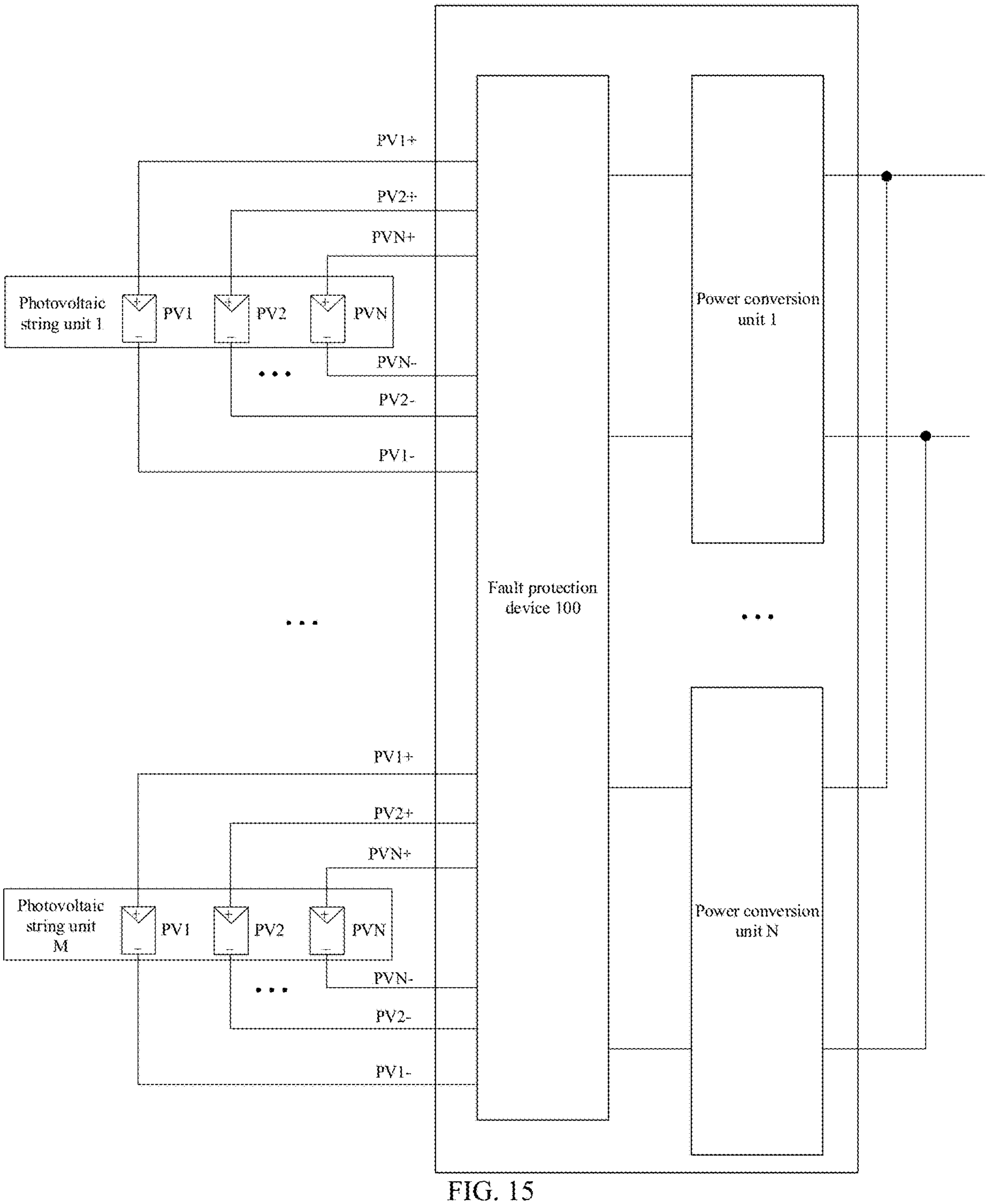
FIG. 15 is a schematic diagram of an inverter according to an embodiment of the present disclosure.

In some embodiments, further provided is an inverter 300. Referring to FIG. 15, the inverter 300 may include the foregoing fault protection device 100 and a plurality of power conversion units (such as the power conversion unit 1, . . . , the power conversion unit M). The fault protection device 100 is provided between the plurality of power conversion units and the plurality of photovoltaic string units (such as the photovoltaic string unit 1, . . . , the photovoltaic string unit M). In this way, in a case where a fault occurs in the photovoltaic power generation system, part or all of the connections between the plurality of power conversion units and the plurality of photovoltaic string units are disconnected, such that when the protection switch units corresponding to the co-positive power conversion units or the co-negative power conversion units are disconnected, their corresponding photovoltaic strings (such as the photovoltaic string PV1, the photovoltaic string PV2, and the photovoltaic string PVN) are disconnected separately by at least three protection switches.

It should be noted that, in some examples, the power conversion unit may include a DC/DC converter, or the power conversion unit includes a DC/DC converter and a DC/AC converter. For the related description for the fault protection device 100, reference may be made to the foregoing, and its details will not be described herein.

With the inverter of the photovoltaic power generation system according to the embodiments of the present disclosure, based on the foregoing fault protection device, the number of the protection switches can be reduced without increasing the withstand voltage level of the protection switch, thereby reducing the cost and volume of the protection switch unit.

Figure 16:
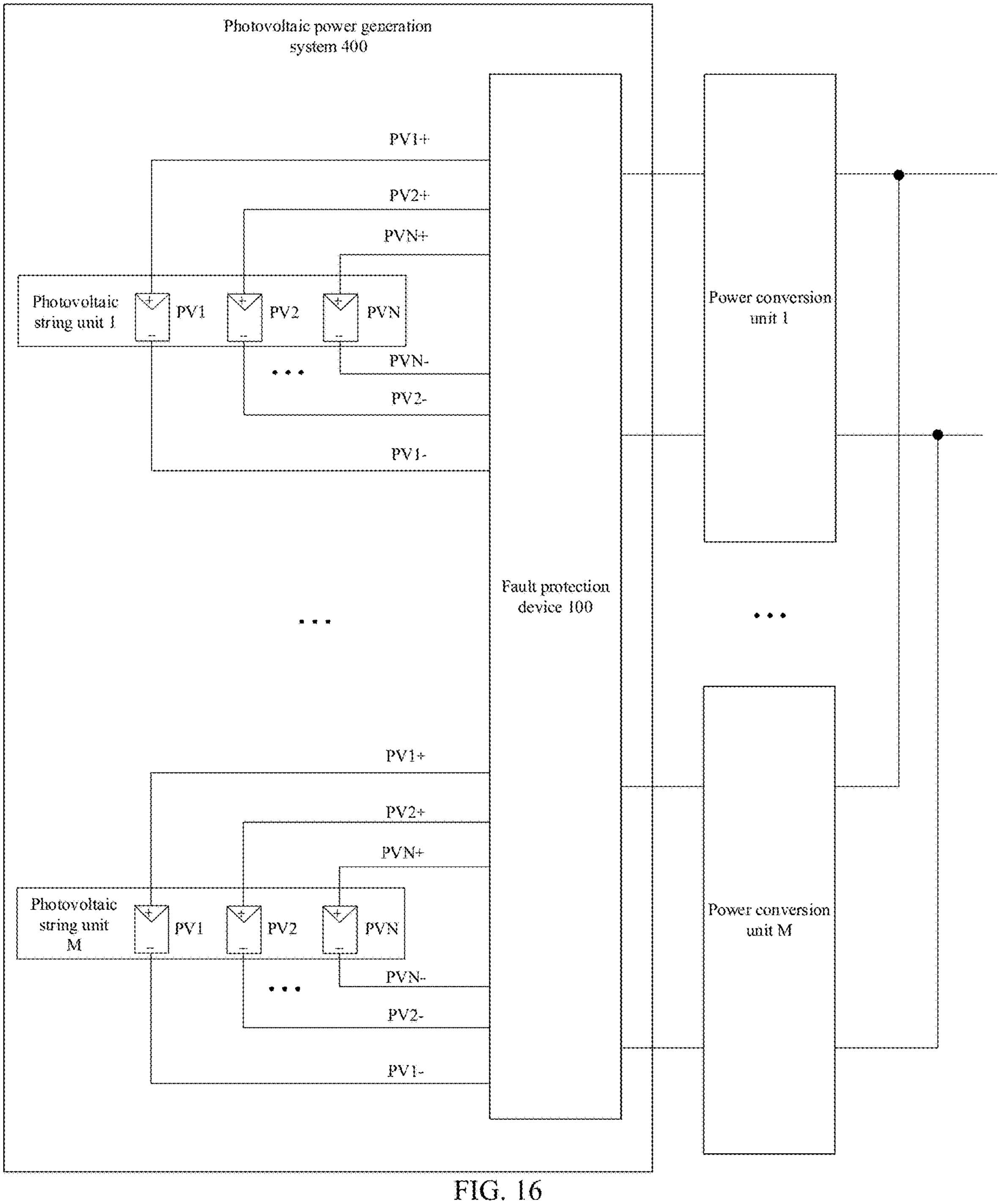
FIG. 16 is a schematic diagram of a photovoltaic power generation system according to an embodiment of the present disclosure.

In some embodiments, further provided is a photovoltaic power generation system 400. Referring to FIG. 16, the photovoltaic power generation system 400 includes a plurality of photovoltaic string units (such as the photovoltaic string unit 1, . . . , the photovoltaic string unit M). Each photovoltaic string unit of the plurality of photovoltaic string units includes at least N photovoltaic strings (such as the photovoltaic string PV1, the photovoltaic string PV2, and the photovoltaic string PVN), where N is an integer greater than or equal to 3. The photovoltaic power generation system 400 further includes the foregoing fault protection device 100, or the foregoing combiner box, or the foregoing inverter.

It should be noted that related descriptions about the fault protection device 100, the combiner box, and the inverter refer to the foregoing descriptions, and its details will not be described herein.

According to the photovoltaic power generation system of the embodiments of the present disclosure, based on the foregoing fault protection device, the combiner box, and the inverter, the number of the protection switches can be reduced without increasing the withstand voltage level of the protection switch, thereby reducing the cost and volume of the protection switch unit.

In some embodiments, a fault protection method is also provided.

The fault protection method may include disconnecting, when there are co-positive power conversion units or co-negative power conversion units in the plurality of power conversion units and the protection switch units corresponding to the co-positive power conversion units or the co-negative power conversion units share a protection switch when connected to their corresponding photovoltaic string units, part or all of the plurality of protection switch units in response to detecting a fault in the photovoltaic power generation system, such that the at most two photovoltaic strings in each of the corresponding photovoltaic string units are connected in parallel. When the protection switch units corresponding to the co-positive power conversion units or the co-negative power conversion units are disconnected, their corresponding photovoltaic strings are disconnected separately by at least three protection switches.

In some embodiments, the fault protection method further includes, in response to detecting the fault in the photovoltaic power generation system: controlling a positive input terminal and a negative input terminal of a power conversion unit corresponding to a corresponding photovoltaic string unit to be short-circuited.

In some embodiments, the fault protection method further includes, subsequent to the positive input terminal and the negative input terminal of the power conversion unit corresponding to the corresponding photovoltaic string unit being short-circuited: controlling part or all of the plurality of protection switch units to be disconnected.

In some embodiments, the fault protection method further includes, subsequent to the positive input terminal and the negative input terminal of the power conversion unit corresponding to the corresponding photovoltaic string unit being short-circuited: obtaining at least one of a current value of a branch where each photovoltaic string is located, a current value of each photovoltaic string branch, and a current value of a direct current bus, so as to control the part or all of the plurality of protection switch units to be disconnected in response to determining that a power generation current of the photovoltaic power generation system is smaller than a first predetermined value according to the at least one of the current value of the branch where each photovoltaic string is located, the current value of each photovoltaic string branch, and the current value of the direct current bus.

In some embodiments, the fault protection method further includes, subsequent to the positive input terminal and the negative input terminal of the power conversion unit corresponding to the corresponding photovoltaic string unit being short-circuited: obtaining an illumination intensity, so as to control the part or all of the plurality of protection switch units to be disconnected when the illumination intensity is smaller than a predetermined intensity.

In some embodiments, the fault protection method further includes: detecting at least one of a parameter value of a branch where each photovoltaic string is located, a parameter value of each photovoltaic string branch, and a parameter value of a direct current bus; and detecting the fault in the photovoltaic power generation system according to the at least one of the parameter value of the branch where each photovoltaic string is located, the parameter value of each photovoltaic string branch, and the parameter value of the direct current bus.

In some embodiments, the parameter value of the branch where each photovoltaic string is located includes first current information, and the parameter value of each photovoltaic string branch includes second current information. The fault protection method further includes: determining the fault in the photovoltaic power generation system in response to determining that a current direction of the branch where the photovoltaic string is located is opposite to a predetermined direction according to the first current information; or determining the fault in the photovoltaic power generation system in response to determining that a current direction of the photovoltaic string branch is opposite to a predetermined direction according to the second current information; or determining the fault in the photovoltaic power generation system in response to determining that the current direction of the branch where the photovoltaic string is located is opposite to a predetermined direction according to the first current information and determining that the current direction of the photovoltaic string branch is opposite to a predetermined direction according to the second current information.

In some embodiments, the parameter value of the branch where each photovoltaic string is located includes first current information, and the parameter value of each photovoltaic string branch includes second current information. The fault protection method further includes: determining the fault in the photovoltaic power generation system in response to determining that an absolute current value of the branch where the photovoltaic string is located is greater than a first predetermined current threshold according to the first current information; or determining the fault in the photovoltaic power generation system in response to determining that an absolute current value of the photovoltaic string branch is greater than a second predetermined current threshold according to the second current information; or determining the fault in the photovoltaic power generation system in response to determining that the absolute current value of the branch where the photovoltaic string is located is greater than the first predetermined current threshold according to the first current information and determining that the absolute current value of the photovoltaic string branch is greater than the second predetermined current threshold according to the second current information.

In some embodiments, the parameter value of the branch where each photovoltaic string is located includes first current information, and the parameter value of the direct current bus includes a voltage of the direct current bus. The fault protection method further includes: determining the fault in the photovoltaic power generation system in response to determining that an absolute current value of the branch where the photovoltaic string is located is greater than a first predetermined current threshold according to the first current information and determining that the voltage of the direct current bus is smaller than a first predetermined voltage threshold.

In some embodiments, the parameter value of the branch where each photovoltaic string is located includes second current information, and the parameter value of the direct current bus includes a voltage of the direct current bus. The fault protection method further includes: determining the fault in the photovoltaic power generation system in response to determining that an absolute current value of each photovoltaic string branch is greater than a second predetermined current threshold according to the second current information and determining that the voltage of the direct current bus is smaller than a first predetermined voltage threshold.

In some embodiments, the parameter value of the direct current bus includes a voltage of the direct current bus. The fault protection method further includes: determining the fault in the photovoltaic power generation system in response to determining that the voltage of the direct current bus is smaller than a first predetermined voltage threshold.

In some embodiments, the parameter value of the branch where each photovoltaic string is located includes first current information, the parameter value of each photovoltaic string branch includes second current information and the parameter value of the direct current bus includes current information of the direct current bus. The fault protection method further includes: determining an absolute current value of a branch where any photovoltaic string is located according to the first current information, determining an absolute current value of the direct current bus according to the current information of the direct current bus, and determining the fault in the photovoltaic power generation system in response to determining that the absolute current value of the branch where any photovoltaic string is located is greater than the absolute current value of the direct current bus; or determining an absolute current value of any photovoltaic string branch according to the second current information, determining the absolute current value of the direct current bus according to the current information of the direct current bus, and determining the fault in the photovoltaic power generation system in response to determining that the absolute current value of any photovoltaic string branch is greater than the absolute current value of the direct current bus; or determining the absolute current value of the branch where any photovoltaic string is located according to the first current information, determining the absolute current value of the direct current bus according to the current information of the direct current bus, determining the absolute current value of any photovoltaic string branch according to the second current information, and determining a fault in the photovoltaic power generation system in response to determining that the absolute current value of the branch where any photovoltaic string is located is greater than the absolute current value of the direct current bus and determining that the absolute current value of any photovoltaic string branch is greater than the absolute current value of the direct current bus.

It should be noted that, with regard to the related description of the fault protection method, please refer to the foregoing description about the fault protection device, and its details will not be described herein.

With the fault protection method for the photovoltaic power generation system according to the embodiments of the present disclosure, the photovoltaic string branches are connected to one photovoltaic string or two parallel photovoltaic strings. The protection switch units corresponding to the co-positive power conversion units or the co-negative power conversion units share a protection switch when connected to their corresponding photovoltaic string units. Moreover, part or all of the plurality of protection switch units are disconnected. In this way, the at most two photovoltaic strings in each of the corresponding photovoltaic string units are connected in parallel. Moreover, when the protection switch units corresponding to the co-positive power conversion units or the co-negative power conversion units are disconnected, their corresponding photovoltaic strings are disconnected separately by the at least three protection switches. Therefore, the number of the protection switches can be reduced without increasing the withstand voltage level of the protection switch. Further, the cost and volume of the protection switch unit are reduced.

It should be noted that the logic and/or step described in other manners herein or illustrated in the flowchart, for example, a particular sequence table of executable instructions for realizing the logical function, may be exemplarily realized in any computer readable medium to be used by the instruction execution system, device or equipment (such as the system based on computers, the system including processors or other systems capable of obtaining the instructions from the instruction execution system, device and equipment and executing the instructions), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer disk case (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of being printed with programs thereon, this is because, for example, the paper or other appropriate medium may be optically scanned and then edited, decrypted or processed with other appropriate methods when necessary to obtain the programs in an electric manner, and then the programs may be stored in the computer memory.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In the description of this specification, descriptions with reference to the terms "an embodiment", "some embodiments", "examples", "specific examples", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

In addition, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the present disclosure, "plurality of" means at least two, such as two, three, etc., unless otherwise exemplarily defined.

In the present disclosure, unless otherwise clearly specified and limited, terms such as "install", "connect", "connect to", "fix" and the like should be understood in a broad sense. For example, it may be a fixed connection or a detachable connection or connection as one piece; mechanical connection or electrical connection; direct connection or indirect connection through an intermediate; internal communication of two components or the interaction relationship between two components. For those skilled in the art, the specific meaning of the above-mentioned terms in the present disclosure can be understood according to specific circumstances.

Although the configurations of embodiments of the present disclosure have been shown and described, it would be appreciated by those skilled in the art that the above embodiments are exemplary and cannot be construed as limiting the present disclosure, and changes, modifications, substitutions, and variations can be made by those skilled in the art to the embodiments without departing from the scope of the present disclosure.

What is claimed is:

1. A fault protection method for a photovoltaic power generation system, the photovoltaic power generation system comprising a plurality of photovoltaic string units, a plurality of protection switch units, and a plurality of power conversion units, each of the plurality of photovoltaic string units comprising at least N photovoltaic strings, and each of the plurality of protection switch units comprising a plurality of protection switches, wherein each of the plurality of protection switch units is adapted to connect one of the plurality of photovoltaic string units to a corresponding one of the plurality of power conversion units to form at least two photovoltaic string branches, each of the at least two photovoltaic string branches being adapted to connect one photovoltaic string or two parallel photovoltaic strings, where N is an integer greater than or equal to 3, the fault protection method comprising:

disconnecting, when there are co-positive power conversion units or co-negative power conversion units in the plurality of power conversion units and the protection switch units corresponding to the co-positive power conversion units or the co-negative power conversion units share a protection switch when connected to their corresponding photovoltaic string units, part or all of the plurality of protection switch units in response to detecting a fault in the photovoltaic power generation system, such that at most two photovoltaic strings in each of the corresponding photovoltaic string units are connected in parallel, wherein when the protection switch units corresponding to the co-positive power conversion units or the co-negative power conversion units are disconnected, their corresponding photovoltaic strings are disconnected separately by at least three protection switches.

2. The fault protection method according to claim 1, further comprising, in response to detecting the fault in the photovoltaic power generation system:

controlling a positive input terminal and a negative input terminal of a power conversion unit corresponding to a corresponding photovoltaic string unit to be short-circuited.

3. The fault protection method according to claim 2, further comprising, subsequent to the positive input terminal and the negative input terminal of the power conversion unit corresponding to the corresponding photovoltaic string unit being short-circuited:

controlling part or all of the plurality of protection switch units to be disconnected.

4. The fault protection method according to claim 3, further comprising, subsequent to the positive input terminal and the negative input terminal of the power conversion unit corresponding to the corresponding photovoltaic string unit being short-circuited:

obtaining at least one of a current value of a branch where each photovoltaic string is located, a current value of each photovoltaic string branch, and a current value of a direct current bus, so as to control the part or all of the plurality of protection switch units to be disconnected in response to determining that a power generation current of the photovoltaic power generation system is smaller than a first predetermined value according to the at least one of the current value of the branch where each photovoltaic string is located, the current value of each photovoltaic string branch, and the current value of the direct current bus.

5. The fault protection method according to claim 1, further comprising:

detecting at least one of a parameter value of a branch where each photovoltaic string is located, a parameter value of each photovoltaic string branch, and a parameter value of a direct current bus; and detecting a fault in the photovoltaic power generation system according to the at least one of the parameter value of the branch where each photovoltaic string is located, the parameter value of each photovoltaic string branch, and the parameter value of the direct current bus.

6. The fault protection method according to claim 5, wherein the parameter value of the branch where each photovoltaic string is located comprises first current information, and the parameter value of each photovoltaic string branch comprises second current information, the fault protection method further comprising:

determining a fault in the photovoltaic power generation system in response to determining that a current direction of the branch where the photovoltaic string is located is opposite to a predetermined direction according to the first current information; or determining a fault in the photovoltaic power generation system in response to determining that a current direction of the photovoltaic string branch is opposite to a predetermined direction according to the second current information; or determining a fault in the photovoltaic power generation system in response to determining that the current direction of the branch where the photovoltaic string is located is opposite to a predetermined direction according to the first current information and determining that the current direction of the photovoltaic string branch is opposite to a predetermined direction according to the second current information; or determining a fault in the photovoltaic power generation system in response to determining that an absolute current value of the branch where the photovoltaic string is located is greater than a first predetermined current threshold according to the first current information; or determining a fault in the photovoltaic power generation system in response to determining that an absolute current value of the photovoltaic string branch is greater than a second predetermined current threshold according to the second current information; or determining a fault in the photovoltaic power generation system in response to determining that the absolute current value of the branch where the photovoltaic string is located is greater than the first predetermined current threshold according to the first current information and determining that the absolute current value of the photovoltaic string branch is greater than the second predetermined current threshold according to the second current information.

7. The fault protection method according to claim 5, wherein:

the parameter value of the branch where each photovoltaic string is located comprises first current information, and the parameter value of the direct current bus comprises a voltage of the direct current bus, the fault protection method further comprising:

determining a fault in the photovoltaic power generation system in response to determining that an absolute current value of the branch where the photovoltaic string is located is greater than a first predetermined current threshold according to the first current information and determining that the voltage of the direct current bus is smaller than a first predetermined voltage threshold; or the parameter value of each photovoltaic string branch comprises second current information, and the parameter value of the direct current bus comprises a voltage of the direct current bus, the fault protection method further comprising:

determining a fault in the photovoltaic power generation system in response to determining that an absolute current value of each photovoltaic string branch is greater than a second predetermined current threshold according to the second current information and determining that the voltage of the direct current bus is smaller than a first predetermined voltage threshold; or the parameter value of the direct current bus comprises a voltage of the direct current bus, the fault protection method further comprising:

determining a fault in the photovoltaic power generation system in response to determining that the voltage of the direct current bus is smaller than a first predetermined voltage threshold.

8. The fault protection method according to claim 5, wherein the parameter value of the branch where each photovoltaic string is located comprises first current information, the parameter value of each photovoltaic string branch comprises second current information and the parameter value of the direct current bus comprises current information of the direct current bus, the fault protection method further comprising:

determining an absolute current value of a branch where any photovoltaic string is located according to the first current information, determining an absolute current value of the direct current bus according to the current information of the direct current bus, and determining a fault in the photovoltaic power generation system in response to determining that the absolute current value of the branch where any photovoltaic string is located is greater than the absolute current value of the direct current bus; or determining an absolute current value of any photovoltaic string branch according to the second current information, determining the absolute current value of the direct current bus according to the current information of the direct current bus, and determining a fault in the photovoltaic power generation system in response to determining that the absolute current value of any photovoltaic string branch is greater than the absolute current value of the direct current bus; or determining the absolute current value of the branch where any photovoltaic string is located according to the first current information, determining the absolute current value of the direct current bus according to the current information of the direct current bus, determining the absolute current value of any photovoltaic string branch according to the second current information, and determining a fault in the photovoltaic power generation system in response to determining that the absolute current value of the branch where any photovoltaic string is located is greater than the absolute current value of the direct current bus and determining that the absolute current value of any photovoltaic string branch is greater than the absolute current value of the direct current bus.

9. A fault protection device for a photovoltaic power generation system, the photovoltaic power generation system comprising a plurality of photovoltaic string units and a plurality of power conversion units, each of the plurality of photovoltaic string units comprising at least N photovoltaic strings, where N is an integer greater than or equal to 3, the fault protection device comprising:

a plurality of protection switch units, each of the plurality of protection switch units comprising a plurality of protection switches and adapted to connect one of the plurality of photovoltaic string units to a corresponding one of the plurality of power conversion units to form at least two photovoltaic string branches, each of the at least two photovoltaic string branches being adapted to connect to one photovoltaic string or two parallel photovoltaic strings; and a control portion configured to control, when there are co-positive power conversion units or co-negative power conversion units in the plurality of power conversion units and the protection switch units corresponding to the co-positive power conversion units or the co-negative power conversion units share a protection switch when connected to their corresponding photovoltaic string units, part or all of the plurality of protection switch units to be disconnected in response to detecting a fault in the photovoltaic power generation system, such that at most two photovoltaic strings in each of the corresponding photovoltaic string units are connected in parallel, wherein when the protection switch units corresponding to the co-positive power conversion units or the co-negative power conversion units are disconnected, their corresponding photovoltaic strings are disconnected separately by at least three protection switches.

10. The fault protection device according to claim 9, wherein:

each of the plurality of protection switch units comprises at least two positive connection terminals and at least two negative connection terminals, wherein each of the at least two positive connection terminals is adapted to be connected to at most two photovoltaic strings of a photovoltaic string unit corresponding to a power conversion unit; and wherein each of the at least two negative connection terminals is adapted to be connected to the at most two photovoltaic strings of a photovoltaic string unit corresponding to a power conversion unit.

11. The fault protection device according to claim 10, wherein in the protection switch units corresponding to the co-negative power conversion units, at least one negative connection terminal is adapted to be connected to photovoltaic strings in different photovoltaic string units, such that the protection switch units corresponding to the co-negative power conversion units share a protection switch when connected to their corresponding photovoltaic string units.

12. The fault protection device according to claim 11, wherein the co-negative power conversion units comprise a first power conversion unit and a second power conversion unit, wherein:

one of the at least two negative connection terminals is adapted to be connected to two parallel photovoltaic strings corresponding to the first power conversion unit and one photovoltaic string corresponding to the second power conversion unit; or one of the at least two negative connection terminals is adapted to be connected to two parallel photovoltaic strings corresponding to the first power conversion unit and two parallel photovoltaic strings corresponding to the second power conversion unit; or one of the at least two negative connection terminals is adapted to be connected to one photovoltaic string corresponding to the first power conversion unit and one photovoltaic string corresponding to the second power conversion unit; or one of the at least two negative connection terminals is adapted to be connected to one photovoltaic string corresponding to the first power conversion unit and one photovoltaic string corresponding to the second power conversion unit, and the other one of the at least two negative connection terminals is adapted to be connected to two parallel photovoltaic strings corresponding to the first power conversion unit and two parallel photovoltaic strings corresponding to the second power conversion unit; or one of the at least two negative connection terminals is adapted to be connected to one photovoltaic string corresponding to the first power conversion unit and one photovoltaic string corresponding to the second power conversion unit, and the other one of the at least two negative connection terminals is adapted to be connected to one photovoltaic string corresponding to the first power conversion unit and two parallel photovoltaic strings corresponding to the second power conversion unit; or one of the at least two negative connection terminals is adapted to be connected to two parallel photovoltaic strings corresponding to the first power conversion unit and two parallel photovoltaic strings corresponding to the second power conversion unit, and the other one of the at least two negative connection terminals is adapted to be connected to one photovoltaic string corresponding to the first power conversion unit and two parallel photovoltaic strings corresponding to the second power conversion unit.

13. The fault protection device according to claim 11, wherein the co-negative power conversion units comprise a first power conversion unit and a second power conversion unit, and wherein when the at least one negative connection terminal comprises at least three negative connection terminals, wherein:

a first negative connection terminal of the at least three negative connection terminals is adapted to be connected to two parallel photovoltaic strings corresponding to the first power conversion unit and two parallel photovoltaic strings corresponding to the second power conversion unit;

a second negative connection terminal of the at least three negative connection terminals is adapted to be connected to one photovoltaic string corresponding to the first power conversion unit and two parallel photovoltaic strings corresponding to the second power conversion unit; and a third negative connection terminal of the at least three negative connection terminals is adapted to be connected to one photovoltaic string corresponding to the first power conversion unit and one photovoltaic string corresponding to the second power conversion unit.

14. The fault protection device according to claim 10, wherein in the protection switch units corresponding to the co-positive power conversion units, at least one positive connection terminal is adapted to be connected to photovoltaic strings in different photovoltaic string units, such that the protection switch units corresponding to the co-positive power conversion units share a protection switch when connected to their corresponding photovoltaic string units.

15. The fault protection device according to claim 14, wherein the co-positive power conversion units comprise a first power conversion unit and a second power conversion unit, wherein:

one of the at least two positive connection terminals is adapted to be connected to two parallel photovoltaic strings corresponding to the first power conversion unit and one photovoltaic string corresponding to the second power conversion unit; or one of the at least two positive connection terminals is adapted to be connected to two parallel photovoltaic strings corresponding to the first power conversion unit and two parallel photovoltaic strings corresponding to the second power conversion unit; or one of the at least two positive connection terminals is adapted to be connected to one photovoltaic string corresponding to the first power conversion unit and one photovoltaic string corresponding to the second power conversion unit; or one of the at least two positive connection terminals is adapted to be connected to one photovoltaic string corresponding to the first power conversion unit and one photovoltaic string corresponding to the second power conversion unit, and the other one of the at least two positive connection terminals is adapted to be connected to two parallel photovoltaic strings corresponding to the first power conversion unit and two parallel photovoltaic strings corresponding to the second power conversion unit; or one of the at least two positive connection terminals is adapted to be connected to one photovoltaic string corresponding to the first power conversion unit and one photovoltaic string corresponding to the second power conversion unit, and the other one of the at least two positive connection terminals is adapted to be connected to one photovoltaic string corresponding to the first power conversion unit and two parallel photovoltaic strings corresponding to the second power conversion unit; or one of the at least two positive connection terminals is adapted to be connected to two parallel photovoltaic strings corresponding to the first power conversion unit and two parallel photovoltaic strings corresponding to the second power conversion unit, and the other one of the at least two positive connection terminals is adapted to be connected to one photovoltaic string corresponding to the first power conversion unit and two parallel photovoltaic strings corresponding to the second power conversion unit.

16. The fault protection device according to claim 14, wherein the co-positive power conversion units comprise a first power conversion unit and a second power conversion unit, and wherein when the at least one positive connection terminal comprises at least three positive connection terminals, wherein:

a first positive connection terminal of the at least three positive connection terminals is adapted to be connected to two parallel photovoltaic strings corresponding to the first power conversion unit and two parallel photovoltaic strings corresponding to the second power conversion unit;

a second positive connection terminal of the at least three positive connection terminals is adapted to be connected to one photovoltaic string corresponding to the first power conversion unit and two parallel photovoltaic strings corresponding to the second power conversion unit; and a third positive connection terminal of the at least three positive connection terminals is adapted to be connected to one photovoltaic string corresponding to the first power conversion unit and one photovoltaic string corresponding to the second power conversion unit.

17. The fault protection device according to claim 11, wherein when there are at least three co-negative power conversion units in the plurality of power conversion units, the at least one negative connection terminal is adapted to be connected to photovoltaic strings in a photovoltaic string unit corresponding to each of the at least three co-negative power conversion units, such that the protection switch units corresponding to the at least three co-negative power conversion units share one protection switch when connected to their corresponding photovoltaic string units, optionally, a negative connection terminal corresponding to the one protection switch is adapted to be connected to:

one photovoltaic string corresponding to each of the co-negative power conversion units; or two parallel photovoltaic strings corresponding to each of the co-negative power conversion units; or one photovoltaic string corresponding to at least one of the co-negative power conversion units, and two parallel photovoltaic strings corresponding to at least one of the co-negative power conversion units.

18. The fault protection device according to claim 14, wherein when the plurality of power conversion units comprise at least three co-positive power conversion units, the at least one positive connection terminal is adapted to be connected to one photovoltaic string in one photovoltaic string unit corresponding to each of the co-positive power conversion units, such that the protection switch units corresponding to the at least three co-positive power conversion units share one protection switch when connected to their corresponding photovoltaic string units, optionally, a positive connection terminal corresponding to one protection switch is adapted to be connected to:

one photovoltaic string corresponding to each of the co-positive power conversion units; or two parallel photovoltaic strings corresponding to each of the co-positive power conversion units; or one photovoltaic string corresponding to at least one of the co-positive power conversion units, and two parallel photovoltaic strings corresponding to at least one of the co-positive power conversion units.

19. The fault protection device according to claim 9, wherein when the co-positive power conversion units or co-negative power conversion units comprise at least three co-positive power conversion units or at least three co-negative power conversion units, at least one power conversion unit and one or more other power conversion units share at least one protection switch in their corresponding protection switch units, optionally, the co-positive power conversion units or co-negative power conversion units comprise a first power conversion unit, a second power conversion unit, and a third power conversion unit, wherein:

the first power conversion unit and the second power conversion unit share at least one protection switch in their corresponding protection switch units, and the first power conversion unit and the third power conversion unit share at least one protection switch in their corresponding protection switch units; or the second power conversion unit and the first power conversion unit share at least one protection switch in their corresponding protection switch units, and the second power conversion unit and the third power conversion unit share at least one protection switch in their corresponding protection switch units; or the third power conversion unit and the first power conversion unit share at least one protection switch in their corresponding protection switch units, and the third power conversion unit and the second power conversion unit share at least one protection switch in their corresponding protection switch units.

20. The fault protection device according to claim 9, wherein when the co-positive power conversion units or co-negative power conversion units comprise at least three co-positive power conversion units or at least three co-negative power conversion units, any two of the at least three co-positive power conversion units or at least three co-negative power conversion units share at least one protection switch in their corresponding protection switch units, optionally, the co-positive power conversion units or co-negative power conversion units comprise a first power conversion unit, a second power conversion unit, and a third power conversion unit, wherein:

the first power conversion unit and the second power conversion unit share at least one protection switch in their corresponding protection switch units;

the first power conversion unit and the third power conversion unit share at least one protection switch in their corresponding protection switch units; and the second power conversion unit and the third power conversion unit share at least one protection switch in their corresponding protection switch units.

21. The fault protection device according to claim 9, wherein the plurality of protection switches in each of the plurality of protection switch units is configured as a multi-pole linked switch.

22. The fault protection device according to claim 9, wherein when the photovoltaic power generation system has a reverse-connection fault branch, the co-positive power conversion units or the co-negative power conversion units withstand a voltage equal to two times the voltage of a photovoltaic string via at least three protection switches when disconnecting corresponding protection switch units based on the reverse-connection fault branch.

23. The fault protection device according to claim 9, wherein the control portion is further configured to control, in response to detecting the fault in the photovoltaic power generation system, a positive input terminal and a negative input terminal of a power conversion unit corresponding to a photovoltaic string unit to be short-circuited.

24. The fault protection device according to claim 23, wherein the control portion is further configured to control, subsequent to the positive input terminal and the negative input terminal of the power conversion units corresponding to the corresponding photovoltaic string unit being short-circuited, part or all of the plurality of protection switch units to be disconnected.

25. A combiner box of a photovoltaic power generation system, comprising:

the fault protection device according to claim 9, the fault protection device being configured to disconnect, in response to a fault in the photovoltaic power generation system, part or all of connections between the plurality of power conversion units and the plurality of photovoltaic string units, such that when the protection switch units corresponding to the co-positive power conversion units or the co-negative power conversion units are disconnected, their corresponding photovoltaic strings are disconnected separately by at least three protection switches.

26. An inverter of a photovoltaic power generation system, comprising:

a plurality of power conversion units; and the fault protection device according to claim 9, the fault protection device being provided between the plurality of power conversion units and the plurality of photovoltaic string units, to disconnect, in response to a fault in the photovoltaic power generation system, part or all of connections between the plurality of power conversion units and the plurality of photovoltaic string units, such that when the protection switch units corresponding to the co-positive power conversion units or the co-negative power conversion units are disconnected, their corresponding photovoltaic strings are disconnected separately by at least three protection switches.

27. A photovoltaic power generation system, comprising a plurality of photovoltaic string units, each of the plurality of photovoltaic string units comprising at least N photovoltaic strings, where N is an integer greater than or equal to 3, the photovoltaic power generation system further comprising: the fault protection device according to claim 9.

* * * * *